United States Patent
Rice et al.

(10) Patent No.: US 7,707,433 B2
(45) Date of Patent: Apr. 27, 2010

(54) METHOD AND SYSTEM FOR SECURE COMPUTATIONAL OUTSOURCING AND DISGUISE

(75) Inventors: John R. Rice, West Lafayette, IN (US); Mikhail J. Atallah, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 1134 days.

(21) Appl. No.: 11/252,049

(22) Filed: Oct. 17, 2005

(65) Prior Publication Data

US 2006/0107070 A1 May 18, 2006

Related U.S. Application Data

(60) Division of application No. 10/100,682, filed on Mar. 18, 2002, now Pat. No. 6,957,341, which is a continuation-in-part of application No. 09/455,580, filed on Dec. 6, 1999, now abandoned, and a continuation-in-part of application No. 09/312,230, filed on May 14, 1999, now Pat. No. 6,941,463.

(60) Provisional application No. 60/276,598, filed on Mar. 16, 2001, provisional application No. 60/085,515, filed on May 14, 1998, provisional application No. 60/152,769, filed on Sep. 3, 1999.

(51) Int. Cl.
 *G06F 12/14* (2006.01)
(52) U.S. Cl. .................................... 713/194
(58) Field of Classification Search ............... 713/194
 See application file for complete search history.

(56) References Cited

U.S. PATENT DOCUMENTS 4,120,030 A  10/1978  Johnstone (Continued)

FOREIGN PATENT DOCUMENTS

WO  WO 97/15051  4/1997

(Continued)

OTHER PUBLICATIONS

Collberg, Thomborson and Low, A Taxonomy of Obfuscating Transformations, Technical Report 148, pp. 1-36, 1997.
Aucsmith, Tamper Resistant Software: An Implementation from Lecture Notes in Computer Science 1174, 1996, pp. 317-333.
Millen, Kernel Isolation for the PDP-11/70 from Proceedings of the 1982 Symposium on Security and Privacy, 1982, pp. 57-65.
Collberg and Thomborson, Software Watermarking: Models and Dynamic Embeddings, pp. 1-14.
Bashar, Krishnan, Kuhn, Spafford and Wagstaff, Low-Threat Security Patches and Tools, pp. 1-8.

(Continued)

*Primary Examiner*—Matthew B Smithers
(74) *Attorney, Agent, or Firm*—Bose McKinney & Evans, LLP

(57) ABSTRACT

Method and system for secure computational outsourcing and disguise of data, computer programs, pictures, and databases from unauthorized access, theft, and tampering using disguising and tamperproofing operations. In some embodiments, the disguising operation includes generating a random number for each data element, and modifying each data element with the random numbers. In some embodiments, the computer program, written in a first programming language, is partitioned into first and second programs; the first program determines whether access to the data is authorized, the second program entangles the second program and the data; and the second program is translated into a second programming language. An embodiment of the present invention comprises a method for identifying the subject of a first picture by comparison to a second picture. Embodiments comprise securing a computer program with real programming code by creating dummy program code and mixing the dummy and real program code.

24 Claims, 15 Drawing Sheets

U.S. PATENT DOCUMENTS

| | | | |
|---|---|---|---|
| 4,465,901 A | | 8/1984 | Best |
| 5,493,649 A | | 2/1996 | Slivka et al. |
| 5,666,411 A | | 9/1997 | McCarty |
| 5,684,875 A | | 11/1997 | Ellenberger |
| 5,687,191 A | | 11/1997 | Lee et al. |
| 5,737,416 A | | 4/1998 | Cooper et al. |
| 5,745,573 A | | 4/1998 | Lipner et al. |
| 5,822,360 A | | 10/1998 | Lee et al. |
| 5,822,517 A | | 10/1998 | Dotan |
| 5,892,899 A | | 4/1999 | Aucsmith et al. |
| 5,892,900 A | | 4/1999 | Gintner et al. |
| 5,933,498 A | | 8/1999 | Schneck et al. |
| 6,006,328 A | * | 12/1999 | Drake .......................... 726/23 |
| 6,044,469 A | | 3/2000 | Horstmann |
| 6,052,780 A | | 4/2000 | Glover |
| 6,055,503 A | | 4/2000 | Horstmann |
| 6,061,449 A | | 5/2000 | Candelore et al. |
| 6,088,452 A | * | 7/2000 | Johnson et al. ............... 380/28 |
| 6,119,108 A | | 9/2000 | Holmes et al. |
| 6,134,659 A | | 10/2000 | Sprong et al. |
| 6,138,119 A | | 10/2000 | Hall et al. |
| 6,175,925 B1 | | 1/2001 | Nardone et al. |
| 6,178,509 B1 | | 1/2001 | Nardone et al. |
| 6,185,683 B1 | | 2/2001 | Gintner et al. |
| 6,192,475 B1 | | 2/2001 | Wallace |
| 6,205,550 B1 | | 3/2001 | Nardone et al. |
| 6,237,786 B1 | | 5/2001 | Gintner et al. |
| 6,334,189 B1 | | 12/2001 | Granger et al. |
| 6,594,761 B1 | * | 7/2003 | Chow et al. .................. 713/190 |
| 6,615,350 B1 | * | 9/2003 | Schell et al. ................. 713/168 |
| 6,668,325 B1 | * | 12/2003 | Collberg et al. ............. 713/194 |

FOREIGN PATENT DOCUMENTS

| | | |
|---|---|---|
| WO | WO 99/01815 | 1/1999 |
| WO | WO 99/64973 | 12/1999 |
| WO | WO 00/67095 | 11/2000 |
| WO | WO 00/77596 | 12/2000 |
| WO | WO 00/77597 | 12/2000 |
| WO | WO 01/14953 | 3/2001 |
| WO | WO 01/79969 | 10/2001 |

OTHER PUBLICATIONS

Collberg, Thomborson and Low, Manufacturing Cheap, Resilient, and Stealthy Opaque Constructs, 1998, pp. 184-196.

Carolina, Software Protection Technology Legal Aspects of Software Protection Devices from the Computer Law and Security Report, 1995, pp. 188-193.

Larus and Schnarr, EEL: Machine-Independent Executable Editing, 1995, pp. 1-10.

Collberg, Thomborson and Low, Breaking Abstractions and Unstructuring Data Structures, pp. 1-11.

Sander and Tschudin, Protecting Mobil Agents Against Malicious Hosts from Lecture Notes in Computer Science 1419, Mobile Agents and Security, 1998, pp. 44-60.

Mambo, Murayama and Okamoto, A Tentative Approach to Constructing Tamper-Resistant Software from New Security Paradigms Workshop, 1997, pp. 23-33.

Kahng, et al.; Robust IP Watermarking Methodologies for Physical Design from Design Automation Conference, 1998, pp. 782-787.

Dwork, Lotspiech and Naor, Digital Signets: Self-Enforcing Protection of Digital Information (Preliminary Version), 1996, pp. 489-498.

Wood and Zeidler, Security Modules: Potent Information Security System Components from Computers & Security, 1986, pp. 114-121.

Necula and Lee, Research on Proof-Carrying Code for Untrusted-Code Security from 1997 IEEE Symposium on Security and Privacy, 1997, p. 204.

Crawford, Copy Protection Methods; Dec. 1997; pp. 1-6.

Cifuentes, Cristina, Structuring Decompiled Graphs, Proceedings of the International Conference on Computer Construction, pp. 91-105, Linkoping, Sweden, 1996.

Joepgen, Hans-Georg, and Krauss, Stefan, Rundum-Schutz durch Fertig-Programmbausteine, Elektronik 17/1993, pp. 52-56.

Larus, James, Whole Program Paths, Sigplan PLDI, May 1999.

Schulman, Andrew, Examining the Windows AARD Detection Code, Dr. Dobb's Journal, vol. 18, No. 9, Sep. 1993, pp. 42, 44-48, 89.

White, Steve R., and Comerford, Liam, ABYSS: An Architecture for Software Protection, IEEE Transactions on Software Engineering, vol. 16, No. 6, Jun. 1990, pp. 619-629.

Atallah, Mikhael J., Rice, John R.; Secure Outsoucing of Scientific Computations; Dec. 7, 1998.

Atallah, M. J., Pantazopoulos, K. N., Spafford, E.E.; Secure Outsourcing of Some Computations; Dept. of Computer Science, Purdue University, Dec. 7, 1998, 24 pps.

Atallah, M.J., Pantazopoulos, K.N., Rice, J.R., Spafford, E. E.; Secure Outsourcing of Scientific Computations, CERIAS, Purdue University, Oct. 16, 2000, 56 ppps.

Abadi, et al., "On Hiding Information from an Oracle", 1989, Journal of Computer and System Sciences, 39, pp. 1-29.

Abadi et al., "Secure Circuit Evaluation", 1990, Journal of Cryptology, 3, pp. 1-12.

Matsumoto et al., "Speeding Up Secret Computations with Insecure Auxilary Devices", 1990, Springer-Verlag, pp. 497-506.

Kawamura et al., "Fast Server-Aided Secret Computation Protocols for Modular Exponentation", 1993, IEEE, pp. 778-784.

Casanova et al., "Netsolve: A Network Server for Solving Computational Science Problems", 1996, Univ. Tennessee, pp. 1-14.

* cited by examiner

METHOD AND SYSTEM FOR SECURE COMPUTATIONAL OUTSOURCING AND DISGUISE

RELATED APPLICATIONS

This application is a divisional of U.S. application Ser. No. 10/100,682, filed Mar. 18, 2002, now U.S. Pat. No. 6,957,341, which: (i) claims the benefit of U.S. Provisional Application Ser. No. 60/276,598, filed Mar. 16, 2001; (ii) is a continuation-in-part of U.S. application Ser. No. 09/312,230, filed May 14, 1999 now U.S. Pat. No. 6,941,463, which claims the benefit of U.S. Provisional Application Ser. No. 60/085,515, filed May 14, 1998; and (iii) is a continuation-in-part of U.S. application Ser. No. 09/455,580, filed Dec. 6, 1999 now abandoned, which claims the benefit of U.S. Provisional Application Ser. No. 60/152,769, filed Sep. 3, 1999. The disclosure of each above-referenced application is hereby incorporated by reference in its entirety.

BACKGROUND

In many science and engineering computational problems, it is desirable to outsource the computation to an external computing agent in such a way that the customer's information is hidden from the external agent, and yet the answers returned by the agent can be used to obtain easily the true answer. The computations required to be performed on a local computer are proportional to the size of the local input, which is unavoidable. The bulk of the computational task falls on the external agent, which would typically be an entity with considerable computing power, such as a supercomputing center. It is desirable to find a way to improve these outsourcing techniques, and, in particular, to enable multiple parties to contribute information to the outsourced computation.

Rapid growth in the area of computer technology, including networking schemes like the Internet, has facilitated the transmission of data from a processing system at one site (the customer) to another site (the agent) to perform certain computations. Such "outsourcing" of certain computations may be desired, for example, when the customer lacks the hardware resources, software resources, or other know-how to cost-effectively perform the computations.

In one example, outsourcing is utilized in the financial services industry, where, for instance, the customer data includes projections of the likely future evolution of certain commodity prices, interest and inflation rates, economic statistics, portfolio holdings, etc. In another example, outsourcing is utilized in the energy services industry, where the proprietary data is typically seismic, and can be used to estimate the likelihood of finding oil or gas at a particular geographic spot in question. The seismic data may be so massive that the performance of corresponding matrix multiplication and inversion computations would be beyond the resources of most major oil companies. Many other industries can also benefit from outsourcing.

With the advent of computational outsourcing, concerns regarding the agent's misappropriation of customer data or the computational results have arisen. These concerns arise not only with the customer, but also with an agent who wants to reduce the risk of misappropriation by its employees. One proposed technique is to utilize standard cryptographic techniques to encrypt the data sent by the customer to the agent. While encryption may enhance security with respect to an attacking third party, it still requires that the agent have access to at least some of the cryptographic information, such as encryption/decryption keys, to perform a meaningful calculation. As a result, this technique still provides the agent ready access to the actual data. Moreover, such techniques assume the agent will be a permanent repository of the data, performing certain operations on it and maintaining certain predicates. In many instances, this situation also is undesirable.

For the foregoing reasons, there is a need for techniques enabling a customer to securely outsource computations to an agent. The desired techniques should reduce the risk of misappropriation by an agent or an agent's employee of a customer's data sent to an agent for an outsourced computation. Preferably, the desired techniques should enable a customer to disguise its data before disclosing it to an agent, without the need for encryption of the customer's data.

SUMMARY

The present invention relates to methods and systems for secure outsourcing and disguise of computations, graphs, data, files, databases, and computer programs. Application of the methods and system of the present invention reduces the risk of misappropriation by an agent or an agent's employee of a customer's data sent to an agent for an outsourced computation. The methods and systems of the present invention enable a customer to disguise its data before disclosing it to an agent, without the need for encryption of the data.

An embodiment of the present invention comprises a method for securing data from unauthorized access, theft, and tampering. According to this embodiment, the data and an associated computer program are stored in a computer memory. A disguising operation is performed on the data, and a tamperproofing operation is performed on the computer program. In another embodiment of the foregoing method, the data includes a plurality of data elements and the disguising operation includes the steps of generating a random number for each data element, and modifying each data element by adding one of the random numbers to the data element. In yet another embodiment of the foregoing method, the seeds for generating the random numbers are obtained from the data elements themselves.

Another embodiment of the present invention comprises an alternative method for securing data from unauthorized access, theft, and tampering. According to this embodiment, the data and an associated computer program are stored in a computer memory. The computer program is written in a first programming language. The computer program is partitioned into a first program and a second program. The first program is executed to determine whether access to the data is authorized, then the second program is executed to entangle the second program and the data. Lastly, the second program is translated into a second programming language to secure the data.

An embodiment of the present invention comprises a method for securing a plurality of data elements from unauthorized access, theft, and tampering. According to this embodiment, the plurality of data elements and an associated computer program are stored in a computer memory. The computer program is executed to generate a sequence of random numbers. The sequence of random numbers is divided into a plurality of random number segments, and the plurality of data elements are divided into a corresponding plurality of data segments. A programming code segment associated with each of the random number segments is identified. To secure the data, the code segments and data segments are interspersed in a file, and then each data element is replaced with a code segment and a data segment in the file.

Another embodiment of the present invention comprises an alternative method for securing data from unauthorized access, theft, and tampering. According to this embodiment, the data has an associated first computer program written in a first programming language. The data and the first computer program are stored on a computer. A second programming language is created, as is a second computer program to emulate the second programming language. The second computer program is configured to be executed on the computer. To secure the data, the first computer program is translated into the second programming language using the second computer program.

An embodiment of the present invention comprises a method for securing a picture from unauthorized access, theft, and tampering. A plurality of points on the picture are identified, and a planar graph is created therefrom. Coordinates for each of the points on the planar graph are determined. The point coordinates are indexed to create a vector, and then a disguising operation is performed on the vector.

An embodiment of the present invention comprises a computer-implemented method for identifying the subject of a first picture by comparison to a second picture. According to this embodiment, a plurality of points on the first and second pictures are identified, and a first and a second planar graph, are respectively created therefrom. Coordinates for each of the points on each of the first and second planar graphs are determined, then the point coordinates for each of the first and second planar graphs are indexed to create first and second vectors, respectively. A disguising operation is performed on each of the first and second vectors. The disguised vectors of the first and second graphs then are compared. A further embodiment of the foregoing method comprises the step of revealing the subject of the first picture by performing an unveiling operation on the first disguised vector.

An embodiment of the present invention comprises a method for securing a database from unauthorized access, theft, and tampering. According to this embodiment, the database is partitioned into a computer program and a plurality of data entries, and a key is assigned to each data entry using the computer program. A disguising operation then is performed on each key and on each data entry to secure the database. In another embodiment of the foregoing method, the disguising operation includes the steps of generating random data using a random data generator, adding the random data to each data entry, and adding the random data to each key to disguise the database.

An embodiment of the present invention comprises a method for securing computer program code from unauthorized access, theft, and tampering. According to this embodiment, the computer program code is operable to perform a real operation on real input to produce a real output. A dummy program code operable to perform a dummy operation on dummy input to produce dummy output is created. Each of the real program code and the dummy program code is replicated at least one time. The real operation is performed using the replicated input to produce a first output. If the first output includes the real input, the real operation is performed using the first output to produce a second output. If the first output includes the dummy input, a dummy operation is performed using the first output to produce a third output. The second output is stored as the real output, and the third output is stored as the dummy output.

An embodiment of the present invention comprises an alternative method for securing a computer program from unauthorized access, theft, and tampering. According to this embodiment, the computer program comprises real programming code. Dummy program code is created. Each of the real program code and the dummy program code is replicated at least one time. The dummy program code and the real program code are mixed to enhance the difficulty in understanding the computer program.

The above-described embodiments of the present invention may be practiced in the alternative or in combination. Further, the above-described embodiments are merely illustrative and should not be considered restrictive or limiting, it being understood that other forms, features, aspects, objects, and embodiments of the present invention shall become apparent from the drawings and description contained herein.

DESCRIPTION

Figure 1:
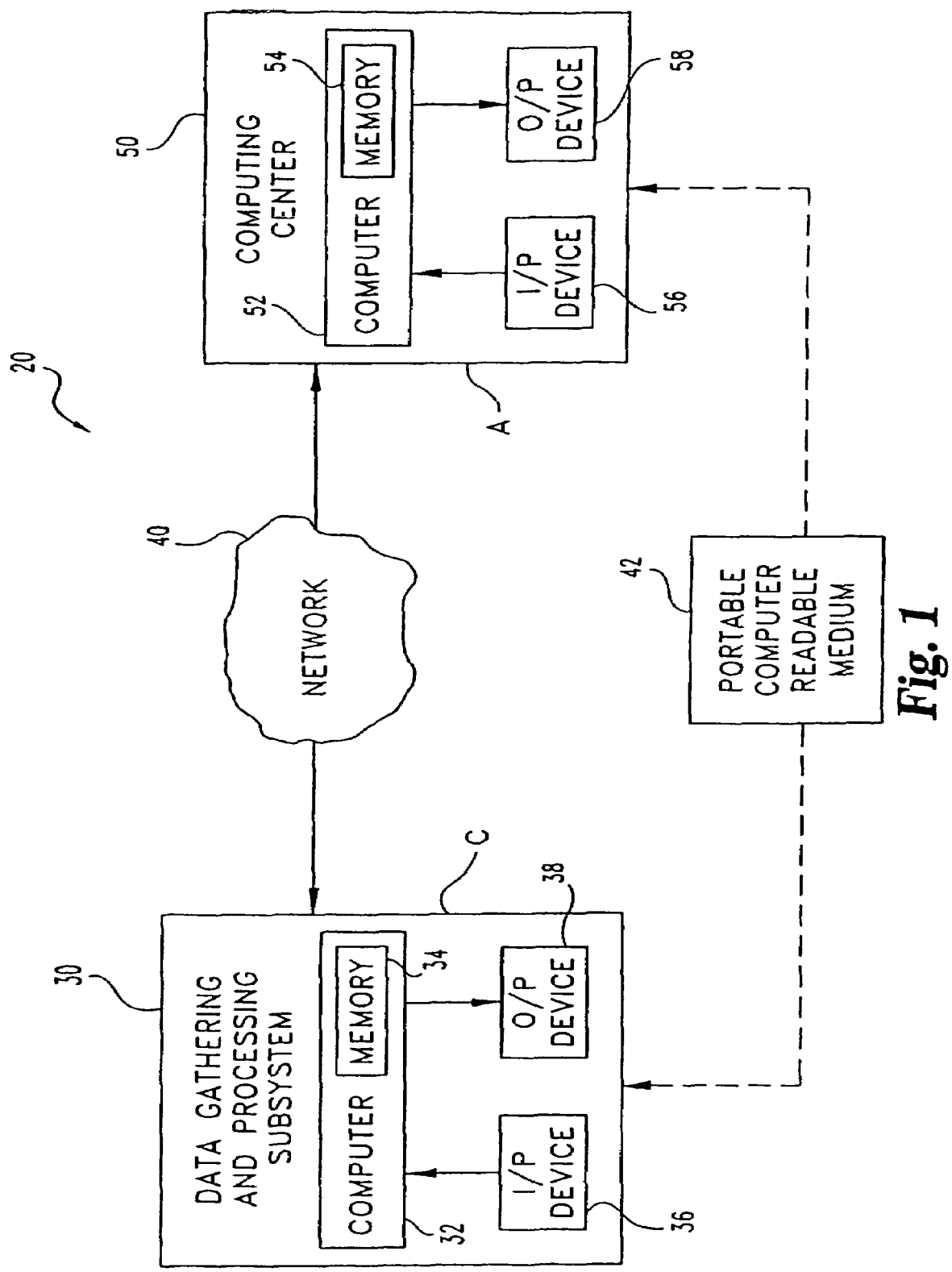
FIG. 1 shows a diagrammatic view of a system according to an embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates system 20. System 20 includes data gathering and processing subsystem 30 and computing center 50. Subsystem 30 is alternatively depicted as customer C, and computing center 50 is alternatively depicted as agent A. Subsystem 30 includes at least one computer 32. Computer 32 has memory 34, at least one input (I/P) device 36, and at least one output (O/P) device 38. Computing center 50 includes at least one computer 52 with memory 54, at least one input (I/P) device 56, and at least one output (O/P) device 58. Memories 34, 54 each define at least one computer readable medium that is accessed by computers 32, 52, respectively.

In one example, computers 32, 52 are of the programmable, digital variety, and memories 34, 54 are comprised of one or more components of a solid-state electronic type, an electromagnetic type like a hard disk drive, an optical type like a Compact Disk Read Only Memory (CD ROM), or a combination of any two or more of these. In other embodiments, computer 32 or computer 52 and/or memory 34 or memory 54 may be otherwise configured as would occur to those skilled in the art. Typically, computers 32, 52 will differ in some regard with respect to one another as is more fully explained hereinafter; however, other embodiments of the present invention may include computers 32, 52 that are substantially the same.

Input devices 36, 56 may include standard operator input devices such as a keyboard, mouse, digitizing pen, dedicated equipment for automatically inputting data, or such other devices as would occur to those skilled in the art. Output devices 38, 58 may include one or more displays, printers, or such other types as would occur to those skilled in the art. Further, input devices 36, 56 or output devices 38, 58 may be in the form of components that perform both input and output operations such as one or more modems or other communication links. Such components may alternatively be considered a computer transmission medium for sending and receiving data.

FIG. 1 depicts network 40 communicatively coupling subsystem 30 and computing center 50. Network 40 may be an Internet connection or other form of network as would occur to those skilled in the art. Further, portable memory medium 42 is shown as another means of exchanging data between subsystem 30 and computing center 50. Portable memory medium 42 may be in the form of one or more electromagnetic disks, tapes, or cartridges, optical disks, or such other form as would occur to those skilled in the art. It should be appreciated that network 40 and medium 42 may each be considered as being one of input devices 34, 54 and/or one of output devices 38, 58; and alternatively may each be regarded a type of data transmission medium for the transmission of computer data.

Figure 2:
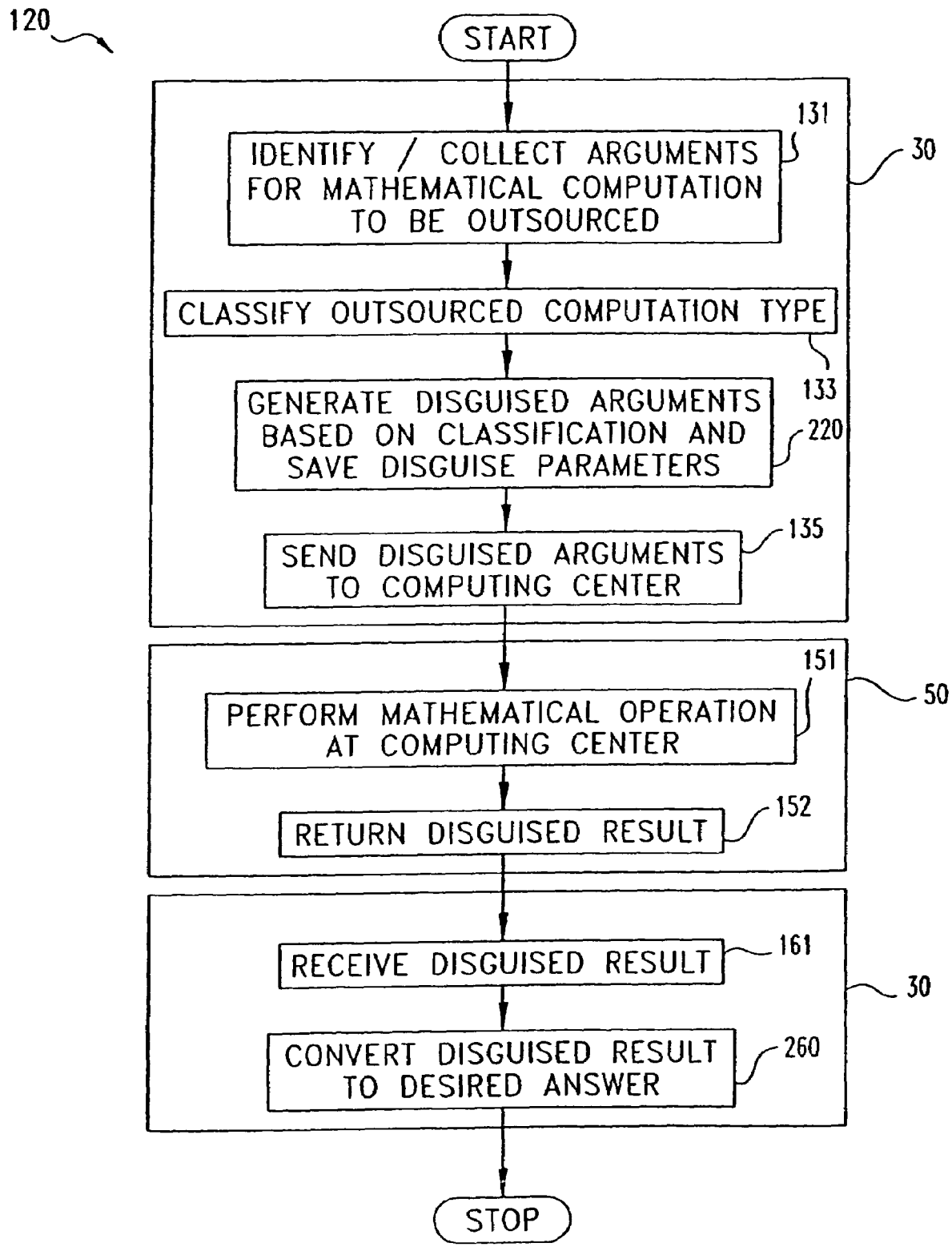
FIG. 2 shows a flow chart of a process performed with the system of FIG. 1 according to an embodiment of the present invention.

Referring now to FIG. 2, outsourcing process 120 is shown. In stage 131 of process 120, subsystem 30 identifies and collects a group of actual arguments AA for a computation to be outsourced. As used herein, "argument" refers broadly to any symbol, value, function, description, code, or other mathematical object or other equivalent thereto that is input to a computation. Typically, subsystem 30 is not as desirable as computing center 50 for performance of the computation designated for outsourcing. This distinction may arise from one or more differences relating to hardware, software, operator expertise, or available processing time. However, in other embodiments, the decision to outsource a particular computation may be independent of any such differences.

Once arguments are determined in stage 131, the outsourced computation is classified into one of a number of types in stage 133. A nonexclusive listing of computation types that may be good candidates for outsourcing is provided in Table I as follows:

TABLE I

| No. | Type |
| --- | --- |
| 1. | Matrix Multiplication |
| 2. | Matrix Inversion |
| 3. | Solution of a Linear System of Equations |
| 4. | Quadrature |
| 5. | Convolution |
| 6. | Numerical Solution of Differential Equations |
| 7. | Optimization |
| 8. | Solution of a Nonlinear System |
| 9. | Image Edge Detection |
| 10. | Image Template Matching |
| 11. | Sorting |
| 12. | Character String Pattern Matching |

It should be appreciated that the list of Table I is merely illustrative, and that other types of outsourced computations and classifications may be utilized in other embodiments. For example, those skilled in the art will appreciate that computational types such as integral equations, statistical regression and correlations, natural language processing, biometric data matching, database analysis, data mining, and classification problems such as medical diagnosis, vulnerability assessments, mechanical trouble shooting, and computer error diagnosis all are within the scope of the present invention.

After classification, process 120 resumes with operation 220 to determine a set of disguised arguments DA based on the outsourced computation classification and the actual arguments AA. Disguised arguments DA are created in operation 220 to hide the nature of actual arguments AA from the agent A selected to perform the outsourced computation, but at the same time to permit recovery of a meaningful actual answer SA by customer C from data provided by the computation. Several nonexclusive examples of the preparation of disguised arguments DA and recovery of actual answer SA are provided hereinafter in connection with the description of FIGS. 3 and 4.

Once disguised arguments DA are prepared, subsystem 30 (customer C) sends disguised arguments DA to computing center 50 (agent A) to perform the outsourced computation in stage 135. The transmission in stage 135 may also include instructions regarding the type of outsourced computation. Alternatively, the nature of the computation may be established either before or after disguised arguments DA are sent. Disguised arguments DA and any instructions concerning the outsourced computation to be performed may be transmitted to computing center 50 via network 40, through portable computer readable medium 42, a combination of these, or through such other means as would occur to those skilled in the art.

In stage 151, computing center 50 performs the designated computation with disguised arguments DA. For example, computer 52 may execute programming instructions stored in memory 54 to perform this computation. In one example, computer 52 of computing center 50 is programmed to perform several different types of computations including one or more of those listed in Table I. Because disguised arguments DA are used, the result of the outsourced computation performed by computing center 50 typically differs from the actual answer SA that would have resulted if the outsourced computation had been performed with the actual arguments AA. The result for the computation performed with disguised arguments DA is then, in turn, hidden or disguised and is designated as disguised result DR. Computing center 50 sends disguised result DR back to subsystem 30 in stage 152. Subsystem 30 receives disguised result DR in stage 161 and recovers the desired actual answer SA in operation 260. The recovery of actual answer SA is described in greater detail in connection with FIGS. 3 and 4 and the examples that follow.

It should be appreciated that disguised arguments DA and disguised result DR are the only information available to computing center 50, such that the true nature of the data and answer for the selected outsourced computation are hidden through process 120. Consequently, outsourcing process 120 provides a measure of security relative to simply trusting agent A with the actual arguments AA and/or actual answer SA. Further, the degree of security may be varied in accordance with the particular nature of the outsourced computation and various parameters associated with operations 220 and 260 of process 120, as will be discussed in more detail hereinafter.

Figure 3:
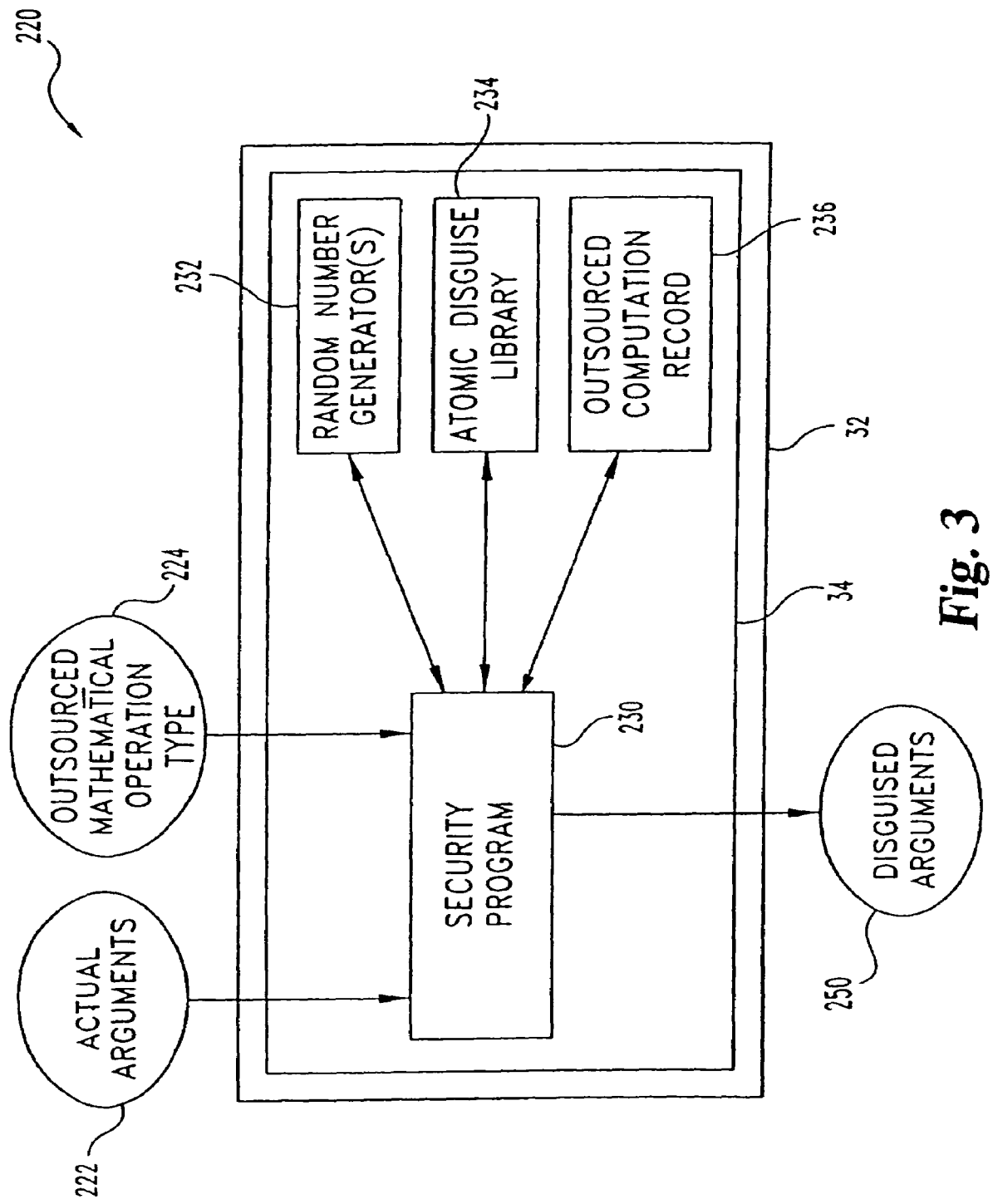
FIG. 3 shows a block diagram of an embodiment of selected operational elements for disguising arguments according to the process of FIG. 2.
Figure 4:
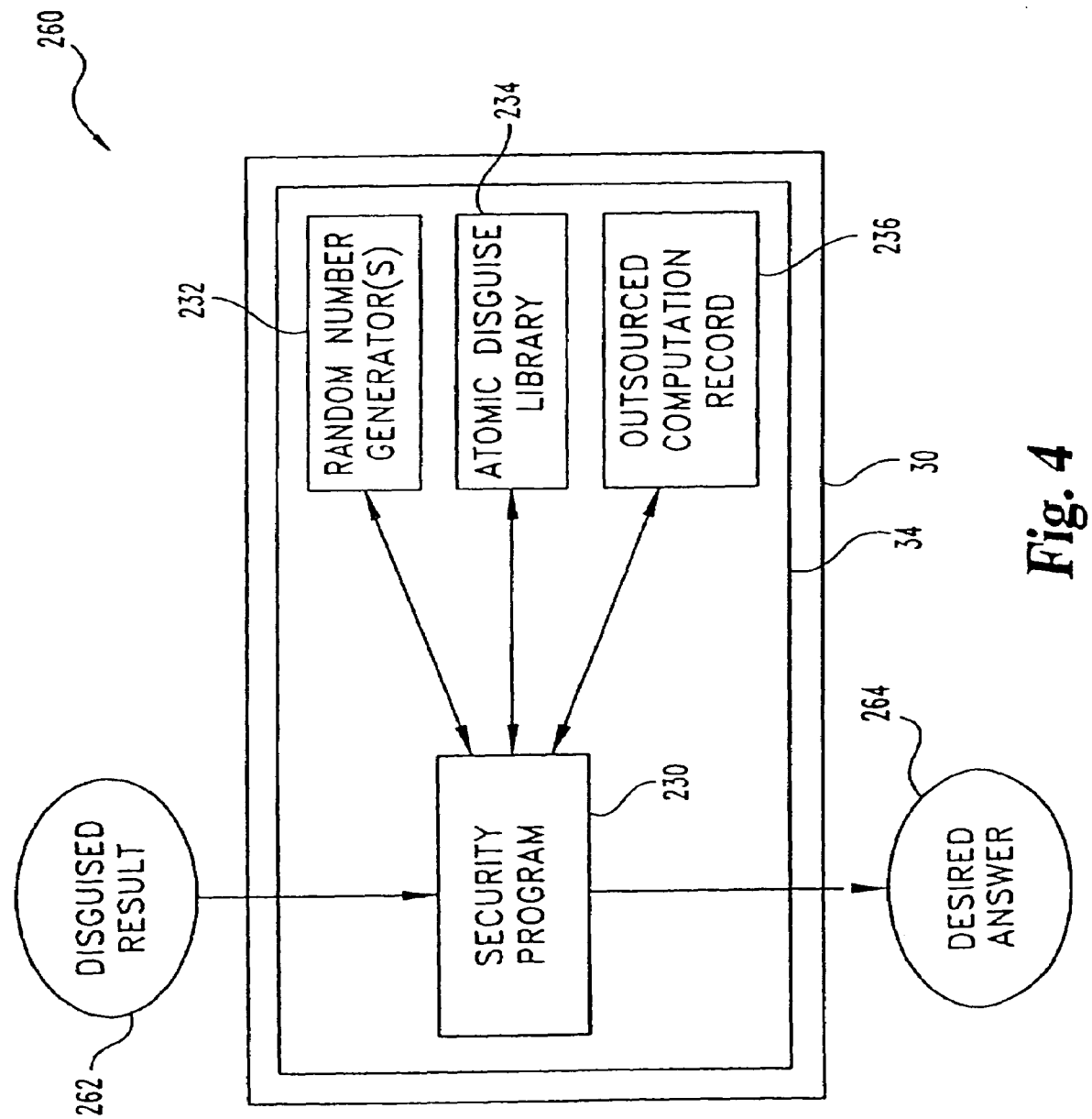
FIG. 4 shows a block diagram of an embodiment of selected operational elements for recovering an actual answer from a disguised result according to the process of FIG. 2.

Referring now to FIGS. 3 and 4, the preparation of disguised arguments DA and the recovery of actual answer SA are further described as performed by operations 220 and 260, respectively. FIGS. 3 and 4 both include a block representative of outsourcing security program 230. Program 230 resides in memory 34 and is configured to be executed by computer 32. In FIG. 3, program 230 receives actual arguments AA as input 222. Program 230 also receives input 224. Input 224 indicates the type of outsourced computation as determined through the classification performed in stage 133.

Program 230 has access to one or more pseudorandom number generators 232 residing in the form of one or more executable subroutines in memory 34. Also, memory 34 includes disguise library 234. Library 234 includes a number of different forms of argument disguise operations one or more of which are used to form a given set of disguised arguments DA. Various classes of the disguised operations are listed in Table II that follows:

TABLE II

| No. | Class |
|---|---|
| 1. | Random Objects |
| 2. | Linear Operator Modification |
| 3. | Object Modification |
| 4. | Domain and/or Dimension Modification |
| 5. | Coordinate System Modification |
| 6. | Identities and Partitions of Unity |

The listing of Table II is meant to be merely representative, it being understood that other forms and classes of disguises may alternatively or additionally be included as would occur to those skilled in the art. For example, those skilled in the art will appreciate that disguising operations such as domain mapping, logical identity substitution, and inserting redundant computations all are within the scope of the present invention.

The first class of disguises are random objects: numbers, vectors, matrices, permutations, or functions, to name a few. These objects are "mixed into" the computation in some way to disguise it, and are at least in part created from random numbers. If the numbers are truly random, then they should be saved in record 236 for use in the disguise and recovery of actual answer SA. If the random numbers come from a pseudorandom number generator, such as generators 232, then it is sufficient to save the seed and parameters of the generator in record 236.

Under some circumstances, it may be desirable to hide as much information as possible about the characteristics of the random number generation technique utilized. It should be appreciated that once the distribution characteristics are known, it may become easier to detect true data being obscured by the random numbers. For example, if random numbers generated uniformly in some interval centered at zero where each random number is added to a different entry of a large vector to be hidden, the random values would not do a good job of "hiding" the true values of the vector entries because the sum of the modified vector entries would be very close to the sum of the true value entries of the vector given the relationship of the random values to zero.

In one embodiment, rather than using a pseudorandom number generator with the same probability distribution for every random number utilized, the exact form of distribution used may be varied from one random value to the next. Thus, random number generators 232 each may have a different distribution to better hide their corresponding probabilistic characteristics. For this approach, random number generators 232 may further be arranged to provide a one-time random sequences. To illustrate, let four random number generators 232 be designated as: G1=a uniform generator with upper range and lower range parameters; G2=normal generator with mean and standard deviation parameters; G3=exponential generator with mean and exponent parameters; and G4=gamma generator with mean and shape parameters. Thus, for this illustration each generator G1-G4 has a different pair of distribution parameters. Twelve random numbers are selected. The first eight are the parameter pairs of the four generators G1-G4 and the other four are the $\alpha_1$, $\alpha_2$, $\alpha_3$, $\alpha_4$ coefficients used to create the one time random sequence, as indicated by expression (1) that follows:

$$\alpha_1 G1 + \alpha_2 G2 + \alpha_3 G3 + \alpha_4 G4 \qquad (1)$$

Note that in creating this one set of random numbers, a total of 16 numbers are used, the 8 generator parameters, the 4 coefficients $\alpha_1$-$\alpha_4$, and 4 seeds for generators G1-G4, respectively. In other embodiments, a different number and configuration of random number generators may be utilized to provide a desired set of random numbers, according to a desired level of security for a given problem. In an alternative embodiment, the desired level of security for a given problem may not require more than one random number generator to provide desired random objects. For still another embodiment, random numbers may not be used at all, instead utilizing other disguise operations according to the present invention. For this embodiment, generators 232 may be absent.

One way security techniques based on random numbers might be defeated includes a type of "statistical attack" that attempts to derive information about a given random number generator through matching the numbers to those produced by known random number generation techniques. Typically, the amount of processing needed to derive such information for robust random number generators is cost prohibitive. However, this type of attack may still be of concern in alternative embodiments where a higher level of security is desired—especially with the rapid advancement of computer processing technology making large scale generation of random numbers required for such an attack less costly.

Correspondingly, in addition to the one-time random sequence generation techniques previously described in connection with expression (1), the resistance of random number generators to a statistical attack in such alternative embodiments may be addressed by: (a) using random number generators 232 with real valued parameters having at least a 32 bit length whenever possible; (b) restarting random number generators 232 from time-to-time with new input values; and/or (c) changing the type of random number generators 232 used from time-to-time.

Another type of statistical attack is to attempt to determine the parameters of the probability distribution used to generate a group of random numbers. For this type, one can estimate the moments of the probability distribution by computing the moments of a collected sample of generated random numbers. The mean of the sample of size N converges to the mean of the distribution with an error that generally behaves according to $O(1/\sqrt{N})$; where the function $O(x)$ denotes "processing time on the order of x." Thus, the function $O(1/\sqrt{N})$ corresponds to processing time on the order of $1/\sqrt{N}$. While this rate of convergence is slow, a large sample with N=10,000,000 may be utilized to provide estimates of moments with accuracy of about 0.03%. An alternative embodiment may be arranged to address this parameter-based statistical attack by: (a) using random number generators 232 with complex probability distribution functions to increase the number of different moments that need the attacker needs to defeat the security; (b) restarting the random number generator from time-to-time with new input values such that the sequence size generated with a given value is restricted; (c) increase the number of parameters utilized to characterize the random number generator probability distribution function; and (d) using data values to generate seeds for random number generators and occasionally replacing randomly generated values by actual data values or other data dependent values.

Once random numbers have been provided using one or more of these embodiments, then random vectors, matrices, and arrays may be generated using standard techniques. Random objects with integer (or discrete) values, such as permutations, also can be created from random numbers using standard techniques.

Random objects may further include determining one or more random functions in accordance with a set of random numbers. One embodiment of a random function determination routine that may be provided in program 230 begins with the selection of the dimension or basis of a corresponding function space F. Typically the basis should be relatively high to promote a greater degree of security. For example, a basis of 10 or 30 functions for a high dimensional space F of functions may be selected. Next, a random point in F is determined with one or more generators 232 to obtain a random function. The selection of the basis and other parameters, such as the domain and range of the desired random functions should be selected to be compatible with the computation to be disguised and generally should have high linear independence when a stable inversion of disguised results DR is desired.

To provide space F as a one-time random space, the following process may be included in the routine:

(a) Define the domain of the computation to correspond to a box (interval, rectangle, box, or other corresponding construct depending on the selected dimension).

(b) Select a random rectangular grid in the box with 10 lines in each dimension and assure a minimum separation.

(c) Generate K sets of random function values at all the grid points (including the boundaries), one set for each basis function desired (these values are selected to be in a desired range).

(d) Interpolate these values by cubic splines to create K basis functions. The cubic splines may be formed in accordance with C. deBoor, *A Practical Guide to Splines*, SIAM Publications, (1978) which is hereby incorporated by reference in its entirety. It should be appreciated that cubic splines are smooth and have two continuous derivatives.

(e) Add a basis for quadratic polynomials to this set of K basis functions.

This approach can be modified to make many kinds of one-time random spaces of functions. If functions with local support are needed, the cubic splines may be replaced with Hermite quintics as described in deBoor. If it is desirable for the functions to vary more in one part of the domain than another, then the grid may be refined in the corresponding part. If it is desirable for the functions to be more or less smooth, then the polynomial degree and smoothness of the splines may be adjusted as appropriate, as described in deBoor. In still other embodiments, other techniques of random function generation may be utilized as would occur to those skilled in the art.

One way an attacker might try to defeat disguises based on random functions is through an "approximation theoretic attack." This type of attack can based on observations about the approximating power of the disguised functions. In one example, let $u(x)$ be an original function, and $f(x)$ be a disguise function in function space F such that $g(x)=u(x)+f(x)$ is observable by agent A. Agent A may evaluate $g(x)$ arbitrarily and, in particular, agent A might (if F were known) determine the best approximation $g^*(x)$ to $g(x)$ from F. Then the difference $g^*(x)-g(x)$ equals $u^*(x)-u(x)$ where $u^*(x)$ is the best approximation to $u(x)$ from F. Thus $g^*(x)-g(x)$ is entirely due to $u(x)$ and gives some information about $u(x)$.

An alternative embodiment arranged to address an approximation theoretic attack includes choosing F to have very good approximating power so that the size of $g^*(x)-g(x)$ is small. For example, if $u(x)$ is an "ordinary" function, then including in F the cubic polynomials and the cubic splines with 5 or 10 breakpoints (in each variable) generally improves approximation power. If $u(x)$ is not "ordinary" (e.g., is highly oscillatory, has boundary layers, has jumps or peaks) then including functions in F with similar features reduces the ability of agent A to discover information about $u(x)$ from $g(x)$. Another aspect that makes this kind of attack more difficult is to establish F as a one-time random space as previously described. For this aspect, because F itself is then unknown, the approximation $g^*(x)$ cannot be computed accurately and any estimates are correspondingly less uncertain. Still a further aspect is to approximate the function object $u(x)$ with high accuracy, such as a variable breakpoint piecewise polynomial, and adding one or more disguise functions with the same breakpoints and different values. Yet, in other embodiments, it may not be desired to take additional measures to address a statistical attack, an approximation theoretic attack, or both.

The second class of disguise operations include linear operator modification, where the operator equation is of the form $Lu=b$. For example, the linear and differential equations of the following expressions (2) and (3), respectively, are of this form:

$$\text{linear equations: } Ex=b \tag{2}$$

$$\text{differential equations: } y''+\cos(x)y'+x^2y=1-xe^{-x} \tag{3}$$

This second class of disguises exploits linearity by randomly choosing v that is the same type of mathematical object as u, and then solving $L(u+v)=b+Lv$, where $Lv$ is evaluated to be the same mathematical object type as b. In one embodiment, v is selected to be a combination of a random function and functions that already appear in the equation. For example, one could choose $v(x)$ in the above differential equation (3) to be $v_{Ran}(x)+4.2\cos(x)-2.034xe^{-x}$; where $v_{Ran}$ (x) is the random function component. In still other embodiments, different substitutions may be made as would occur to those skilled in the art.

A third class of disguise operations modify various mathematical objects of the computation to be outsourced. Such modifications may include addition or multiplication to disguise the computation. One example of an objection modification disguise is to add a random function to an integral as exemplified by expression (4) that follows:

$$\int_0^1 \sqrt{x} \cos(x+3) \qquad (4)$$

In another example of object modification, the solution of the Ex=b may be disguised by multiplying with 2 random diagonal matrices, $D_1$ and $D_2$, to provide $B=D_1ED_2$ with subsystem 30; where E is an n×n matrix and b is a corresponding vector of n. The resulting matrix B is then provided as part of the outsourced computation of expression (5) as follows:

$$By=D_1b \qquad (5)$$

The solution x is then obtained from $x=D_2y$.

In a fourth class of disguises, the domain or dimensions, are modified. Modification techniques may include expansion, restriction, splitting or rearrangement. In an example of expansion, the evaluation of the integral of expression (6) that follows:

$$\int_0^1 \sqrt{x} \cos(x+3) \qquad (6)$$

or solution of the problem of related type on [3,5] as shown in expression (7) that follows:

$$y'(x)=(x+y)e^{-xy}, y(3)=1 \qquad (7)$$

can be modified by expanding [0,1] to [0,2] and [3,5] to [2,5], respectively. In the case of expression (6), a random function u(x) is selected from function space F with u(1)=cos(4); it is integrated on [1,2]; and $\sqrt{x}$ cos(x+3) is extended to [0,2] using u(x). In the second case of expression (7), a random function u(x) is selected from function space F with u(3)=1 and u'(3)=4e$^{-3}$. Its derivative u'(x) and its value u(2) are computed, and the following expressions (8) is solved with initial condition y'(2)=u'(2):

$$y'(x) = (x+y)e^{-xy} \quad \text{on } [3,5] \qquad (8)$$
$$= u'(x) \quad \text{on } [2,3]$$

In an example of restriction, the dimension of a linear algebra computation is decreased by performing a part of it with subsystem 30, and outsourcing the rest. For example, in solving Ex=b, (where E is an n×n matrix and b is a corresponding vector of dimension n), one of the unknowns is selected and eliminated by Gauss elimination at random by customer C (subsystem 30); and the remaining computation is then sent to the agent A (computing center 50). Correspondingly, the order of the matrix changes by 1 and, further, it modifies all the remaining elements of E and b.

In an example of splitting, a problem is partitioned into equivalent subproblems by splitting the domain. In the case of quadrature, this technique may be readily applied. The linear algebra problem Ax=b, (where A is an n×n matrix and b is a corresponding vector of dimension n), can be split by partitioning in accordance with the following expression (9):

$$A = \begin{pmatrix} A_{11} & A_{12} \\ A_{21} & A_{22} \end{pmatrix} \qquad (9)$$

and creating two linear equations as shown in following expressions (10) and (11):

$$A_{11}x_1=b_1-A_{12}x_2 \qquad (10)$$
$$(A_{22}-A_{21}A_{11}^{-1}A_{12})x_2=b_2-A_{11}^{-1}b_1 \qquad (11)$$

In another example, the differential equation problem of the following expression (12):

$$y'(x)=(x+y)e^{-xy} \text{ and } y'(3)=1 \text{ on } [3,5] \qquad (12)$$

can be split into the expressions (13) and (14) that follow:

$$y'(x)=(x+y)e^{-xy} y'(3)=1, \text{ on } [3,4] \qquad (13)$$
$$y'(x)=(x+y)e^{-xy} y'(4)=\text{as computed, on } [4,5] \qquad (14)$$

Accordingly, splitting may be utilized to disguise different computation parts in different ways.

A fifth class of disguise operations include utilizing one or more coordinate system changes. A related disguise for discrete problems, such as a linear algebra computations, are permutations of the corresponding matrix/vector indices. Coordinate system changes have been found to be particularly effective for enhancing security of outsourced computations concerning optimization and solutions to nonlinear systems. For example, consider the two-dimensional partial differential equation (PDE) problem of the following expressions (15):

$$\nabla^2 f(x,y) + (6.2 + 12\sin(x+y))f = g_1(x,y) \quad (x,y) \text{ in } R \qquad (15)$$
$$f(x,y) = b_1(x,y) \quad (x,y) \text{ in } R_1$$
$$f(x,y) = b_2(x,y) \quad (x,y) \text{ in } R_2$$
$$\frac{\partial f(x,y)}{\partial x} + g_2(x,y)f(x,y) = b_3(x,y) \quad (x,y) \text{ in } R_3$$

where $R_1$, $R_2$, and $R_3$ comprise the boundary of R. To implement the change of coordinates, u=u(x,y), v=v(x,y), one must be able to invert the change, that is find the functions x=x(u,v), y=y(u,v) and compute derivatives needed in the PDE as given in the following expression (16):

$$\frac{\partial^2 f}{\partial x^2} = \frac{\partial^2 f}{\partial u^2}\left(\frac{\partial^2 u}{\partial x^2}\right)^2 + \frac{\partial f}{\partial u}\frac{\partial^2 u}{\partial x^2} + \frac{\partial^2 f}{\partial v^2}\left(\frac{\partial v}{\partial x}\right)^2 + \frac{\partial f}{\partial v}\frac{\partial^2 u}{\partial x^2} \qquad (16)$$

The change of coordinates produces an equivalent PDE problem on some domain D in (u,v) space of the form given by the following expression (17):

$$\sum_{i,j=0}^{2} a_{ij}(u,v) \frac{\partial^i \partial^i}{\partial u^i \partial u^j} f(u,v) = h_1(u,v) \quad (u,v) \in S \quad (17)$$

$$f(u,v) = c_1(u,v) \quad (u,v) \in S_1$$

$$f(u,v) = c_2(u,v) \quad (u,v) \in S_2$$

$$d_1(u,v)\frac{\partial f(u,v)}{\partial u} + d_2(u,v)\frac{\partial f(u,v)}{\partial v} + d_3(u,v)f(u,v) = c_3(u,v) \quad (u,v) \in S_3$$

where $S_1$, $S_2$, and $S_3$ are the images of $R_1$, $R_2$, and $R_3$, and the functions $a_{ij}(u,v)$, $h_i(u,v)$, $c_i(u,v)$, $d_i(u,v)$ are obtained from substituting in the changes of variables and collecting terms.

There are a number of coordinate changes where the inverse is known explicitly. In cases where the availability of this knowledge may unacceptably compromise security, other coordinate changes may be utilized by determining the inverse numerically. In one embodiment, the procedures described to create one-time coordinate changes using parameterized mappings with randomly chosen parameters in C. J. Ribbens, *A Fast Adaptive Grid Scheme for Elliptic Partial Differential Equations*, ACM Trans. Math. Softw., 15, (1989), 179-197; or C. J. Ribbens, *Parallelization of Adaptive Grid Domain Mappings, In Parallel Processing for Scientific Computing*, (G. Rodrique, ed.), SIAM, Philadelphia, (1989), 196-200) may be utilized to numerically determine inverses for this class of disguise, and are hereby incorporated by reference in their entirety herein. In one variation of this embodiment, coordinate changes in the variables are made independently such as: u=u(x) and v=v(y).

A sixth class of disguises include substitution with equivalent mathematical objects, such as identities, and partitions of unity. It has been found that this type of disguise improves security even when random objects are readily separated from "actual" objects of a given computation.

Examples of identities that might be utilized in this way include the following collection of expressions (18):

$a^2 - ax + x^2 = (a^3 + x^3)/(a-x)$ $\log(xy) = \log x + \log y$ $1 + x = (1-x^2)/(1-x)$ $\sin(x+y) = \sin x \cos y + \cos x \sin y$ $\cos^2 x = \sin^2 y + \cos(x+y) \cos(x-y)$ $p \cos x + q \sin(y) = \sqrt{p^2+q^2} \cos(x - \cos^{-1}(p/\sqrt{p^2+q^2}))$ $\sin(3(x+y)) = 3 \sin(x+y) - 4 \sin^3(x+y)$ (18)

Thus, if any component of these identities appears symbolically in a computation, the equivalent expression can be substituted to disguise the problem. A general source of useful identities for this class of disguise comes from the basic tools for manipulating mathematics, e.g., changes of representation of polynomials (power form, factored form, Newton form, Lagrange form, orthogonal polynomial basis, etc.), partial fraction expansions or series expansions. Other relations that may be useful in disguises of this kind include the Gamma, Psi, and Struve functions as respectively defined by expressions (19)-(21) as follows:

$\Gamma(x+1) = x\Gamma(x);$ (19)

$\psi(x+1) = \psi(x) + 1/x;$ and (20)

$H_{1/2}(x) = (2/\pi x)^{1/2}(1 - \cos x).$ (21)

The functions of expressions (19)-(21) can be combined with selected expressions (18) to provide the following identity expressions (22) and (23):

$\sin(x) = [\sin(\psi(1+1/x) + x) - \sin(\psi(1/x))\cos x]/\cos(\psi(1/x))$ (22)

$\log(x) = \log \Gamma(x) + \log(\Gamma(x=1)H_{1/2}(x)) - \log(1 - \cos x) + \frac{1}{2} \log(\pi x/2)$ (23)

Identities that are equal to 1 are generally referred to as partitions of unity. Partitions of unity can be readily used in a given computation. Examples of this form of identity are collected as the following expressions (24):

$\sin^2 x + \cos^2 x = 1$ $\sec^2(x+y) - \tan^2(x+y) = 1$ $(\tan x + \tan y)/\tan(x+y) + \tan x \tan y = 1$ $b_1(r,x) + b_2(r,s,x) + b_3(r,s,x) + b_4(s,x) = 1$ (24)

where the $b_i$ are "hat" functions defined by:

$b_1(r,x) = \max(1 - x/r, 0)$ $b_2(r,s,x) = \max(0, \min(x/r, (s-x)/(s-r)))$ $b_3(r,s,x) = \max(0, \min((x-r)/(s-r), (1-x)/(1-s)))$ $b_4(x,s) = \max(0, (x-s)/(1-s))$ each of which is a piecewise linear function with breakpoints at 0, r, s, and/or 1. Generalizations of this partition of unity are known for an arbitrary number of functions, arbitrary polynomial degree, arbitrary breakpoints, and arbitrary smoothness (less than the polynomial degree). Partitions of unity facilitate the introduction of unfamiliar and unrelated functions into symbolic expression. Thus the second partition of expressions (24) above becomes the following expression (25):

$\sec^2(y_7(x) + u(1.07296, x)) - \tan^2(y_7(x) + u(1.07296, x)) = 1$ (25)

where $y_7(x)$ is the Bessel function of fractional order and $u(1.07296, x)$ is the parabolic cylinder function. R. F. Boisvert, S. E. Howe, and D. K. Kahaner, *Guide to Available Mathematical Software (GAMS): A Framework for the Management of Scientific Software*, ACM Trans. Math. Software, 11, (1995), 313-355, lists 48 classes of functions which can be used in such identities and for which library software is available, and is hereby incorporated by reference.

Further, disguises may be enhanced by using functions and constants that appear in the actual arguments AA. Thus, if 2.70532, $x^2$, $\cos(x)$, and $\log(x)$ initially appear in an ordinary differential equation, one could use identities that involve these objects or closely related ones, e.g., 1.70532, $2x^2-1$, cos(2x); or log (x+1). Because of the difficulty in establishing identities, it is expected that using several identities in a mathematical model provides a corresponding increase in the degree of security. Further, one-time identities may be provided. For example, there are several library programs to compute the best piecewise polynomial approximation to a given function f(x) with either specified or variable breakpoints as described in C. deBoor and J. R. Rice, *An Adaptive Algorithm for Multivariate Approximation Giving Optimal Convergence Rates*, J. Approx. Theory, 25, (1979), 337-359; and C. deBoor, *A Practical Guide to Splines*, SIAM Publications, (1978), that are hereby incorporated by reference in their entirety herein. It should be appreciated that with these techniques, the number of breakpoints and/or polynomial degrees can be increased to provide arbitrary precision in these approximations. Thus, given the following expression (26):

$$f(x) = \sin(2.715x + 0.12346)/(1.2097 + x^{1.07654}) \qquad (26)$$

or that f(x) is computed by a 1000 line code, one can use these library routines to replace f(x) by a code that merely evaluates a piecewise polynomial with "appropriate" coefficients and breakpoints. One time identities may also use the classical mathematical special functions that have parameters, e.g., incomplete gamma and beta functions, Bessel function, Mathieu functions, spheroidal wave functions, and parabolic cylinder functions as further described in M. Abramowitz and I. A. Stegun, *Handbook of Mathematical Functions, Appl. Math. Series* 55, *National Bureau of Standards*, U.S. Govt. Printing Office, (1964) that is hereby incorporated by reference in its entirety herein.

Having described a few different classes of disguises as listed in Table II, it should be appreciated that this description is not intended to be exclusive; it being understood that other types of disguises as would occur to those skilled in the art also are contemplated. Further, while in some embodiments it is desirable to apply only one particular disguise operation prior to outsourcing, in other embodiments it may be desirable to enhance the degree of security by applying multiple disguise operations. Indeed, for a given type of outsourced computation, within each class of Table II there may be several or many disguises that can be simultaneously utilized with or without disguises of one or more other classes. Likewise, some classes of disguises in library 234 may be better suited to obscure or hide the actual arguments AA for a given type of outsourced computation than others. For example, it has been found that coordinate system changes are one of the more effective disguises for outsourced computations involving optimization and solutions of nonlinear systems.

The selection of one or more disguises from library 234 and construction of a multiple disguise procedure may be based on several factors. One factor is the motivation to outsource. If the motivation includes a relative savings in processing time, then the time taken to perform operations 220, 260 should not defeat such savings. For example, if the problem domain involves n×n matrices, then an operation count for operations 220, 260 on the order of $n^2$ might be acceptable to provide security for an outsourced computation that has an operation count on the order of $n^3$, as is commonly associated with matrix inversion and multiplication. However, if the motivation concerns other matters such as availability of software or programming expertise, the relative processing time may be unimportant. Moreover, it should be understood that the invention is not intended to be limited to a particular motivation or relative distinction regarding the outsourced computation.

Another factor is the invertability of the disguised result DR once the outsourced computation is completed. For example, it may be desired that the disguise be fully invertible that is, after the disguise is applied and the disguised computation made, an actual answer SA may be recovered that corresponds to actual arguments AA. Still, in other embodiments, it may only be desired that an approximated recovery be performed, so that the degree of recovery of actual answer SA may vary.

Still another factor is the degree of security afforded by a given form of disguise. Ideally, once a given disguise is applied, agent A (computing center 50) should not be able to discover either the original computation or its result; however, in practice, the level of security utilized may vary for a given situation. Yet another factor to consider is the relative cost of a particular disguise procedure. Generally, this operates as a trade-off with the degree of security sought.

Program 230 is arranged to provide sequencing control of a disguise, outsourcing, retrieval, and disguise inversion actions. As part of operation 220 shown in FIG. 3, program 230 receives the actual arguments AA as input 222 and the type of computation selected to be outsourced as input 224. In response, program 230 selects one or more disguise operations from library 234 in accordance with a suitable disguise procedure for inputs 222, 224.

Program 230 may include a number of predetermined disguise procedures based on input 222 and/or input 224, operator input, one or more routines to synthesize a suitable procedure, or a combination of these.

In one embodiment, a routine to synthesize or suggest the disguise procedure may be determined, at least in part, from inputs corresponding to one or more of the previously described factors listed as follows: (a) outsourced computation type, (b) type/quantity of actual arguments, (c) processing constraints of subsystem 30 (such as the amount of preparation/recovery processing to be performed by subsystem 30), (d) motive for outsourcing, (e) degree of security desired, and (f) cost constraints. In still other embodiments, these factors may not be considered by program 230. Indeed, in one alternative embodiment, the particular disguise procedure is completely manually entered by an operator.

Once the disguise procedure is determined, program 230 constructs the disguised arguments DA using the selected disguise operations from library 234. Program 230 also coordinates the storage of appropriate disguise parameters in outsourced computation record 236 for later retrieval to recover the actual answer SA. Among its disguise operation routines, program 230 includes one or more routines to provide appropriate random objects with random number generators 232 as needed for a particular disguise procedure. A record 236 is maintained by program 230 for each outsourced computation at least until a result is received and processed via operation 260. Typically, the recorded parameters include relevant random numbers or corresponding keys for one or more random numbers, the selected disguise operations applied, a reference to actual arguments AA corresponding to the given outsourced computation, and such other information as required to recover actual answer SA. After the disguised arguments DA are created, they are sent to the selected agent A, such as computing center 50, as output 250.

Depending on a given disguise procedure, a substantial number of "keys" may be needed to reconstruct an actual answer SA from a disguised result DR. For example, if a significant number of random objects are used, random number generator parameters, generator seeds, related coefficients, and/or perhaps the random numbers themselves may be maintained in a corresponding record 236. It may be desirable to avoid keeping and labeling these keys individually. In one alternative embodiment of program 230, a "master key" is created that may be stored in record 236 in lieu of a large number of keys for a given outsourced computation. This master key is provided to create an arbitrary number of derived keys or "sub-keys." For this embodiment, let K be the master key and $k_i$, i=1,2, . . . ,N, be the sub-keys (where "i" is an integer index variable). The sub-keys $k_i$ are derived from K by a procedure P such as the following:

(a) represent K as a long bit string (a 16 character key K generates 128 bits using ASCII notation);

(b) generate a bit string of length 128 bits with a random number generator G for each i=1,2, . . . ,N; and (c) apply the randomly generated bit string of length 128 as a mask on the representation of K—select those bits of K where the random bit is one.

Thus, with a single key K and a random number generator G (such as one of generators 232), we can create many sub-keys. It should be appreciated that for procedure P, each $k_i$ is easily derived from K; however, knowledge of even a substantial set of the $k_i$ gives no information about K even if the generation procedure P is known. Correspondingly, because many of the sub-keys may be seeds or parameters for random number generators, large sets of random numbers can be used with a reduced risk of revealing the master key or other sub-keys even if a statistical attack on this aspect of the disguise is successful.

Referring to FIG. 4, program 230 receives disguised result DR from computing center 50 as input 262. Program 230 references the corresponding record 236 to determine the processing needed to recover actual answer SA from the disguised result DR. The actual answer SA is provided as output 264 by program 230.

Having described process 120 and operations 220, 260, the following examples of different types of outsourced computations are described, it being understood that these examples are merely illustrative and should not be considered limiting or restrictive in character. These examples are described in terms of system 20 and process 120; however, other systems and processes may be utilized to execute these examples as would occur to those skilled in the art. Further, it should be understood that program 230 may include instructions or routines in accordance with one or more of the disguise operations of these examples, but one or more different programs and/or operator input of one or more operations may be utilized. Likewise, computer 52 of computing center 50 may be programmed to execute the outsourced computations associated with these examples, or different agents A may be used for the various procedures described in the examples.

EXAMPLE ONE

Matrix multiplication of two n×n matrices $M_1$ and $M_2$ may be readily disguised in accordance with a first example of the present invention designated as disguise procedure DP1. Matrices $M_1$ and $M_2$ are the actual arguments AA to be outsourced. For DP1, the Kronecker delta function, $\delta_{xy}$, is utilized which equals 1 if x=y, and 0 if x≠y. Subsystem 30 performs the following stages a.-c. to prepare disguised arguments DA in accordance with DP1:

a. creates (i) three random permutations π1, π2, and π3 of the integers {1,2, . . . ,n}, and (ii) three sets of non-zero random numbers $\{\alpha_1, \alpha_2, \ldots, \alpha_n\}$, $\{\beta_1, \beta_2, \ldots \beta_n\}$, and $\{\gamma_1, \gamma_2, \ldots, \gamma_n\}$;

b. creates matrices $P_1$, $P_2$, and $P_3$ where $P_1(i,j)=\alpha_i\delta_{\pi1(i)j}$, $P_2(i,j)=\beta_i\delta_{\pi2(i)j}$, and $P_3(i,j)=\gamma_i\delta_{\pi3(i)j}$ (these matrices are readily invertible, e.g., $P_1^{-1}{}_{j=(\alpha_j)^{-\delta}{}_{\pi1}{}_{(i)}{}^{-1}}$); and c. computes the matrix $X=P_1M_1P_2^{-1}$ (such that $X_{(i,j)}=(\alpha_i/\beta_j)M_1(\pi1(i),\pi2(j)))$, and $Y=P_2M_2P_3^{-1}$.

Matrices X and Y define the disguised arguments DA for DP1. Subsystem 30 sends the matrices X and Y to computing center 50. Computing center 50 determines the product $Z=XY=(P_1M_1P_2^{-})(P_2M_2P_3^{-1})=P_1M_1M_2P_3^{-1}$ and sends matrix Z back to subsystem 30. Matrix Z is the disguised result DR for DP1.

Subsystem 30 computes locally, in $O(n^2)$ time, the matrix $P_1^{-1}ZP_3$, which equals $M_1M_2$, the actual answer SA; where the function $O(n^2)$ represents processing time on the order of and proportional to $n^2$. It should be appreciated that the outsourced computation by computing center 50 for DP1 requires processing time proportional to $n^3$ as represented by $O(n^3)$.

EXAMPLE TWO

At the expense of more complex disguise preparation by subsystem 30, a greater degree of security may be provided in a second matrix multiplication example designated as disguise procedure DP2. For DP2, subsystem 30 performs the following stages a.-c a. compute matrices $X=P_1M_1P_2^{-1}$ and $Y=P_2M_2P_3^{-1}$ in accordance with disguise procedure DP1;

b. select two random n×n matrices $S_1$ and $S_2$ and generate four random numbers β, γ, β', γ' such that (β+γ)(β'+γ')(γ'β−γβ')≠0; and c. compute the six matrices $X+S_1, Y+S_2, \beta X-\gamma S_1, \beta Y-\gamma S_2, \beta'X-\gamma'S_1, \beta'Y-\gamma'S_2$.

The following three matrix multiplications are then outsourced by subsystem 30 to computing center 50:

$$W=(X+S_1)(Y+S_2); \quad (a)$$

$$U=(\beta X-\gamma S_1)(\beta Y-\gamma S_2); \text{ and} \quad (b)$$

$$U'=(\beta'X-\gamma'S_1)(\beta'Y-\gamma'S_2) \quad (c)$$

The results are returned by computing center 50 to subsystem 30. Subsystem 30 then locally computes matrices V and V'; where $$V=(\beta+\gamma)^{-1}(U+\beta\gamma W), \text{ and}$$

$$V'=(\beta'+\gamma')^{-1}(U'+\beta'\gamma'W)$$

It will be appreciated by those of skill in the art that:

$$V=\beta XY+\gamma S_1S_2, \text{ and}$$

$$V'=\beta XY+\gamma'S_1S_2$$

Subsystem 30 outsources the computation: $(\gamma'\beta-\gamma\beta')^{-1}(\gamma'V-\gamma V')$ as the disguised arguments DA which equal the product XY. Computing center 50 returns the remotely computed matrix product XY (the disguised result DR); and subsystem 30 computes $M_1M_2$ from XY according to: $P_1^{-1}XYP_3=P_1^{-1}(P_1M_1P_2^{-1})(P_2M_2P_3^{-1})P_3=M_1M_2$.

EXAMPLE THREE

Disguise procedure DP3 as follows provides a third example of a disguised outsourced matrix multiplication. DP3 utilizes DP2 and further imposes control on the length of random number sequences generated to provide a more robust random number generator disguise. For DP3, subsystem 30 defines L as the maximum length for a sequence from a random number generator so that M=[m/L] is the number of distinct random number generators 232 needed. Let G(A(i)), i=1,2...,M be one-time random number generators. Each random generator has a vector A(i) of 12 parameters/seeds. Correspondingly, non-zero vectors are provided for the three matrices $P_1$, $P_2$, $P_3$ used to disguise $M_1$ and $M_2$. Computing center 50 receives $X=P_1M_1P_2^{-1}$ and $Y=P_2M_2P_3^{-1}$ for the outsourced multiplication and returns matrix Z to subsystem 30. This approach further hampers the ability to successfully impose a statistical attack. Further, as long as computing center 50 is without information about $M_1$ and $M_2$, it appears a statistical attack is the only type of attack available.

EXAMPLE FOUR

In a fourth example, disguise procedure DP4 for the multiplication of non-square matrices is utilized; where $M_1$ is k×m and $M_2$ is m×n, and hence: $M_1M_2$ is k×n. For DP4, any of the procedures DP1, DP2, DP3 may be utilized with the sizes of the $P_i$ and $S_i$ matrices being selected accordingly. For matrices $S_i$ of DP2 or DP3, $S_1$ is of k×m dimension and $S_2$ is of m×n dimension, because each of $S_1$ and $S_2$ is added to matrices having such dimensions. For the matrices $P_i$ it should be appreciated that $P_i$ is constrained to be: (i) square so that it may be inverted, (ii) sized to be compatible with the number of rows of the matrices that it (or its inverse) left-multiplies, and (iii) sized to be compatible with the number of columns of the matrices that it (or its inverse) right-multiplies. For example, as $P_2$ is used for left-multiplying $M_2$, and $M_2$ has m rows, $P_2$ should be m×m. The constraint that $P_2^{-1}$ right-multiplies $M_1$ is compatible with the previous one, because $M_1$ has m columns.

EXAMPLE FIVE

In a fifth example, dimension hiding is included for an outsourced matrix multiplication as disguise procedure DP5. For DP5, subsystem 30 defines $M_1$ with dimension a×b matrix and $M_2$ with dimension b×c matrix. Two or more matrix multiplications using one of the previously described matrix multiplication procedures DP1-DP4 are performed instead of just one. These substitute multiplications are performed with matrices having dimensions a', b', c' that are different from a, b, c. Hiding the dimensions can be done by either enlarging or shrinking one (or a combination of) the relevant dimensions. A dimension a is "enlarged" if a'>a, and "shrunk" if a'<a (similarly for b, b', c, and c'). Although for convenience enlargement and shrinking are described separately, it should be understood that these operations alternatively can be done in combination.

Enlarging a (so that it becomes a'>a) is performed by subsystem 30 by appending a'–a additional rows, having random entries, to matrix $M_1$. As a result, product $M_1M_2$ has a'–a additional rows that may be ignored. Enlarging c (so that c'>c) is performed by subsystem 30 by appending c'–c additional columns, having random entries, to matrix $M_2$, causing the resulting product of $M_1M_2$ to have c'–c additional columns that may be ignored.

Alternatively or additionally, subsystem 30 may enlarge vector b by appending b'–b extra columns to the first matrix and b'–b extra rows to the second matrix. It should be appreciated that these additional rows and columns cannot have completely random entries because they may interact to corrupt the outsourced calculation result. Accordingly, to avoid any corruption, subsystem 30 preserves the dimensions of the resulting product matrix $M_1M_2$ by: (a) numbering the b'–b extra columns 1,2,...,b'–b, and similarly numbering the extra rows 1,2,...,b'–b; (b) selecting the entries of the odd-numbered extra columns and rows to be random and zero, respectively; and (c) selecting the entries of the even-numbered extra columns and rows to be zero and random, respectively. These operations assure that enlarging b does not cause a change in the matrix product $M_1M_2$. For embodiments that enlarge b in conjunction with enlargements of a and/or c, the enlargement of b is preferably performed first.

Dimensional shrinking of a may be performed as part of DP5 with subsystem 30 by partitioning the first matrix $M_1$ into two matrices: $M_1'$ having the first a'–a rows and $M_1''$ having the last a' columns. Matrix $M_2$ stays the same, but to get the a×c matrix, both products $M_1'M_2$ and $M_1''M_2$ are outsourced. Dimensional shrinking of c is performed by partitioning the second matrix $M_2$ into two matrices: $M_2'$ having the first c'–c columns and $M_2''$ having the last c' columns. Matrix $M_1$ stays the same, but to get the a×c matrix, both products $M_1M_2'$ and $M_1M_2'$ are outsourced.

Additionally or alternatively, DP5 may include dimensional shrinking of b. Subsystem 30 shrinks b by partitioning both matrices $M_1$, $M_2$ into two matrices. Matrix $M_1$ is partitioned into matrix $M_1'$ having the first b–b' columns and matrix $M_1''$ having the last b' columns. Matrix $M_2$ is partitioned into matrix $M_2'$ having the first b–b' rows and matrix $M_2''$ having the last b' rows. The a×c product matrix sought is then $M_1'M_2'+M_1''M_2''$.

DP5 also optionally includes performing the three above shrinking operations together. This option results in a partition of each of matrices $M_1$, and $M_2$ into four matrices.

Using, for example, the notation $M_1([i:j], [k:n])$ for the submatrix of $M_1$ whose rows are in the interval [i:j] and whose columns are in the interval [k:n], then computing $M_1M_2$ requires the following four computations (a)-(d):

$$M_1([1:a-a'],[1:b-b'])M_2([1:b-b'],[1:c-c'])+ \\ M_1([1:a-a'],[b-b'+1:b])M_2([(b-b'+1:b],[1:c-c']); \quad (a)$$

$$M_1([1:a-a'],[1:b-b'])M_2([1:b-b'],[c-c'+1:c])+ \\ M_1([1:a-a'],[b-b'+1:b])M_2([b-b'+1:b],[c-c'+1:c]); \quad (b)$$

$$M_1([a-a'+1:a],[1:b-b'])M_2([1:b-b'],[1:c-c'])+ \\ M_1([a-a'+1:a],[b-b'+1:b])M_2([b-b'+1:b],[1:c-c']); \text{ and} \quad (c)$$

$$M_1([a-a'+1:a],[1:b-b'])M_2([1:b-b'],[c-c'+1:c])+M_1 \\ ([a-a'+1:a],[b-b'+1:b])M_2([b-b'+1:b],[c-c'+1:c]). \quad (d)$$

EXAMPLE SIX

In a sixth example, a secure matrix inversion disguise procedure DP6 is provided for matrix M; where the entries of matrix M are the actual arguments AA. For DP6, the following stages a.-j. are performed:

a. Subsystem 30 selects a random n×n matrix S.

b. Subsystem 30 securely outsources the matrix computation C=MS by executing one of the previously described procedures DP1-3 or DP5 as a subroutine of DP6.

c. Subsystem 30 generates matrices $P_1$, $P_2$, $P_3$, $P_4$, $P_5$ using the same method as for the $P_1$ matrix of DP1. That is, $P_1(i,j)=a_i\delta_{\pi1(i),j}$; $P_2(i,j)=b_i\delta_{\pi2(i),j}$; $P_3(i,j,)=c_i\delta_{\pi3(i),j}$; $P_4(i,j)=d_i\delta_{\pi4(i),j}$; and $P_5(i,j)=e_i\delta_{\pi5(i),j}$; where π1, π2, π3, π4, π5 are random permutations, and where $a_i$, $b_i$, $c_i$, $d_i$, $e_i$ are random numbers.

d. Subsystem 30 computes the matrices: $Q=P_1\hat{C}P_2^{-1}=P_1MSP_2^{-1}$ and $R=P_3SP_4^{-1}$.

e. Subsystem 30 outsources the computation of $Q^{-1}$ to computing center 50.

f. If computing center 50 succeeds in determining $Q^{-1}$, it returns $Q^{-1}$ to subsystem 30; otherwise computing center 50 to subsystem 30 that indicates Q is not invertible. If this indication is received by subsystem 30, it tests whether:
  (i) S is invertible by first computing $\hat{S}=S_1SS_2$, where $S_1$ and $S_2$ are matrices known to be invertible, and outsources matrix $\hat{S}$ to computing center 50 for inverting. It should be understood that the only interest is whether $\hat{S}$ is invertible or not, not in its actual inverse. The fact that S is discarded makes the choice of $S_1$ and $S_2$ less crucial; however, choosing $S_1$ and $S_2$ to be the identity matrices may not be desirable because it may make it easier to learn how the random matrices are generated.
  (ii) If computing center 50 can invert $\hat{S}$, then S is invertible, and hence M is not invertible. If the computing center 50 indicates $\hat{S}$ is not invertible, then S is not invertible. In that case, operations (a)-(f) of DP6 are repeated with a different S.

g. If Q is invertible, then, in accordance with the observation that $Q^{-1}=P_2S^{-1}M^{-1}P^{-1}$, subsystem 30 computes the matrix $T=P_4P_2^{-1}Q^{-1}P_1P_5^{-1}$ which is equal to $P_4S^{-1}M^{-1}P_5^{-1}$.

h. Subsystem 30 outsources the computation of Z=RT to computing center 50 which serve as disguised arguments DA. One of DP1-DP3 or DP5 may be utilized as a subroutine for this operation.

i. Computing center 50 returns Z, the disguised result DR, to subsystem 30.

j. Observing that $Z=P_3SP_4^{-1}P_4S^{-1}M^{-1}P_5^{-1}=P_3M^{-1}P_5^{-1}$, subsystem 30 computes $P_3^{-1}ZP_5$, which equals $M^{-1}$, the actual answer SA.

EXAMPLE SEVEN

In a seventh example, dimensional hiding is incorporated into secure matrix inversion in disguise procedure DP7. For DP7, hiding dimension n for matrix inversion may be achieved by: (a) using the dimension-hiding version of matrix multiplication described in connection with procedure DP5, and (b) modifying stage "f." of DP6 to perform the inversion of Q by inverting a small number of n'×n' matrices where n' differs from n. Otherwise DP7 is performed the same as DP6. DP7 provides an option of enlarging the dimension of Q, (i.e., n'>n) for which stage "f." of DP6 is modified to invert one n'×n' matrix Q' defined as follows; where the matrices O', O'' are of n×(n'−n) and (n'−n)×n dimension, respectively, and all of whose entries are zero, and S' is an (n'−n)×(n'−n) random invertible matrix:

$Q'([1:n],[1:n])=Q;$ $Q'([1:n],[n+1:n'])=O';$ $Q'([n+1:n'],[1:n])=O'';$ and $Q'([n+1:n'],[n+1:n'])=S'.$ It should be understood that the inversion of Q' is not performed by sending it directly to computing center 50, as the zeros in it may reveal n. Rather, the inversion of Q is performed in accordance with DP6.

Dimension shrinking may optionally be included in DP7 based on the premise that if X=Q([1:m],[1:m]) is invertible (m<n), Y=Q([m+1:n],[m+1:n]); V=Q([1:m], [m+1:n]); W=Q([m+1:n], [1:m]); and $D=Y-WX^{-1}V$ is invertible, then:

$Q^{-1}([1:m],[1:m])=X^{-1}+X^{-1}VD^{-1}WX^{-1};$ $Q^{-1}([1:m],[m+1:n])=-X^{-1}VD^{-1};$ $Q^{-1}([m+1:n],[1:m])=-D^{-1}WX^{-1};$ and $Q^{-1}([m+1:n],[m+1:n])=D^{-1}.$ Correspondingly, for DP7, Q is partitioned into four matrices X, Y, V, W. One of the secure matrix multiplication techniques DP1-DP3 or DP5 and the secure matrix inversion of procedure DP6 are utilized to determine the four pieces of $Q^{-1}$.

EXAMPLE EIGHT

In an eighth example of the present invention, secure outsourcing of a linear system of equations is provided as disguise procedure DP8. For a linear system of equations, the actual arguments may be represented in the form Mx=b; where M is a square n×n matrix, b is a vector of dimension n, and x is a vector of n unknowns. For DP8, the following stages a.-e. are performed:

a. Subsystem 30 selects a random n×n matrix B and a random number $j \in \{1,2,\ldots,n\}$ and replaces the $j^{th}$ row of B by b such that: $B=[B_1, \ldots B_{j-1}, b, B_{j+1}, \ldots, B_n]$.

b. Subsystem 30 generates matrices $P_1$, $P_2$, $P_3$ using the same method as for the $P_1$ matrix in DPI, such that $P_1(i,j)=a_i\delta_{\pi 1(i),j}$; $P_2(i,j)=b_i\delta_{\pi 2(i),j}$; $P_3(i,j)=c_i\delta_{\pi 3(i),j}$; where π1, π2, π3 are random permutations, and where $a_i$, $b_i$, $c_i$, are random numbers.

c. Subsystem 30 computes the matrices $\hat{C}=P_1MP_2^{-1}$ and $\hat{G}=P_1BP_3^{-1}$.

d. Subsystem 30 outsources the solution of the linear system $\hat{C}x=\hat{G}$ to computing center 50. If C is singular then computing center 50 returns a message with this indication; otherwise center 50 returns: $\hat{U}=\hat{C}^{-}\hat{G}$.

e. Subsystem 30 computes $X=P_2^{-1}\hat{U}P_3$ which equals $M^{-1}B$, because: $P_2^{-1}\hat{U}P_3=P_2^{-}\hat{C}^{-1}\hat{G}P_3=P_2^{-1}P_2M^{-1}P_1^{-1}P_1BP_3^{-1}P_3=M^{-1}B$; where the answer x (actual answer SA) is the $j^{th}$ column of X, i.e., $x=X_j$.

EXAMPLE NINE

In a ninth example, dimensional hiding of a linear system of equations is provided by disguise procedure DP9. For DP9, dimension n of the linear system of equations is hidden by embedding the problem Mx=b into a larger problem M'x'=b' of the size n'>n. In what follows, if X is an r×c matrix and Y is an r'×c' (r<r'), the notation "Y=X(*,[1:c])" means that Y consists of as many copies of X as needed to fill the r' rows of Y. It should be appreciated that the last copy could be partial, if r does not divide r'. For example, if r'=2.5r then the notation would mean that:

$Y([1:r],[1:c])=Y([r+1:2r],[1:c])=X;$ and $Y([2r+1:2.5\ r],\ [1:c])=X([1:0.5r],[1:c]).$ The larger problem M'x'=b' of size n'>n is defined as follows. The matrix M' and vector b' are defined as follows, where the matrices O' and O'' are of dimension n×(n'−n) and (n'−n)×n, respectively, all of whose entries are zero; S' is an (n'−n)×(n'−n) random invertible matrix, and y is a random vector of length (n'−n):

$M'([1:n]\ [1:n])=M;$ $M'([1:n],[n+1:n'])=O';$ $M'([n+1:n'],[1:n])=O'';$ $M'([n+1:n'],[n+1:n'])=S';$ $b'([1:n])=b$; and $b'([n+1:n'])=S'y.$ Then the solution x' to the system M'x'=b' is x'([1:n])=x and x'([n+1, n'])=y. Note that the zero entries of O' and O" do not betray n because these zeroes are hidden when $\hat{C}=P_1 MP_2^{-1}$ is computed. As an alternative, matrices O' and O" need not have zeroes if:
  a. O' is a random matrix (rather than a matrix of zeros);
  b. O"=M(*,[1:n]);
  c. S'=O'(*,[n+1:n']); and
  d. b'=(b+O'y)(*).

If the selection of random values for y and matrix O' result in a noninvertible M', then the corresponding operations are repeated until an invertible M' results. The probability that M' is non-invertible is low. For an invertible M', the solutions x' to the system M'x'=b' remains x'([1:n])=x and x'([n+1, n])=y, because Mx+O'y=b'([1:n])=b+O'y, and hence Mx=b.

EXAMPLE TEN

A tenth example is provided as disguise procedure DP10 for a secure quadrature computation to be outsourced. For DP10, the objective is to provide an estimate corresponding to the following expression (27):

$$\int_a^b f(x)dx \tag{27}$$

with accuracy designated as "eps". Expression (27) corresponds to the actual arguments AA to be disguised by DP10. DP10 proceeds in accordance with stages a.-e. as follows:
  a. Subsystem 30 chooses $x_1=a$; $x_7=b$; 5 ordered, random numbers $x_i$ in [a,b]; and 7 values $v_i$ with a range defined such that min $|f(x)| \approx M_1 \leq M_2 \approx \max|f(x)|$; where $M_1$ and $M_2$ are estimations and the operators min $|f(x)|$ and max $|f(x)|$ return the minimum and maximum value of f(x), respectively.
  b. Subsystem 30 creates a cubic spline g(x) with breakpoints $x_i$; such that $g(x_i)=v_i$.
  c. Subsystem 30 integrates g(x) from a to b to obtain $I_1$ and sends g(x)+f(x) (the disguised arguments DA) and eps to computing center 50 for numerical quadrature.
  d. Computing center 50 returns $I_2$ (the disguised result DR) to subsystem 30.
  e. Subsystem 30 computes $I_2-I_1$ which is the actual answer SA.

EXAMPLE ELEVEN

In an eleventh example, a disguise procedure DP11 for quadrature computations is provided that is more robust with respect to an approximation theoretic attack. DP11 modifies DP10 to add a second disguise function. Specifically, to assure that f(x) has a smoothness characteristic comparable to g(x). Further security enhancements may optionally be incorporated by using reverse communication as described in J. R. Rice, *Numerical Methods, Software, and Analysis*, 2d ed., Academic Press (1993), which is hereby incorporated by reference in its entirety, or by replacing f(x) with a high accuracy approximation as previously discussed in connection with random function determinations.

EXAMPLE TWELVE

In a twelfth example, disguise procedure DP12 provides for secure outsourcing of a convolution computation of two vectors $M_1$ and $M_2$ of size n, indexed from 0 to n−1 (the actual arguments AA). It should be appreciated that the convolution M, of $M_1$ and $M_2$, is a new vector of the size 2n−1, denoted by: $M=M_1 \otimes M_2$, such that expression (28) follows:

$$M(i) = \sum_{k=0}^{\min(i,n-1)} M_1(k)M_2(i-k). \tag{28}$$

DP12 includes the following stages a.-f.:
  a. Subsystem 30 randomly selects vectors $S_1$, $S_2$, of size n and five positive numbers $\alpha$, $\beta$, $\gamma$, $\beta'$, $\gamma'$ such that: $(\beta+\alpha\gamma)(\beta'+\alpha\gamma')(\gamma'\beta-\gamma\beta') \neq 0$.
  b. Subsystem 30 computes six vectors: $\alpha M_1+S_1$, $\alpha M_2+S_2$, $\beta M_1-\gamma S_1$, $\beta M_2-\gamma S_2$, $\beta'M_1-\gamma'S_1$, $\beta'M_2-\gamma'S_2$.
  c. Subsystem 30 outsources to computing center 50 the three convolutions defined by expressions (29)-(31) that follow:

$$W=(\alpha M_1+S_1) \otimes (\alpha M_2+S_2); \tag{29}$$

$$U=(\beta M_1-\gamma S_1) \otimes (\beta M_2-\gamma S_2); \text{ and} \tag{30}$$

$$U'=(\beta'M_1-\gamma'S_1) \otimes (\beta'M_2-\gamma'S_2). \tag{31}$$

d. Computing center 50 returns W, U, and U' to subsystem 30 as the disguised results DR.
  e. Subsystem 30 computes the vectors according to expressions (32) and (33) as follows:

$$V=(\beta+\alpha\gamma)^{-1}(\alpha U+\beta\gamma W) \tag{32}$$

$$V'=(\beta'+\alpha\gamma')^{-1}(\alpha U'+\beta'\gamma'W) \tag{33}$$

where it may be observed that $$V=\alpha\beta M_1 \otimes M_2+\gamma S_1 \otimes S_2, \text{ and}$$

$$V'=\alpha\beta'M_1 \otimes M_2+\gamma'S_1 \otimes S_2$$

f. Subsystem 30 computes $\alpha^{-1}(\gamma'\beta-\gamma\beta')^{-1}(\gamma'V-\gamma V')$, which equals the actual answer SA, $M_1 \otimes M_2$.

Further, security of an outsourced convolution computation may be enhanced by hiding the dimension. The dimension may be expanded for a convolution computation by "padding" the two input vectors with zeroes. The zeroes do not betray the value of n because they are hidden through the addition of random numbers. Alternatively or additionally, the dimension may be hidden by shrinking the problem size with two operations: (a) replacing the convolution size n by three convolutions of size n/2 each, and then (b) recursively hiding (by shrinking or expanding) the sizes of these three convolutions with a recursion depth of O(1).

EXAMPLE THIRTEEN

In a thirteenth example, disguise procedure DP13 provides for secure outsourcing of the solution to a differential equation defined as a two point boundary value problem in expressions (34)-(36) that follow:

$$y''+a_i(x)y'+a_2(x)y=f(x,y); \tag{34}$$

$$y(a)=y_0; \text{ and} \tag{35}$$

$$y(b)=y_1. \tag{36}$$

The differential equation of expression (34) and the boundary conditions of expressions (35) and (36) are the actual arguments SA for DP13. DP13 proceeds in accordance with stages a.-d. as follows:

a. Subsystem 30 selects a cubic spline g(x) and creates the function of expression (37) that follows:

$$u(x)=g''+a_1(x)g'+a_2(x)g. \qquad (37)$$

b. Subsystem 30 sends the problem defined by the following expressions (38)-(40) as disguised arguments DA to computing center 50 for solution:

$$y''+a_1(x)y'+a_2(x)y=f(x,y)+u(x); \qquad (38)$$

$$y(a)=y_0+u(a); \text{ and} \qquad (39)$$

$$y(b)=y_1+u(b). \qquad (40)$$

c. Computing center 50 solves the problem corresponding to expressions (38)-(40) and returns z(x), the disguised result DR, to subsystem 30.

d. Subsystem 30 computes the actual answer, z(x)−g(x).

EXAMPLE FOURTEEN

The outsourcing of computations may involve the transmission of a substantial amount of symbolic input, either pure mathematical expressions or high level programming language (Fortran, C, etc.) code. Such code can compromise security if provided without a disguise during outsourcing. Disguise procedure DP14 of this fourteenth example describes various techniques to disguise symbolic information and to address security risks posed by "symbolic code analysis" attacks. Various operations that may be alternatively or collectively performed in accordance with DP14 include:

(a) reducing or eliminating all name information in the code, including the deletion of all comments and/or removal of all information from variable names;

(b) utilizing approximations of basic mathematical functions, such as sine, cosine, tangent, cotangent, logarithm, absolute value, exponentiation, to reduce the likelihood such functions can be readily identified by code inspection (techniques may include, for example, one time elementary function approximations for these functions using a combination of a few random parameters along with best piecewise polynomial, variable breakpoint approximations);

(c) applying symbolic transformations such as changes of coordinates, changes of basis functions or representations, and use of identities and expansions of unity; and/or (d) utilizing reverse communication to avoid passing source code for numerical computations to agent A and to hide parts of the original computation.

In one instance of reverse communication according to this example, it may be desirable to avoid passing the code for the function u(x) to computing center 50; however, computing center 50 may be selected to do computations to provide x before u(x) needs to be determined, and further computing center 50 may selected to perform computations involving u(x) after u(x) is made available. Accordingly, subsystem 30 receives x from computing center 50, evaluates u(x), and returns u(x) to computing center 50 for further processing in accordance with this reverse communication embodiment.

In one instance of symbolic transformation according to this example, the readily recognizable differential equation given by expression (41) as follows:

$$y''+x^*\cos(x)y'+(x^2+\log(x))y=1+x^2 \qquad (41)$$

is disguised by applying the following symbolic transformations defined by expressions (42)-(47) that follow:

$$\cos^2 x - \sin^2 y = \cos(x+y)\cos(x-y); \qquad (42)$$

$$\sec^2(x+y) - \tan^2(x+y) = 1; \qquad (43)$$

$$(\tan x + \tan y)/\tan(x+y) + \tan x \tan y = 1; \qquad (44)$$

$$1+x=(1-x^2)/(x-x); \qquad (45)$$

$$\sin(3(x+y))=3\sin(x+y)-4\sin^3(x+y); \text{ and} \qquad (46)$$

$$a^2-ax+x^2=(a^3+x^3)/(a+x). \qquad (47)$$

By rearranging and renaming, a more complicated result may be obtained as represented by expression (48); where the Greek letters are various constants that have been generated:

$$(\beta\cos^2 x - \delta)y'' + \qquad (48)$$
$$x[\cos x/(\gamma\cos(x+1)) - \cos x \sin(x+1)\tan(x+1)] * [\varepsilon - $$
$$\sin^2 x + \varepsilon\sin(x+1) - \sin^2 x \sin(x+1)]y' + [\beta(x\cos x)^2 - $$
$$\eta(x+\log x) + \theta\cos x \log(x^2)] * [\eta\sin x + \delta\tan x + $$
$$(\chi\sin x + \mu\cos x + \nu)/\tan(x+2)]y = (1+x^2)[\sin x + \eta\cos x]$$

Moreover, by further renaming and implementation of some elementary functions, including the replacement of the variable names by the order in which the variables appear, expression (48) becomes expression (49) as follows:

$$y''[x01*x02(x) - x03] + \qquad (49)$$
$$y'[x04*x/(x05\cos(x+1) + \cos x*x06(x)\tan(x+1)] * [x07 - $$
$$\sin^2 x - x08(x)\sin^2 + x07\sin^2(x+1)] + $$
$$y[x01*(x*x09(x))^2 - x10(x+\log x) + x11\cos x\log x^2] * $$
$$[x12*x13(x) + x14\tan x + x15\sin x + x16\cos x + x17)] = $$
$$\sin x + x18*(1+x^2)*x09(x) + x19(x) + x10*x^2\cos x$$

EXAMPLE FIFTEEN

In example fifteen, disguise procedure DP15 is applied to enhance security of an outsourced computation for detecting edges of an image represented by an n×n array of pixel values p(x,y) between 0 and 100,000 on the square $0 \leq x,y \leq 1$. DP15 includes the following stages a.-f.:

a. Subsystem 30 sets $x_1,y_1=0$, $x_{10},y_{10}=1$, and selects:

1. two sets of 8 ordered, random numbers with $0<x_i,y_i<1$;
2. 100 random values $0 \leq v_{ij} \leq 50,000$; and,
3. 4 pairs $(a_i,b_i)$ of positive, random numbers with $a_1$=min $(a_i)$, $a_4$=max$(a_i)$, $b_1$=min$(b_i)$, $b_4$=max$(b_i)$.

b. Subsystem 30 establishes the bi-cubic spline s(x,y) so that $s(x_i,y_i)=v_{ij}$ c. Subsystem 30 determines the linear change of coordinates from (x,y) to (u,v) that maps the unit square into the rectangle with vertices $(a_i,b_i)$.

d. Subsystem 30 sends p(u(x,y), v(x,y))+s(u(x,y), v(x,y)) as disguised arguments DA to computing center 50 to perform an edge detection computation.

e. Computing center 50 generates the disguised result DR as an image e(u,v) showing the edges and returns e(u,v) to subsystem 30.

f. Subsystem 30 computes e(x(u,v), y(u,v)) to obtain actual answer SA, the desired edges.

EXAMPLE SIXTEEN

For example sixteen, secure outsourcing of template matching utilized for image analysis is provided by disguise procedure DP16. For an N×N image I and a smaller n×n image object P (each of which comprises an "image matrix"), consider the computation of an (N−n+1)×(N−n+1) score matrix $C_{I,P}$ of the form given by expression (50) as follows:

$$C_{I,P}(i,j) = \sum_{k=0}^{n-1} \sum_{k'=0}^{n-1} f(I(i+k, j+k'), P(k, k')); \quad (50)$$
$$0 \le i, j \le N - n$$

for some function f(x,y). Score matrices may be used in image analysis, specifically in template matching, when one is trying to determine whether (and where) an object occurs in an image. A small $C_{I,P}(i,j)$ indicates an approximate occurrence of the image object P in the image I (a zero indicates an exact occurrence). Frequent choices for the function f(x,y) are $f(x,y)=(x-y)^2$ and $f(x,y)=|x-y|$.

When the function $f(x,y)=(x-y)^2$ is selected, DP16 proceeds with stages a.-e. as follows:

a. Subsystem 30 selects a random N×N matrix S1, and a random n×n matrix S2; and generates five positive random numbers $\alpha,\beta,\gamma,\beta',\gamma'$ such that $(\beta+\alpha\gamma)(\beta'+\alpha\gamma')(\gamma\beta-\gamma\beta')\ne 0$.

b. Subsystem 30 computes six matrices: $\alpha I+S1$, $\alpha P+S2$, $\beta I-\gamma S1$, $\beta P-\gamma S2$, $\beta' I-\gamma' S1$, $\beta' P-\gamma' S2$, that serve as disguised arguments DA.

c. Subsystem 30 outsources the computation of three score matrices $C_{x,y}$ to computing center 50, where there is one score matrix for each pair X,Y of the matrices received.

d. Computing center 50 calculates the matrices and returns them to subsystem 30 as defined by the following expressions (51)-(53):

$$W = C_{(\alpha I+S1),(\alpha P+S2)} \quad (51)$$

$$U = C_{(\beta I-\gamma S1),(\beta P-\gamma S2)} \quad (52)$$

$$U' = C_{(\beta' I-\gamma' S1),(\beta' P-\gamma' S2)} \quad (53)$$

e. Subsystem 30 computes the matrices V and V' from W, U, and U' (the disguised results DR) as returned by computing center 50. The determination of matrices V and V' are in accordance with expressions (54)-(55) as follows:

$$V = (\beta+\alpha\gamma)^{-1}(\alpha U+\beta\gamma W); \text{ and} \quad (54)$$

$$V' = (\beta'+\alpha\gamma')^{-1}(\alpha U'+\beta'\gamma' W) \quad (55)$$

Subsystem 30 computes $\alpha^{-1}(\gamma'\beta-\gamma\beta')^{-1}(\gamma' V-\gamma V')$ from V and V' which equals $C_{I,P}$.

When the function $f(x,y)=|x-y|$ is selected, DP16 proceeds with a two-dimensional version of the convolution disguise procedure, DP12; where B is defined as an alphabet, i.e., the set of symbols that appear in I or P; and for every symbol x∈B, DP16 proceeds with the following stages a.-h.:

a. Subsystem 30 replaces, in I, every symbol other than x by 0 (every x in I stays the same); where $I_x$ is designated as the resulting image.

b. Subsystem 30 replaces every symbol that is ≦x by 1 in P, and replaces every other symbol by 0; where $P_x$ is designated as the resulting image. $P_x$ is augmented into an N×N matrix $\Pi_x$ by padding it with zeroes which serves a first group of the disguised arguments DA.

c. Subsystem 30 outsources the computation of the score matrix according to the following expression (56) to computing center 50:

$$D_x(i,j) = \sum_{k=0}^{n-1} \sum_{k'}^{n-1} I_x(i+k, j+k')\Pi_x(k, k'); \quad 0 \le i, j \le N-n \quad (56)$$

Expression (56) is a form of 2-dimensional convolution that can be outsourced using DP12.

d. Subsystem 30 replaces, in P, every symbol other than x by 0 (every x in P stays the same); where $P'_x$ is designated as the resulting image. $P'_x$ is augmented into an N×N matrix $\Pi'_x$ by padding it with zeroes which serves as second group of the disguised arguments DA.

e. Subsystem 30 replaces every symbol that is <x by 1 in I, and every other symbol by 0; where $I'_x$ is designated the resulting image.

f. Subsystem 30 outsources the computation of the score matrix according to the following expression (57) to computing center 50:

$$D'_x(i,j) = \sum_{k=0}^{n-1} \sum_{k'}^{n-1} I'_x(i+k, j+k')\Pi_x(k, k'); \quad 0 \le i, j \le N-n \quad (57)$$

Expression (57) is a form of 2-dimensional convolution that can be outsourced using DP12.

g. Computing center 50 returns the computations corresponding to expressions (56) and (57) (the disguised results DR) to subsystem 30.

h. Subsystem 30 computes the actual answer SA in accordance with expression (58) as follows:

$$C_{I,P} = \sum_{x \in B} (D_x + D'_x) \quad (58)$$

EXAMPLE SEVENTEEN

In example seventeen, a secure outsourcing technique for sorting a sequence of numbers $E=\{e_1, \ldots, e_n\}$ is provided as disguise procedure DP17. DP17 proceeds with stages a.-f. as follows:

a. Subsystem 30 selects a strictly increasing function f: E→R, such as $f(x)=\alpha+\beta(x+\gamma)^3$; where $\beta>0$. For this function f(x), subsystem 30 selects $\alpha, \beta$, and $\gamma$ in accordance with $\beta>0$.

b. Subsystem 30 generates a random sorted sequence $\Lambda=\{\lambda_1, \ldots, \lambda_k\}$ of k numbers by randomly "walking" on the real line from MIN to MAX where MIN is smaller than the smallest number in E and MAX is larger than the largest number in E. Letting $\Lambda=(MAX-MIN)/n$, the random walking is implemented by subsystem 30 as follows: (i) randomly generate $\lambda_1$ from a uniform distribution in [MIN,MIN+2Δ]; (ii) randomly generate $\lambda_2$ from a uniform distribution in [$\lambda_1$, $\lambda_1+2\Delta$]; and continue in the same way until MAX is exceeded, which provides a total number of elements k. It may be observed that $\Lambda$ is sorted by the construction such that the expected value for the increment is Δ. Correspondingly, the expected value for k is given by:

(MAX−MIN)/Δ=n.

c. Subsystem 30 computes the sequences E'=f(E) and Λ'=f(Λ); where f(E) is the sequence obtained from E by replacing every element $e_i$ by $f(e_i)$, and concatenates the sequence Λ' to E', obtaining W=E'∪Λ'.

d. Subsystem 30 randomly permutes W, the disguised arguments DA, before outsourcing to computing center 50.

e. Computing center 50 returns the disguised arguments DA as sorted result W'.

f. Subsystem 30 removes Λ' from W' to produce the sorted sequence E' and computes E=f$^{-1}$(E'), the actual answer SA.

The value n may be revealed by this approach, because the number of items sent to the agent has expected value 2n. To provide greater security, n may be modified by letting Δ=(MAX−MIN)/m where m is a number independent of n. Therefore the size of the outsourced sequence is m+n, which hides the size of problem through expansion.

EXAMPLE EIGHTEEN

In example 18, secure outsourcing of a text string pattern matching computation is provided by disguise procedure DP18. For DP18, T is a text string of length N, P is a pattern of length n (n≦N), and both are over alphabet A. DP18 is based on establishing a score vector $C_{T,P}$ such that $C_{T,P}(i)$ is the number of positions at which the symbols of pattern P equal their corresponding symbols of text string T when the pattern P is positioned under the substring of T that begins at position i of T, such that it is in accordance with the following expression (59):

$$\sum_{k=0}^{n-1} \delta T(k+i), P(i) \quad (59)$$

where $\delta_{x,y}=1$ if x=y, and $\delta_{x,y}=0$ otherwise.

DP18 performs the following stages a.-d. for every symbol ∴∈B:

a. Subsystem 30 replaces, in both T and P, every symbol other than x by 0, and every x by 1; and lets $T_x$ and $P_x$ be the resulting text and pattern, respectively. $P_x$ is augmented into a length N string $\Pi_x$, by padding it with zeros.

b. Subsystem 30 outsources to computing center 50 the computation of expression (60) as follows:

$$D_x(i) = \sum_{k=0}^{n-1} I_x(i+k)\Pi_x(k), \quad 0 \le i \le N-n \quad (60)$$

The terms of expression (60) (disguised arguments DA) define a form of convolution that may be securely outsourced using DP12.

c. Computing center 50 returns disguised result DR, the expression (60) computation, to subsystem 30.

d. Subsystem 30 determines the actual answer SA, the score matrix $C_{T,P}$ as $$\sum_{x \in B} D_x$$

It should be appreciated that examples 1-18 and the disguise procedures disclosed herein as DP1-DP18 are but a few of the forms of the embodiments of the present invention that may be utilized to provide secure outsourcing of one or more computations. Further, any of the examples or the disguise procedures DP1-DP18 may be adapted for use in an embodiment of the present invention comprising mutually secure outsourcing, wherein two or more parties contribute their private data into a disguised common computation performed through the external agent (discussed in more detail hereinafter). Indeed, the stages, operations and techniques of these examples and of disguise procedures DP1-DP18 may be rearranged, combined, separated, deleted, altered, and added to other stages, operations, or techniques as would occur to those skilled in the art.

Further, in one alternative embodiment of the present invention, a system dedicated to the performance of only a single type of disguise procedure is utilized.

In another alternative embodiment, different types of outsourced computations may be accommodated by a single disguise procedure or protocol. It should be appreciated that classification of the outsourced computation type for these alternative embodiments is optional. Indeed, even when selection of a disguise procedure is based on outsourced computation type, computation classification with one or more programs or computers is not needed where, for example, an operator selects an appropriate disguise procedure for a given outsourced computation. In still other embodiments, classification may be partially operator-based or fully performed through the execution of one or more programs or routines.

Also, it should be appreciated that multiple agents A may be utilized to perform different parts of a given outsourced computation. Moreover, outsourced computation results may be received by a different computer than the sending computer. For this example, the different computers of customer C may exchange information desired to recover actual answer SA. In still other embodiments, such as in embodiments comprising mutually secure outsourcing, multiple sites or computers may be utilized to prepare the disguised arguments DA and/or receive the disguised result DR.

Also, while both disguised arguments DA and disguised result DR are preferred, in other embodiments, it may be acceptable to reveal at least some of the actual arguments with only the result being disguised or to receive the actual answer with only the arguments being disguised. Further, while the term "arguments" has been used in the plural, it should be appreciated that the present invention includes embodiments that have only one argument. Correspondingly, while disguised result DR and actual answer SA have been used in the singular, it should be appreciated that the disguised result and/or actual answer may refer to a plurality.

Yet another embodiment of the present invention includes: determining one or more arguments to be outsourced; disguising the arguments by performing a local computation with a first computer; sending the disguised arguments to a second computer to perform the outsourced computation; and receiving a result of the outsourced computation.

Still another embodiment of the present invention includes a computer, an output device, and an input device. The computer is programmed to determine a group of disguised arguments from a set of actual arguments. The disguised arguments hide one or more characteristics of the actual arguments. The disguised arguments are output by the output device for remote performance of the outsourced computation. The input device receives the result of the outsourced computation performed with the disguised arguments.

A further embodiment of the present invention includes operating a first computer in accordance with one or more instructions to perform an outsourced mathematical operation. The first computer having received a number of disguised arguments that hide a group of actual arguments for the outsourced mathematical operation. The outsourced mathematical operation is performed on the disguised arguments with the first computer, and the result of the outsourced mathematical operation is output by the first computer.

In another embodiment, a system includes an input device to receive a plurality of disguised arguments that hide at least one characteristic of each of a number of actual arguments. The system also includes a computer responsive to the input device to perform an outsourced computation with the disguised arguments and provide a result of the outsourced computation. The system further comprises an output device to output the result for conversion to an actual answer corresponding to the actual arguments.

Still a further embodiment includes a computer readable medium that defines computer programming instructions to hide a group of actual arguments for a computation to be outsourced. The instructions provide for the generation of a group of disguised arguments corresponding to the actual arguments. The disguised arguments are generated to provide a disguised result when provided for the computation. An actual answer is recoverable from the disguised result in accordance with the instructions. The actual answer corresponds to the results returned by the computation when the computation is provided the actual arguments.

Mutually Secure Outsourcing

In an embodiment of the present invention, a "mutually secure outsourcing" system and method are provided. Mutually secure outsourcing refers to situations where two or more parties contribute their private data into a disguised common computation performed through the external agent. The contributing parties are to know the result but not each other's private data (other than what they can infer from the computation's result), and the external agent should know neither the private data nor the result. The mutually secure outsourcing technique allows several different parties to contribute problem information to a computation without revealing to anyone their part of the information. The computation may be carried out by yet another party to whom neither the information nor the computed solution is revealed.

This framework of this embodiment is similar to, yet differs in significant ways from the traditional secure multi-party computation protocols. Some significant differences are as follows:

(A) any superlinear computational burden preferably rests with the outsourcing (external) computing agent. Preferably, the computations performed locally by the customers on their private data are illustratively proportional to the size of their local data. The customers preferably do not keep data permanently with the outsourcing agent; instead, a customer only uses temporarily the agent's superior computational resources;

(B) the computational burden on the external agent is preferably O(T), where T is the time it would take that agent to solve the problem if it already had all of the data needed for the computation (instead of the data being scattered among the customers); and (C) whereas in cryptographic multi-party protocols every participant knows that "this is step i of run j of protocol X;" here the external agent preferably is told neither i nor j nor X. In fact, an effort to obfuscate these is preferred, e.g., by interleaving the various steps/runs of multiple computations and/or by using more than one external agent for the various steps of a single computation.

The security of the schemes does not depend on an assumption that the external agent is ignorant of the source code used by the customers for creating a disguise. Rather, the security depends on the fact that the external agent does not know the customer's seeds of the generators for the randomness, or other information which would enable the external agent to unveil the disguised arguments.

Figure 5:
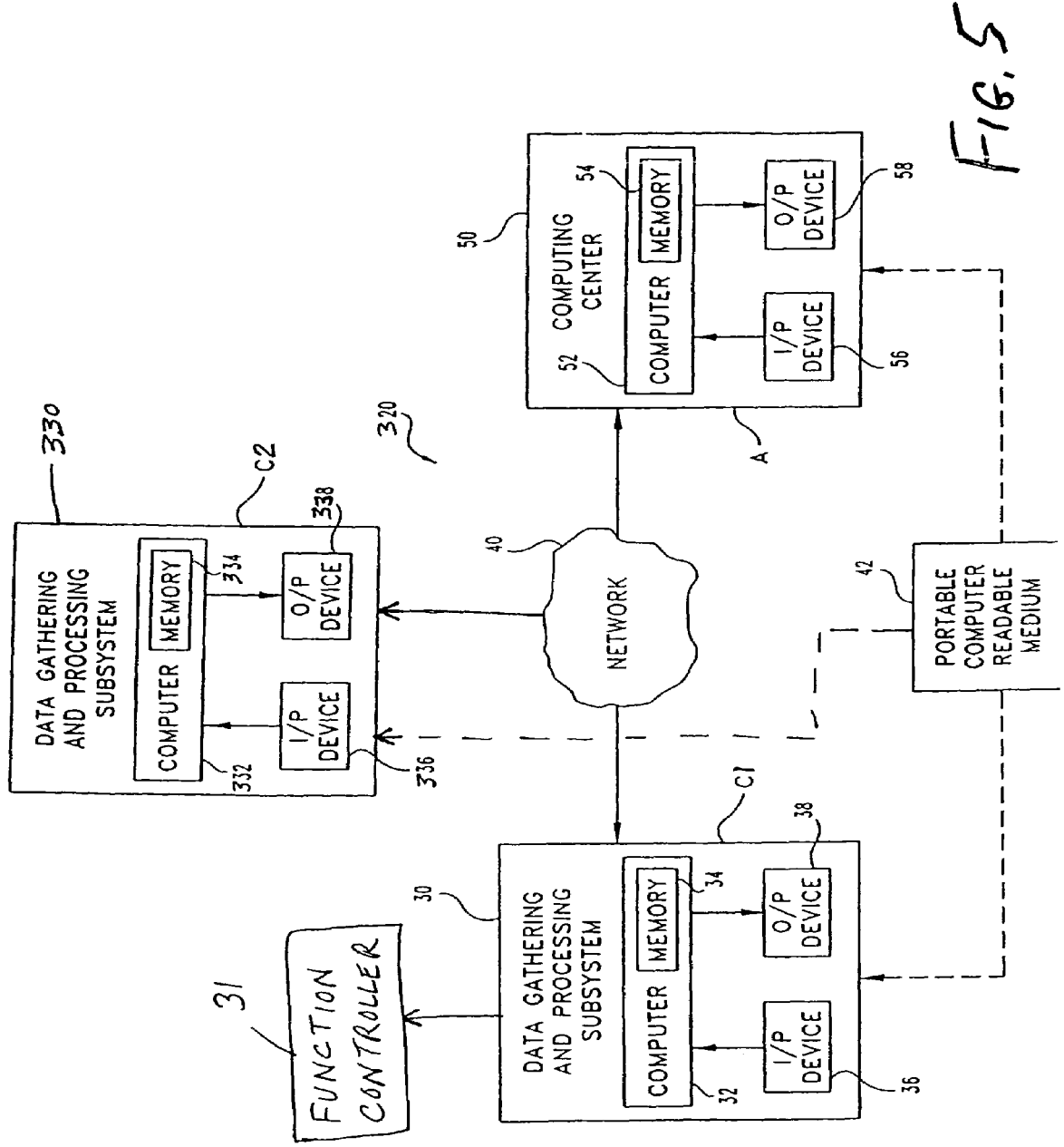
FIG. 5 shows a diagrammatic view of a system according to an embodiment of the present invention.

Another embodiment of the present invention is shown in FIG. 5. Those elements referenced by numbers identical to FIGS. 1-4 perform the same or similar function. In the FIG. 5 embodiment, two or more customers such as customers C1 and C2 desire to have another party such as agent A make a computation based on information provided by customers C1 and C2. In FIG. 5, system 320 includes a first data gathering and processing subsystem 30, a second data gathering and processing subsystem 330, and a computing center 50 Subsystem 30 and computing center 50 are illustratively identical to those discussed above with reference to FIG. 1. Subsystem 330 includes at least one computer 332. Computer 332 has a memory 334, at least one input (I/P) device 336, and at least one output (O/P) device 338. Memory 334 is similar to memory 34 discussed above, and defines at least one computer readable medium that is accessed by computer 332. Input device 336 and output device 338 are similar to the input device 36 and output device 38 discussed above.

Network 40 communicatively couples subsystem 330 with subsystem 30 and computing center 50. Although system 320 is shown in FIG. 5 and described herein in terms of two customers and one computing center, it is within the scope of the present invention that more than two customers can provide data and more than one computing center may be used to perform computations on the data.

Both customers C1 and C2 identify and collect data or information illustratively referred to as actual arguments 222 to be used in an outsourced computation. The actual arguments 222 are then classified and disguised in operation 220 to produce disguised arguments 250 as described above with reference to FIG. 3. These disguised arguments 250 are then transmitted from customers C1 and C2 to computing center 50. Computing center 50 computes a disguised result 262 and transmits the disguised result to customer C1 and/or customer C2 via the network 40 or portable computer readable medium 42. Customer C1 and customer C2 may, if so desired, exchange unveiling data in a secure fashion using network 40 or portable computer readable medium 42. The unveiling data permits each customer C1 and C2 to recover an actual answer 264 from the disguised result 262 as illustratively discussed above. Therefore, customer C1 and customer C2 apply the unveiling data to the disguised result 262 revealing the actual answer 264 in a manner similar to the manner described above with reference to FIG. 4.

According to one embodiment of the present invention, two parties, C1 and C2, have information, d1 and d2, respectively, and want another party, A, to make a computation to compute a result z. This embodiment can easily be extended to include more parties. The goals are that C1 and C2 do not reveal the information d1 and d2 to anyone (including A), and that A does not learn the result z. According to this embodiment, the procedure consists of one or more sequences of the following steps:

1. The type and basic parameters of the computation are determined.

2. A mutually acceptable disguise procedure is chosen for this computation by C1, C2, and/or A.

3. C1 and C2 agree on a master key for the disguise procedure.

4. C1 and C2 independently apply the disguise procedure to d1 and d2 to produce disguised information d̂1 and d̂2 and unveiling data $v_1$ and $v_2$.

5. C1 and C2 exchange the unveiling data in a secure fashion.

6. d̂1 and d̂2 are sent to A, who computes disguised result z and returns disguised result ẑ to C1 and C2.

7. C1 and C2 apply the unveiling data $v_1$ and $v_2$ and reveal result z.

As in ordinary outsourcing, it is preferred that it requires only a reasonably small effort to disguise d1 and d2 and to unveil z, for the purpose of computational efficiency. However, there also are applications where security concerns outweigh computational efficiency concerns.

Four illustrative examples of disguising and unveiling for mutually secure outsourcing are provided herein: solution of linear systems of equations, convolution, template matching in image analysis, and fingerprint matching. These examples are meant to be merely representative, it being understood that other forms and techniques for disguising and unveiling for mutually secure outsourcing as would occur to those skilled in the art may alternatively or additionally be included.

Solution of Linear Systems of Equations

The mutual disguise procedure is illustrated in the simple case of solving a linear system of n equations where customers C1 and C2 each have part of the information (equations and right side). It is desired to obtain result z from the following problem:

$$\begin{pmatrix} M1 \\ M2 \end{pmatrix} z = \begin{pmatrix} b1 \\ b2 \end{pmatrix}$$

where C1 has information comprising matrix M1 and vector b1, and C2 has information comprising matrix M2 and vector b2. Matrices M1 and M2 are of size $N_1 \times n$ and $N_2 \times n$, respectively, where $N_1 + N_2 = n$. The lengths of the vectors b1 and b2 are $N_1$ and $N_2$, respectively. In an embodiment, the following sequence of steps may be employed:

1. A master key is chosen as is a seed for generating random numbers.

2. C1 and C2 agree on an index k and size K.

3(a) C1 creates a new random matrix of order $N_1 \times K$ and then creates matrix B1 by substituting vector b1 as the $k^{th}$ column of this new random matrix.

(b) C2 creates a new random matrix of order $N_2 \times K$ and creates matrix B2 by substituting vector b2 as the $k^{th}$ column of this new random matrix.

4(a) C1 creates a random permutation vector $\pi 11$ of length $N_1$ and a random vector $\alpha 1$ of length $N_1$.

(b) C2 creates a random permutation vector $\pi 12$ of length $N_2$ and a random vector $\alpha 2$ of length $N_2$.

(c) C1 and C2 jointly create and share random permutation vectors $\pi 2$ of length n and $\pi 3$ of length K. They also create and share random vectors $\beta$ of length n and $\gamma$ of length K.

5(a) C1 uses these to create the $N_1 \times N_1$ weighted permutation matrix $P_{11}(i,j) = \alpha 1(i)$ if $\pi 11(i) = j$; $= 0$ otherwise (b) C2 uses these to create the $N_2 \times N_2$ weighted permutation matrix $P_{12}(i,j) = \alpha 2(i)$ if $\pi 12(i) = j$; $= 0$ otherwise (c) C1 and C2 both create the n×n weighted permutation matrix $P_2(i,j) = \beta(i)$ if $\pi 2(i) = j$; $= 0$ otherwise and the K×K weighted permutation matrix $P_3(i,j) = \gamma(i)$ if $\pi 3(i) = j$; $= 0$ otherwise 6(a) C1 computes matrices $\hat{M}1 = P_{11} M1 P_2^{-1}$, and $\hat{B}1 = P_{11} B1 P_3^{-1}$.

(b) C2 computes matrices $\hat{M}2 = P_{12} M1 P_2^{-1}$, and $\hat{B}2 = P_{12} B1 P_3^{-1}$.

7. The linear system of n equations $$\begin{pmatrix} \hat{M}1 \\ \hat{M}2 \end{pmatrix} \begin{pmatrix} \hat{z}1 \\ \hat{z}2 \end{pmatrix} = \begin{pmatrix} \hat{B}1 \\ \hat{B}2 \end{pmatrix}$$

is outsourced to A for solution and the disguised result (ẑ1, ẑ2) is returned by A to C1 and C2.

8(a) C1 computes $z1 = P_2^{-1} \hat{z}1 P_3$.

(b) C2 computes $z2 = P_2^{-1} \hat{z}2 P_3$.

Note that the above requires $O(n^2)$ time in local computations by the customers C1 and C2, which is the minimum possible since the problem involves $O(n^2)$ data. The outsourced computations, on the other hand, require $O(n^3)$ operations and their burden is borne by the outsourcing agent A.

The unveiling data used in step 8 above are the matrices $P_2$ and $P_3$. Note that if C1 and C2 do not need to know the entire solution (ẑ1, ẑ2) then they can agree that A returns only the respective part to each, i.e, ẑ1 to C1 and ẑ2 to C2. This does not assure security, however. If $P_{11}$ and $P_{12}$ are dense random matrices, then even better security is achieved, but then the matrix multiplications that were done locally by C1 and C2 (such as in step 6(a)-(b) above), and that took $O(n^2)$ local computation time, should no longer be done locally because they would now take $O(n^3)$ time. They can be outsourced according to disguise procedure DP5 hereof Convolution of Two Vectors Recall that the convolution vector z of two vectors x and y (both of size M), denoted as $z = x \otimes y$, is another vector of size M defined by $$Z_i = \sum_{k=0}^{M-1} x_{i-k} y_k$$

where all indices are modulo M, and $0 \leq i \leq M-1$. A reverse convolution is when the subscript of x in the above equation is i+k rather than i−k. The methods of the present invention described herein also work for reverse convolution.

An example of solving a convolution problem according to the mutually secure outsourcing methods of the present invention follows. In this example, customer C1 has data vectors x, x' and customer C2 has data vectors y, y' (all of which are of size M). The problem is to use agent A so that C1 obtains $x'+y'+x \otimes y$, C2 obtains $x'+y'+ \otimes y$, and (as usual) A learns nothing about the private data of C1 or C2 or the answer to their computation, and neither C1 nor C2 learn anything about the other party's inputs, other than what can be derived from knowing the answer each receives from the outsourced computation. Essentially the same methods (with minor modifications) solve the asymmetric version of the problem, in which only C1 is to know $x'+y'+x \otimes y$. Of course, the special case when both x' and y' are zero is the original (unmodified) convolution problem, which is therefore solved as a special case of the schemes given below.

Two alternative methods of solving this example are provided. The complexity of either method is linear in the size of the inputs, i.e., it is O(M). The amount of local computation done by C1 and C2 is O(M) time, so it is A that bears the brunt of the computational burden (which is superlinear for convolutions). All vectors in what follows are of the same size M.

We formulate the first method for the asymmetric case, when C1 (but not C2) is supposed to learn $x'+y'+x \otimes y$. Although one could solve the symmetric version of the problem by running the asymmetric one twice (with the roles of C1 and C2 interchanged in the second run), various optimizations are possible if one combines these two runs in the symmetric version of the second method discussed hereinafter. The second method is formulated below for the symmetric case. It is understood that the essential idea of either method works for both the symmetric and asymmetric versions of the problem.

Method 1

1. C1 and C2 jointly generate two random vectors R and R'.
2. C1 sends to A the vector x+R, and C2 sends to A the vector y+R'.
3. C2 generates a random vector r and sends to A the vector r−y'.
4. A computes the convolution of vector x+R and vector y+R', adds to it the vector r−y' received from C2 in Step 3, and sends the result to C1. In other words, C1 receives result w where $$w=(x+R) \otimes (y+R)+r-y'.$$

5. C1 engages, with an outside agent A', in a secure (just two-party—not involving C2) outsourcing method a type discussed herein for computing vector $w_1=(x+R) \otimes \times R'$. Recall that this is done without revealing to A' either (x+R) or R'. Similarly, C2 uses A' to obtain convolution $y \otimes R$ and then sends to A vector $w_2=y \otimes R+r$. It is preferred, but not required, that A' be different from A. The purpose of this step is to get A' to do the bulk of the computational task of convolution computations, so that C1 and C2 only perform computations that take time that is linear in relation to the size of their data. This step can be skipped if we do not mind C1 and C2 performing local computations (without using A') that take superlinear time.

6. C1 then computes $w-w_1-w_2$, which is equal to $x \otimes y+y'$. By adding x' thereto (which C1 originally knew), C1 then may obtain the desired "$x \otimes y \times y'+x'$."

Method 2

1. C1 and C2 jointly generate four random vectors r, r, R, R'.
2. C1 engages, with an outside agent A', in a secure (just two-party—not involving C2) outsourcing method of a type discussed herein for computing $x \otimes R'$. Recall that this is done without revealing to A' either x or R'. Similarly, C2 uses A' to obtain $R \otimes (y+R')$. It is preferred, but not required, that A' be different from A. As before, the purpose of this step is to get A' to do the bulk of the computational task of convolution computations, so that C1 and C2 only perform computations that take time linear in relation to the size of their data. This step can be skipped if we do not mind C1 and C2 performing local computations (without using A') that take superlinear time.

3. C1 sends to A the vectors $w_1=x+R$ and $s_1=x \otimes R'+r-x'$ (where $x \otimes R'$ is available to C1 from the previous step).
4. C2 sends to A the vectors $w_2=y+R'$ and $s_2=R \otimes (y+R')+r'-y'$ (where $R \otimes (y+R)$ is available to C2 from Step 2).
5. A computes $v=w_1 \otimes w_2-s_1-s_2$, which equals $x \otimes y+x'+y'-(r+r)$; A then sends v to A and B.

In the asymmetric version of the problem (in which only C1 is to know $x'+y'+x \otimes y$), A does not send anything to C2 in this step.

6. C1 (and, in the symmetric version of the problem, C2) then computes v+(r+r'), which equals the desired "$x \otimes y+x'+y'$."

It is within the scope of the present invention that operations other than the convolution product can be carried out using suitably modified versions of either one of the above two methods. As discussed hereinafter, these include matrix product, in which case C1 and C2 each would have private matrices, and r, r', R, R' would be random matrices.

In another embodiment of the present invention, the secure outsourcing techniques discussed above are used to provide matching between a first piece of data and a second piece of data. For instance, the computing center 50 can be used to provide template matching in image analysis, facial image matching, hand geometry matching, fingerprint matching, DNA matching, retinal scan matching, iris pattern matching, signature matching, voice print matching, credit card matching, approximate string similarity, and in similar applications. In this embodiment, the first subsystem 30 illustratively provides disguised data to the computing center 50. Subsystem 330 also provides disguised data such as data from a database to computing center 50. Computing center 50 then compares the disguised data received from subsystem 30 to the disguised data received from subsystem 330 to determine if a match is present. If so, computing center 50 returns a "yes" answer to subsystem 30. If no match is found, computing center returns a "no" answer to subsystem 30. The data from subsystems 30 and 330 must be disguised in the same way to enable the matching. The customers C1 and C2 illustratively communicate over the network 40 in a secure manner to exchange disguise information used to generate the disguised data.

In an embodiment of the present invention shown in FIG. 5, subsystem 30 is coupled to a separate function controller 31. If a match is verified from computing center 50, computer 32 of subsystem 30 provides instructions to perform a certain function to function controller 31. For instance, if an identity match is made, computer 32 enables a function such as approving access to an area of a building, automatically unlocking a door, approving a business transaction such as a credit card transaction, a banking transaction, an e-commerce transaction, and other forms of business transactions as would occur to those of skill in the art.

Figure 6:
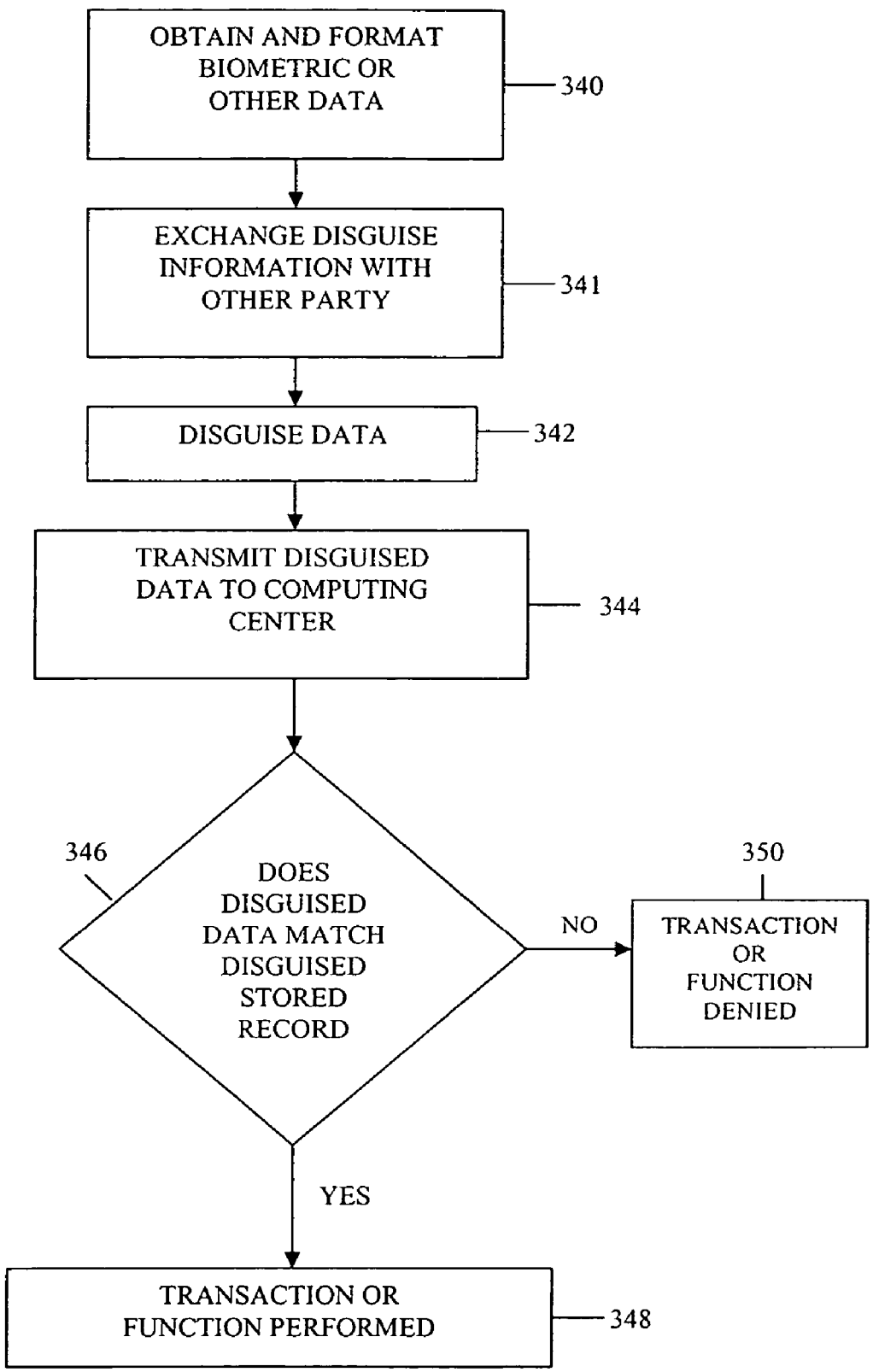
FIG. 6 shows a flow chart illustrating a matching operation using disguised data in accordance with an embodiment of the present invention.

FIG. 6 is a flowchart illustrating steps performed to obtain matching information and perform a transaction or function in accordance with the present invention. First, biometric or other data is obtained by computer 32 using an input device 36 as illustrated in the step shown as block 340 of FIG. 6. Illustratively, the input device 36 may be a fingerprint reader, voice print reader, face or hand geometry reader, iris or retina scanner, a bar code reader, and RF or IR receiver, a magnetic stripe reader, a smart card reader, or other type of input device. The data is then formatted using standard formatting procedures. For example, biometric data may be formatted using CBEFF format which facilitates biometric data interchange between different system components and facilitates operability of biometric-based application programs and systems.

Once the data is obtained and formatted in the step shown as block 340, subsystem 30 exchanges disguise information with subsystem 330 and/or computing center 50 in a secure manner over network 40 as illustrated in the step shown as block 341. Computer 32 then uses the disguise information to disguise the data in the step shown as block 342 using the disguise techniques discussed herein or other suitable disguise techniques. Disguised data is then transmitted to the computing center 50 illustratively via network 40 as illustrated in the step shown as block 344. Computing center 50 may be located at a remote location such as at an outside facility or at another location within the same facility as subsystem 30. Computing center 50 then compares the disguised data received from subsystem 30 to disguised stored records stored in computer memory 54 or to disguised records received from another subsystem such as subsystem 330 as illustrated in the step shown as block 346. If at match is found in the step shown as block 346, then a "yes" answer is transmitted from computing center 50 to subsystem 30 via network 40. The transaction or function is then approved by computer 34 and performed in the step shown as block 348. If no match is found at step 346, then a "no" answer is transmitted from computing center 50 to subsystem 30 via network 40. The transaction or function is then denied by computer 34 as illustrated in the step shown as block 350.

Image Analysis

Determining if one image is a subset of another arises in many situations. For example, private image information (e.g., a person's face or a picture of the entrance to King Solomon's mines) can be compared to a secret set of images (e.g., photos of suspected foreign agents or spy satellite pictures) according to mutually secure outsourcing techniques of the present invention.

In an embodiment of image analysis according to the present invention, customer C1 possesses an N×N image I, and customer C2 posses a smaller n×n image object P. Image I can be viewed as a N×N image matrix, and image object P can be viewed as a n×n image matrix. Customers C1 and C2 desires to compute, with the help of Agent A an (N−n+1)× (N−n+1) score matrix $C_{I,P}$ of the form:

$$C_{1,P(i,j)} = \sum_{k=0}^{n-1}\sum_{k'=0}^{n-1} f(I(i+k, j+k'), P(k, k')); 0 \le i, j \le N-n$$

for some function f(x,y). Score matrices are often used in image analysis, specifically in image template matching, when one is trying to determine whether (and where) an object occurs in an image. A small C1,p(i,j) indicates an approximate occurrence of the image object P in the image I (a zero indicates an exact occurrence). C1 and C2 do not wish to reveal to A either I or P or the score matrix $C_{I,P}(i,j)$.

Frequent choices for the score matrix function f(x,y) are $f(x,y)=(x-y)^2$ and $f(x,y)=|x-y|$. First, consider the case where $f(x,y)=(x-y)^2$. Accordingly, the score matrix $C_{I,P}$ takes on the form:

$$C_{1,P(i,j)} = \sum_{k=0}^{n-1}\sum_{k'=0}^{n-1} (I(i+k, j+k') - P(k, k'))^2; 0 \le i, j \le N-n$$

The score matrix function for the case $f(x,y)=(x-y)^2$ is mathematically equivalent to:

$$f(x,y)=(x-y)^2=x^2+y^2-2xy,$$

and can be viewed as the sum of three matrices M', M", M, each corresponding to one of the above three terms on the right-hand side. Let M' (and respectively, M") be the matrix that corresponds to the $x^2$ term (and respectively, the $y^2$ term). Thus, M' depends on only image I and is computed by C1 in $O(N^2)$ time. Accordingly, although this computation can be outsourced if desired, performing the computation is within the computational limitations of C1. Likewise, M" depends on only image object P and is computed by C2 in $O(n^2)$ time. Outsourcing of this computation is possible if desired, but performing the computation is within the computational limitations of C2.

The matrix M that corresponds to the xy term is a two-dimensional reverse convolution. Computation of matrix M can be accomplished through the use of either method described above (as "Method 1" and "Method 2") for one-dimensional convolutions, as adapted for use in the computation of two-dimensional convolutions. The following substitutions are made into Method 1 and/or Method 2 to accomplish this:

image I replaces x
matrix M' replaces x'
image object P replaces y
matrix M" replaces y', and
matrix M replaces x⊗y The remainder of the computation proceeds as described above. Accordingly, C1 (and, if desired, C2) receive the result x'+y'+x⊗y, which equates to M'+M"+M. The result of M'+M"+M is score matrix $C_{I,P}$. Thus, for the score matrix function $f(x,y)=(x-y)^2$, mutually secure computation of the $C_{I,P}$ score matrix is achieved.

Second, in the second case where the score matrix function is of the form f(x,y)=|x−y|, the score matrix function f(x,y)=|x−y| reduces to f(x,y)=max(x,y), because |x−y|=max (x,y)+max (−x,−y). However, this simple reduction should not be used "as is" because it would reveal more than just the overall score matrix. It would reveal one score matrix for max(x,y) and another for max(−x,−y), which provides more information about image I and image object P that is necessary.

However, a practitioner of this embodiment of the present invention can use a slightly modified version of the f(x,y)= max(x,y) score matrix function that gives C1 and C2 the score matrix $C_{I,P}$ as well as two random matrices generated, respectively, by C1 and C2. This modified version is then used twice—once for each of the max(x,y) and max (−x,−y) in the above equation—and then the two random matrices are subtracted out by C1 and C2 (with each other's help). Accordingly, it is legitimate to consider the f(x,y)=|x−y| problem to be reduced to the f(x,y)=max(x,y) problem modified in the above-mentioned way. Therefore, in the discussion which follows, the modified score matrix function f(x,y)=max(x,y) is used, but two random matrices (one from C1 and one from C2) end up added to the resulting score matrix $C_{I,P}$.

The method for this embodiment uses as a subroutine a two-dimensional version of a securely outsourced convolution technique of the present invention. Let S be the alphabet, i.e., the set of symbols that appear in I or P. For every symbol x∈S the following Steps 1-6 are performed:

1. C1 replaces, in I, every symbol other than x with 0 (every x in I stays the same). Let $I_x$ be the resulting image. C1 also generates a random matrix $M_{A,x}$.

2. C2 replaces every symbol that is less than or equal to x with 1 in P, and replace every other symbol with 0. Let $P_x$ be the resulting image. C2 augments $P_x$ into an N×N matrix $\Pi_x$ by padding it with zeroes. C2 also generates a random matrix $M_{B,x}$.

3. Using a mutually secure outsourcing method of the present invention, agent A computes $D_x = I_x \otimes \Pi_x + M_{A,x} + M_{B,x}$ (where $\otimes$ signifies a reverse convolution in this case). In equation form, agent A computes:

$$D_x(i, j) = M_{A,x}(i, j) + M_{B,x}(i, j) + \sum_{k=0}^{n-1} \sum_{k'=0}^{n-1} \left( I_x(i+k, j+k') \left( \prod_x (k, k') \right) \right); 0 \le i, j \le N - n$$

4. C2 replaces, in the original P (i.e., not the P modified by Step 2), every symbol other than x with 0 (every x in P stays the same). Let $P'_x$ be the resulting image. C2 augments $P'_x$ into an N×N matrix $\Pi'_x$ by padding it with zeroes. C2 also generates a random matrix $M'_{B,x}$.

5. C1 replaces every symbol that is less than x with 1 in the original I, and every other symbol with 0. Let $I'x$ be the resulting image. C1 also generates a random matrix $M'_{A,x}$.

6. Using a mutually secure outsourcing method of the present invention, agent A computes $D'_x = I'_x \otimes \Pi'_x + M'_{A,x} + M'_{B,x}$ (where $\otimes$ signifies a reverse convolution in this case). In equation form, agent A computes:

$$D'_x(i, j) = M'_{A,x}(i, j) + M'_{B,x}(i, j) + \sum_{k=0}^{n-1} \sum_{k'=0}^{n-1} \left( I'_x(i+k, j+k') \left( \prod'_x (k, k') \right) \right); 0 \le i, j \le N - n$$

Assuming the above Steps 1-6 have been done for every x∈S, C1 and C2 now have the sum of all matrices $D_x(i,j)$ and $D'_x(i,j)$, which is:

$$\sum_{x \in S} (D_x + D'_x) = C_{1,P} + M_A + M'_A + M_B + M'_B$$

where $$M_A = \sum_{x \in S} M_{A,x}$$

$$M'_A = \sum_{x \in S} M'_{A,x}$$

$$M_B = \sum_{x \in S} M_{B,x}$$

$$M'_B = \sum_{x \in S} M'_{B,x}$$

Accordingly, both C1 and C2 have score matrix $C_{1,P}$ that corresponds to score matrix function f(x,y)=max(x,y), as well as two random matrices, one of which is created by C1 (matrix $M_A + M'_A$) and the other created by C2 (matrix $M_B + M'_B$).

If C1 and C2 share information about their respective random matrices, both C1 and C2 and derive score matrix $C_{I,P}$. The above requires a plurality of two-dimensional convolutions computations. The superlinear computational burden of these convolutions falls on the outsourcing agent(s) rather than on C1 and C2.

Fingerprint Matching

A visual, pixel by pixel comparison approach to matching fingerprints has been tried (it was used by law enforcement, etc., for decades) and found to be too slow for large sets of fingerprints, even using computers. Therefore, it is desirable to find a more efficient way of comparing fingerprints, while keeping the fingerprint information secure.

Fingerprint identification has three distinct levels:

Level 1: The pattern of ridges are classified into one of a small number of "types" depending on the general shapes of the patterns. For each type, some parts (features) are identified, e.g., the center of a whorl or the points where a ridge separates into two branches.

Level 2: Some simple counts are made using the features, e.g., the number of ridges crossing a line between two points, or the number of ridges in a whorl. There are perhaps between about 4 to about 20 possible Level 2 classes, depending on the fingerprint type and particular point features used. The classes, plus the associated counts, generate a system with many thousands of classifications. However, real fingerprints are not evenly distributed among these classes and the chances of an accidental match can be as low as one in a thousand for the more common classes.

Level 3: Minutia are small details such as: a ridge with a break, two ridges joined, a ridge has an "island" in it, a bridge (short ridge) joining two ridges. There are hundreds of minutia on a real fingerprint, many more than enough to make fingerprints unique among all the people in the world.

A Level 2 classification comprises a list of classes followed by the counts in each class. Two fingerprints are compared by matching these lists. The comparison is approximate because counts sometimes vary by one, due to effects in taking fingerprints.

According to the present invention, fingerprints can be disguised at Level 2 by mapping the image domain (a rectangle) by a random, smooth function. This preserves the classification while hiding the actual fingerprint into another rectangle. Then the resolution is decreased so that main ridges are clearly visible, but the minutia are not. Alternatively, disguised fingerprints can be compared by making several two-dimensional transforms of each image and comparing these. This adds greatly to the accuracy of identification when combined with the classification.

Fingerprints are compared at Level 3 by examining the minutia carefully (usually with magnification). Each minutia is typed and located on a portion of the image. Even a quarter of a fingerprint has about 100 minutia. Some of the minutia are innate to the person and others are the result of injuries, unclean fingers or fingerprinting devices, etc. Perhaps 20-40% of the minutia in a fingerprint are not innate, due to temporary and processing effects. However, the remaining 60+% of innate minutia still provide ample basis to identify someone conclusively, provided the portion of the fingerprint available is reasonably large.

In an embodiment of the present invention, the minutia are represented as a network (planar graph) of nodes with data at each node. Subgraphs of these graphs can be represented as strings and then disguised. The subgraphs to be compared in this way are identified using such means as would occur to those of skill in the art.

The string comparison method of disguise procedure DP18 discussed herein can be adapted for use to measure the similarity of the disguised subgraphs. Accordingly, a subgraph of fingerprint submitted for comparison comprises string T of disguise procedure DP18. A known fingerprint image, such as for example, a fingerprint image from a law enforcement organization's database, comprises pattern P of disguise procedure DP18. Score matrix $C_{T,P}$ is calculated according to DP18.

In an embodiment, the comparison of fingerprints can be outsourced with mutual security. A person can have his fingerprint taken and disguised. Then it can be compared by an agent A against fingerprints of known persons disguised in the same way. A person's identity is kept confidential through the disguise of his fingerprint. Further, such a procedure can be automated such as, for example, through the use of a device that automatically applies the disguises to a fingerprint as its imprint is taken, and then automatically compares the fingerprint against known fingerprints without giving any external access to the fingerprint under comparison.

In an exampled of mutually secure fingerprint comparison according to the present invention, police department C1 has fingerprint images from several possible suspects. The FBI (C2) agrees to check them for prior criminal records, but neither C1 nor C2 has the authority to release fingerprint images to the other. C1 and C2 agree to check whether and fingerprints held by C1 matches any fingerprints in the files of C2, using the mutually secure computational outsourcing techniques of the present invention. As discussed above, the mutually secure computational outsourcing methods of the present comprising string matching may be adapted for such a comparison.

The mutually secure outsourcing methods of the present invention may be adapted for many forms of computations, including computations where the information for the computation is held by three or more parties. In general, according to the present invention, the parties agree on a mutually acceptable disguising operation, each party applies the disguising operation to its part of the data, the disguised data is outsourced for computation, one or more disguised results are received, and, if necessary, the parties exchange the unveiling data so that each party can unveil the actual result(s) of the computation.

Figure 7:
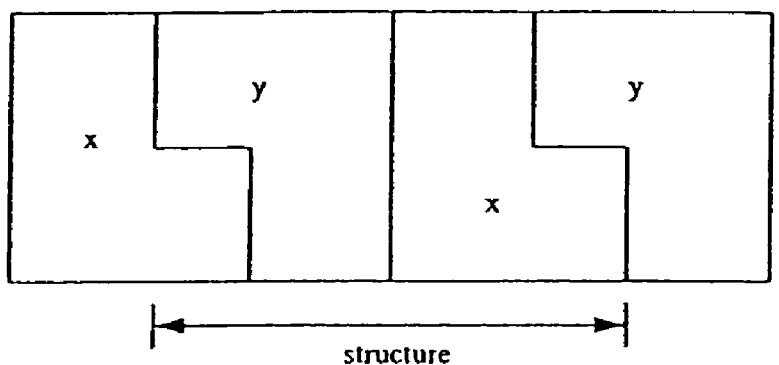
FIG. 7 shows a diagram illustrating data ownership between two parties according to an embodiment of the present invention.

Oil Exploration (Seismic Data Analysis). In an example comprising analysis of seismic data, companies C1 and C2 have seismic data on adjacent or intertwined geologic regions. A graphical representation of such a geological structure is shown in FIG. 7. Company C1 has seismic data on region x of FIG. 7. Company C2 has seismic data on geologic region y of FIG. 7. The desired information pertains to the geological structure for the area bounded as shown at the bottom of FIG. 7, comprising a portion of region x and a portion of region y. Companies C1 and C2 agree to combine their respective data for computations and share the resulting characteristics of the desired geological structure generated from the computations, without actually exchanging the data about geologic region x or geologic region y.

It is known in the art that geologic structure computations may involve a sequence of solving a plurality of subproblems, and the methods of the present invention are adaptable for this purpose. In addition, in some cases, a practitioner may need to disguise only the initial phases of the calculation to achieve an appropriate level of security.

Identity Matching. In the following examples, a comparison of identification data is desired by two owners of such identification data.

(A) Person C1 and police department C2 have DNA sequences. Person C1 might want to prove that he is not one of a set of crime suspects, an escaped felon, etc., without providing police department C2 with his DNA. Person C1 and police department C2 may agree to check whether C1's DNA matches any sequence held by C2, using the mutually secure computational outsourcing techniques of the present invention. The mutually secure computational outsourcing techniques involving string comparison may be adapted for such a comparison.

(B) A customer C1 presents his credit card with embedded private information (e.g., card number, retinal scan, fingerprints, voice print). Merchant C2 asks to check it against a list of stolen, fraudulent or invalid cards before letting the customer purchase an item. Using the mutually secure computational outsourcing techniques of the present invention, merchant C2 can do so without distributing the customer C1's private information to holders of the lists of bad cards, and without seeing the information itself. The mutually secure computational outsourcing techniques involving string comparison may be adapted for such a comparison.

Approximate String Similarity. The mutually secure computational outsourcing techniques of the present invention can be adapted for checking whether two strings are similar. Examples of such applications include analyzing if two texts (e.g., manuscripts or computer programs) are similar, such as, for example, to check for plagiarism or software piracy. However, application of the mutually secure computational outsourcing techniques of the present invention to string similarity analysis is not the same as in image matching or string matching. In string similarity analysis it is necessary to allow variability in string element during the analysis, to account for the fact that some text or software code might be deleted, added or replaced by text or software code of a different length.

Multi-Component Simulation. In an example comprising two manufacturers wherein manufacturer C1 has a gas turbine compressor design and manufacturer C2 has a gas turbine combustor design. Manufacturers C1 and C2 wish to know the performance of gas turbine made of these components, but they do not want to reveal their designs to each other. Such a simulation may involve the solution of a very large systems of equations. Thus, C1 and C2 could independently create their simulation equations, agree on how they interface and on a disguise technique, and then have the combined equations outsourced for solution using a mutually secure computational outsourcing technique of the present invention.

Disguise Of Planar Graphs

Figure 8:
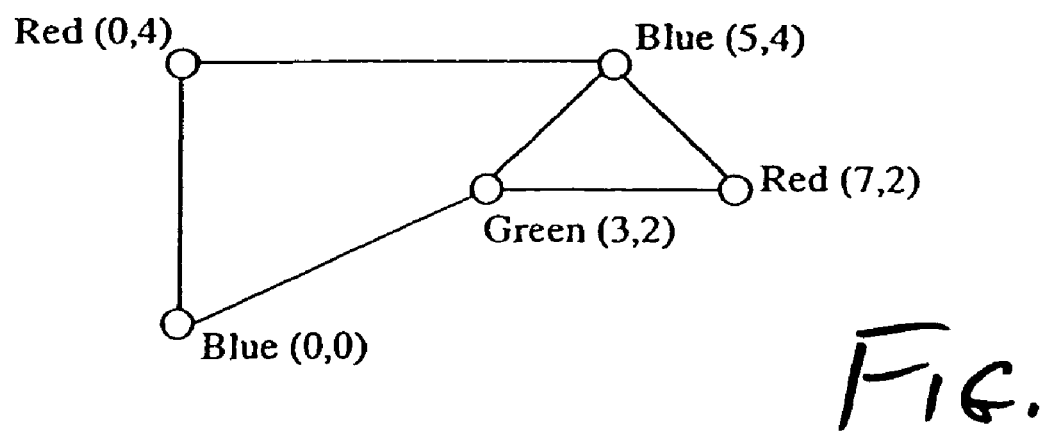
FIG. 8 shows one example of a planar graph according to an embodiment of the present invention.

A planar graph is a set of nodes that is connected by edges (lines) and the nodes may have data (such as, for example, coordinates and/or other data elements) associated with them. A simple example of a planar graph is shown in FIG. 8. Shown in FIG. 8 in association with each node are the coordinate of the node, and a data element comprising a color.

To disguise a planar graph, an algorithm is used to convert the planar graph to a character string. The data associated with the nodes then may be embedded in this string. One or more of the disguise procedures of the present invention can be used to disguise the resulting string.

Planar graph applications generally involve graphs with particular structure and patterns that can be used to simplify the disguise procedure. One illustrative software product for generating planar graphs is Visionics Inc.'s Face It system. Two examples, fingerprint comparison and human face recognition, illustrate the application of disguise techniques to planar graphs.

Human face recognition can be done by the "pixel by pixel" comparison approach. However, the number of comparisons required suggests that the pixel by pixel comparison approach is not the most desirable way to perform this comparison. Another drawback of the pixel-by-pixel approach is that the two pictures desired to be compared must be scaled to have the same size and they must be transformed so they are seen from the same direction. Even after this is done, a potentially large computation awaits. Therefore, it is desirable to find a more efficient way of comparing human face images. It is also desirable, in certain circumstances such as law enforcement, to protect the identities of the individuals whose faces are being compared.

Figure 9:
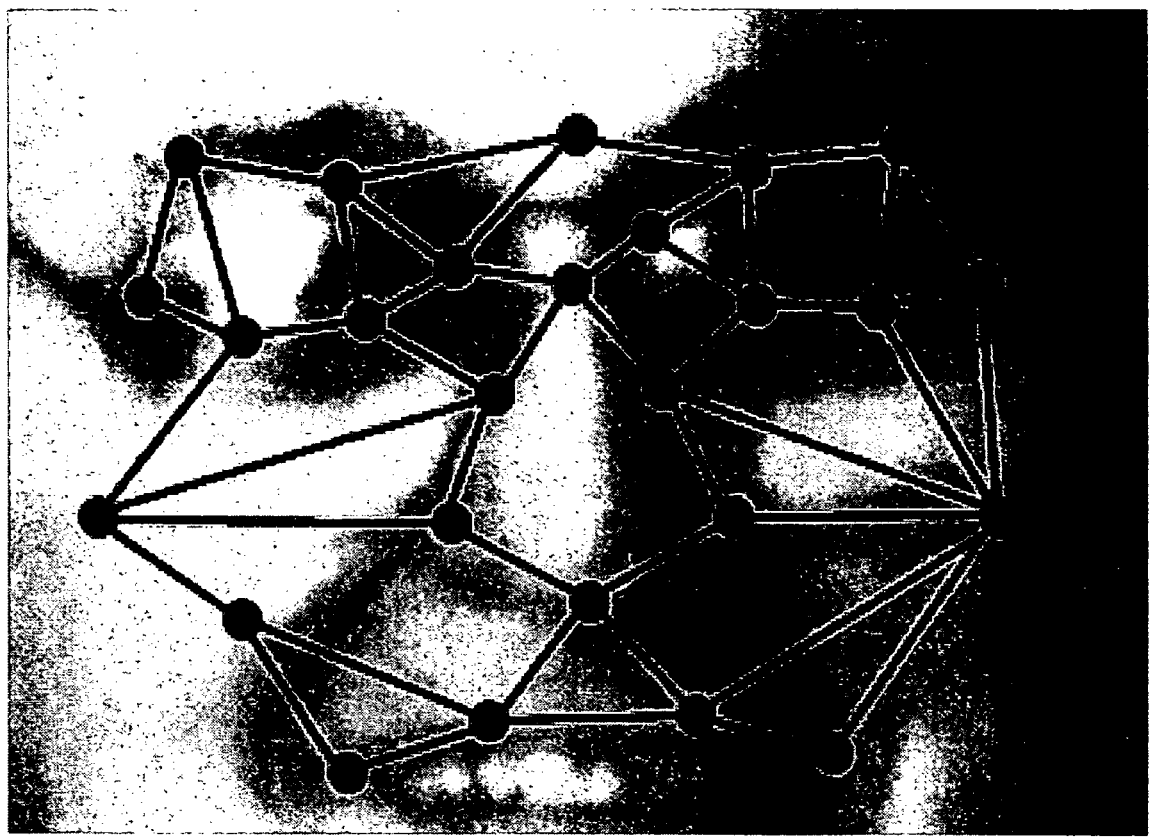
FIG. 9 shows an illustration of a planar graph according to an embodiment of the present invention representing a person's face.
Figure 10:
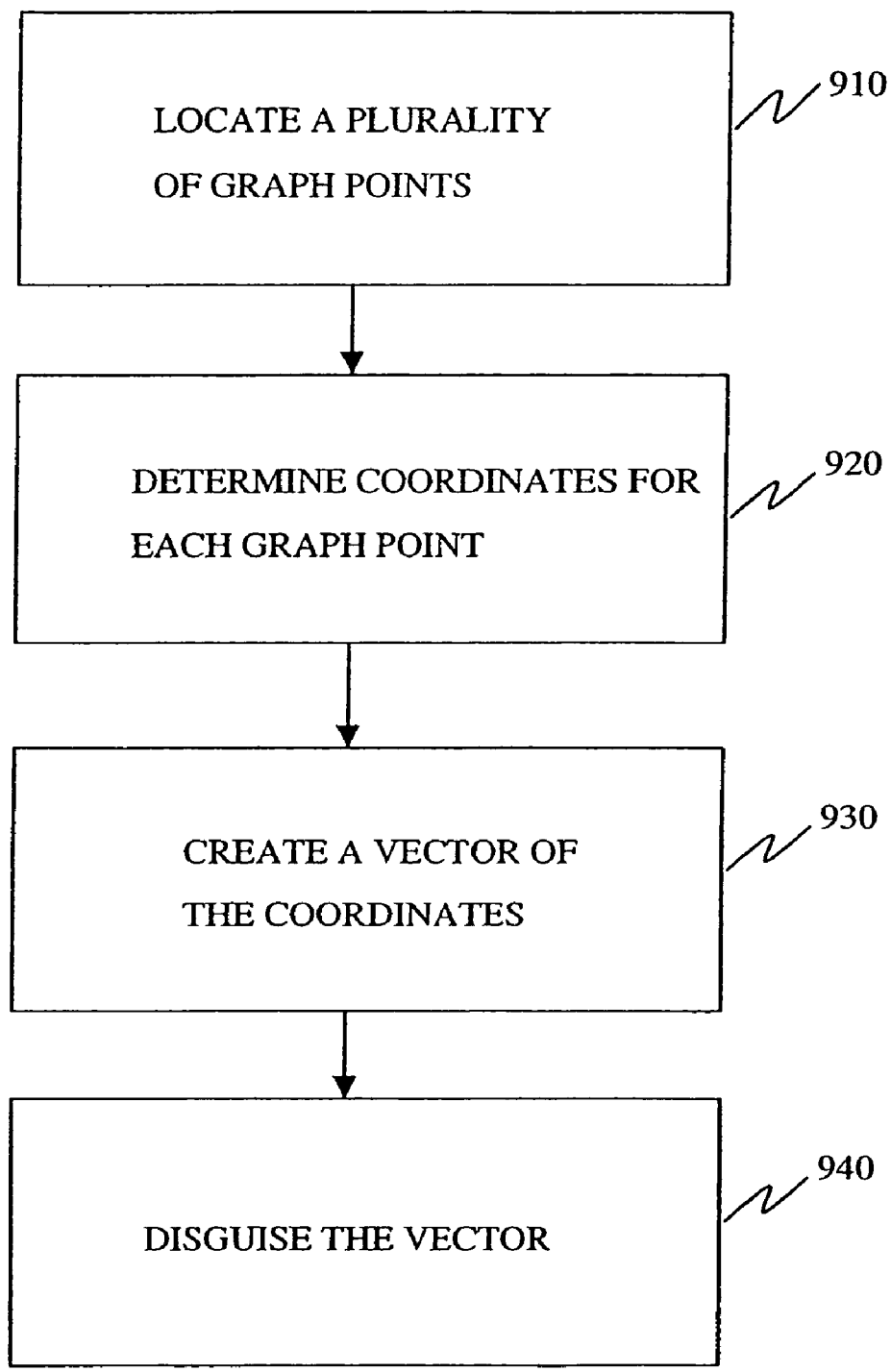
FIG. 10 shows a flow diagram of one method of disguising a planar graph according to the present invention.

The present invention comprises a method of disguising an image of a first human face, and comparing the disguised facial image against a disguised image of a second human face. A practical application of this method is for human face recognition. An example of human face comparison using a disguise operation is illustrated by FIGS. 9 and 10. Disguised images are useful when it is desired to maintain secret the identity of the person depicted in an image of a human face. Secrecy is maintained because the comparison operation is performed using disguised information, and access to the code for unveiling the disguised information is restricted. As shown in FIG. 9, and in the step shown as block 910 of FIG. 10, a number of points may be located on an image of a human face using computer programming logic. These points form a graph as illustrated in FIG. 9. The graph is "fixed," i.e., the same graph is used for the first facial image and the second facial image. Only the coordinates of the graph points and the data elements (if any) associated with the graph points change between the first facial image and the second facial image.

The coordinates of each graph point for each of the first facial image and the second facial image are determined in the step shown as block 920 of FIG. 10. If the facial images to be compared are not of the same size, a practitioner of the present invention must scale them to have the same size. If the facial images are not seen from a frontal view, a practitioner of the present invention should adjust the coordinates to generate frontal view coordinates.

To disguise each of the planar graphs, a vector for each graph is created. The planar graph representation of each facial image, such as that shown in FIG. 9, is reduced to a vector of N integers, in the step shown as block 930 of FIG. 10, by numbering the nodes and listing the graph point coordinates in numbered order. The data associated with the nodes then may be embedded in this vector.

In the step shown as block 940, the vector for the graph representation each of the first and the second facial image is disguised through the following steps, executed using computer programming logic: (1) a random permutation of the integers 1 to N is performed, and the vector is reorder accordingly; and (2) a random vector of N numbers in the range of about 20% (or more) of the face coordinate value range is generated, and this random vector is added to the previously reordered vector. If each graph representation is disguised using the same disguise technique, the disguised facial images for each of the first and the second facial images then may be compared by using a traditional comparison technique known in the art, such as the least squares or maximum distances between vectors method. When a comparison is determined to be successful, then the facial graph representations may be unveiled, using programming logic to perform the reverse function of the disguising operation and reveal the facial images.

The disclosed planar graph-based approaches to identification using disguise operations may be adapted for use in many additional diverse situations, including, for example, recognizing birds, airplanes, vehicles, furniture, buildings, and the like.

Securing Data and Files

There are many security risks against which it is desirable to protect data and program files. For example:

Image Theft, wherein an entire computer system (such as a portable or handheld device), file system or database (such as would be stored on computer disks, CD-ROMs, or other storage medium) containing an electronic image of the entire data set, is taken or copied;

Data Theft, wherein an end user accesses a computer system and obtains or copies some part of the data (for example, by printing the information displayed on a display screen coupled to the computer system, or by obtaining access to the data through a breach in security);

Tampering by Unauthorized Persons, wherein an end user accesses the system and changes some part of the data without the proper authorization; and Tampering by Authorized Persons, wherein an end user with proper authorization changes some part of the data in an erroneous, unintended, or improper way.

Data sets stored on a computer normally are accessed, either by an end user or a computer program, through an access program. For example, a word processing program is an access program for a dataset comprising a word processing document, a database system is an access program for a data set comprising financial information, a digital music reader is an access program for a data set comprising a digital music file, and a MPEG viewer is an access program for a data set comprising a motion picture.

Figure 11:
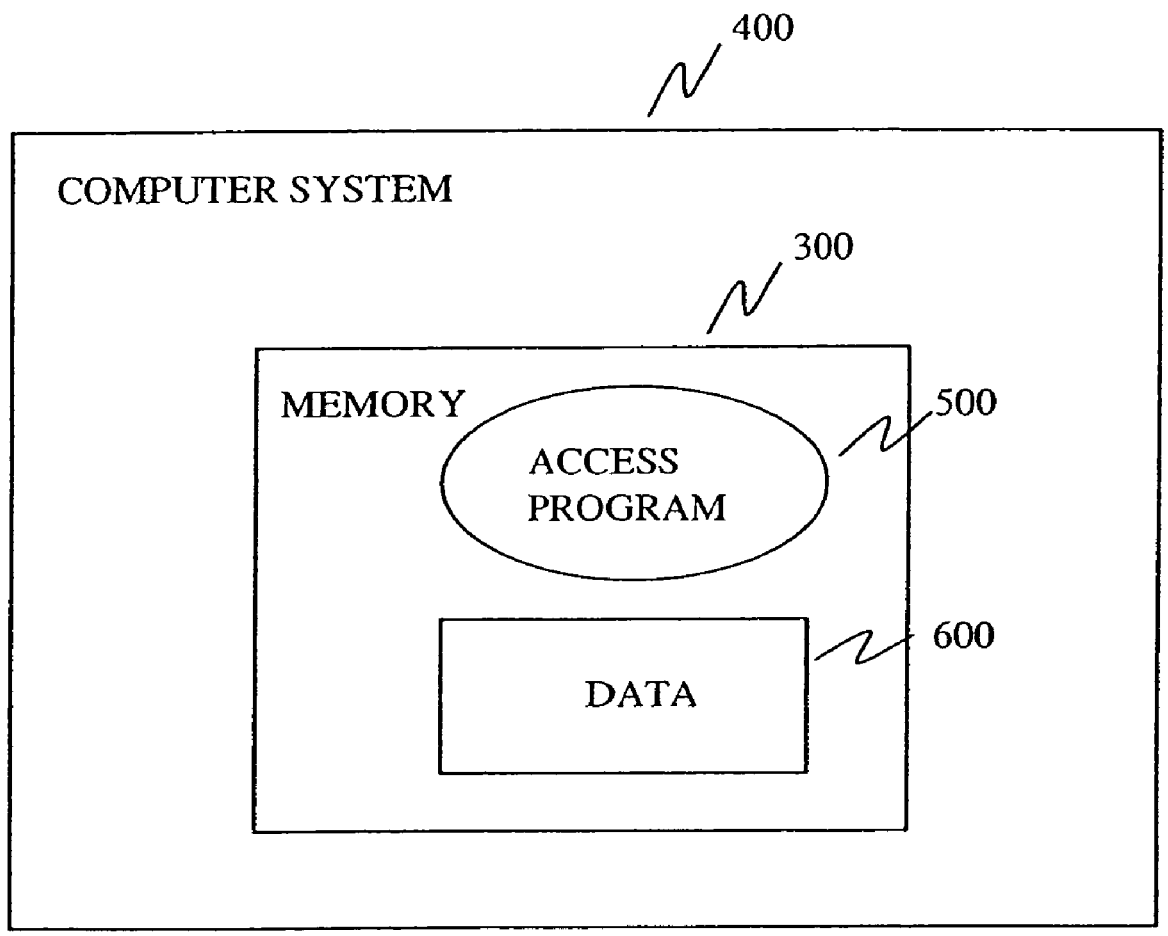
FIG. 11 shows a diagrammatic view of a system for securing data and files according to the present invention.

FIG. 11 shows a diagrammatic representation of a system for securing data and files according to the present invention. As shown in FIG. 11, memory 300 of a computer system 400 comprise an access program 500 and an associated data set 600. Memory 300 may comprise one or more computer memory components of the solid-state electronic type, electromagnetic type such as a hard disk drive, optical type like a Compact Disk Read Only Memory (CD ROM), a combination of any two or more of the foregoing, or another memory configuration as would occur to those skilled in the art. Data set 600 comprises data or information, such as, for example, a document, spreadsheet, digital music file, or other form of electronically stored data or information as would occur to those skilled in the art. For example, if data set 600 comprises a document, then a document reader, such as the software known by the trade name Adobe Acrobat, can be used to access and read, or "unveil," the data set 600. In this example, the Adobe Acrobat reader is access program 500.

An embodiment of the method for securing data and files according to the present invention comprises performing a disguise operation on data set 600, and tamperproofing access program 500. As used herein, "tamperproofing" comprises the application of one or more of the techniques described in U.S. application Ser. No. 09/455,580, filed Dec. 6, 1999, which is incorporated herein by reference. A high degree of security may be achieved by disguising data set 600 according to the methods described herein in conjunction with tamperproofing access program 500. However, other embodiments of the present invention may obtain moderate security simply by disguising data set 600, without tamperproofing access program 500.

Figure 12:
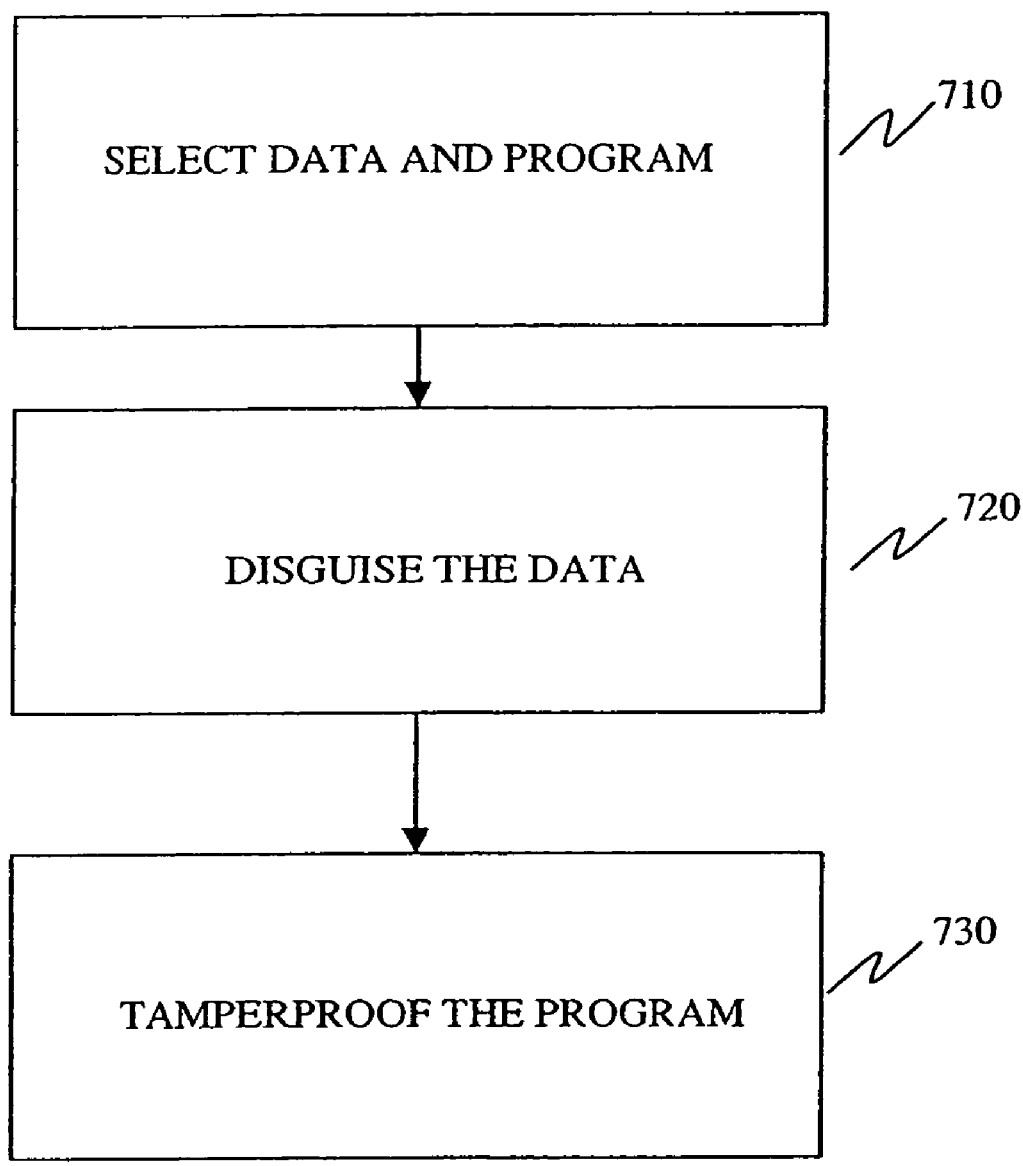
FIG. 12 shows a flow diagram of one method of securing data and files according to the present invention.

FIG. 12 shows a flow chart illustrating an embodiment of a method for securing data and files according to the present invention. In the step shown in the step shown as block 710 of FIG. 12, data set 600 is selected. Selection of data set 600 may be accomplished by a human end user via a user interface coupled to computer system 400, or by a computer program using computer programming logic. Also in the step shown as block 710, access program 500 for data set 600 is selected. Ordinarily, access program 500 is selected automatically using computer programming logic based on the data set 600 selected, but this is not always the case. Access program may be selected by a human end user via a user interface coupled to computer system 400.

In the step shown as block 720 of FIG. 12, the selected data set 600 is disguised using on or more of the data disguise techniques according to the present invention. The disguise technique selected for disguising data set 600 may be embodied in computer programming logic. Where the disguise technique comprises generating random numbers to be used in disguising data set 600, the computer programming logic may include a "key" that comprises one or more seeds for generating random numbers.

In an embodiment, data set 600 is disguised in the step shown as block 720 using a disguise technique that modifies the data set 600 in some way. For example, a random number may be generated corresponding to each data element in data set 600. Each data element in data set 600 may be modified by adding a random number to the data element. In another example, the data elements in the data set 600 may be randomly reordered.

After data set 600 is disguised, it can be undisguised or unveiled to recover the actual data set 600 using the access program 500, which is adapted for that purpose. In an embodiment, access program 500 comprises a key for reversing the disguise technique applied to data set 600 and unveiling the data. Alternatively, the user may be prompted to enter the key through a user interface when the user attempts to access data set 600 or access program 500.

In some situations, the only a small portion of data set 600 need be disguised to adequately protect it. For example, disguising about 1%-2% of a computer program may make it inoperable. Similarly, disguising about 5% of a music file may make it unacceptable for listening. On the other hand, disguising even 30%-40% of natural language (text or speech) might not make it unusable because of the high level of redundancy and context dependency in natural languages. Therefore, stronger protection is needed for data having a high level of redundancy and context dependency.

Encryption also can be used to hide the information in data set 600. Encryption will be known by those skilled in the art to be a process by which data is translated into an unintelligible form using a predefined encryption algorithm. However, if the data is encrypted, instead of disguised, an external agent cannot perform computations on the data without first decrypting it.

Disguise techniques have important efficiency advantages over encryption. Disguise operations are faster than encryption because it takes less work (e.g., programming code) to generate a random number to modify one element of data set 600 than it takes to encrypt or decrypt the same element. In addition, the encrypted data must be decrypted prior to performing a computation. In a computation outsourcing transaction, the outsourcing agent, such as, for example, computing center 50, has access to the actual data after it is decrypted, thereby compromising security.

Another advantage arises if data set 600 comprises real numbers. A disguise operation according to the present invention can treat these real numbers as atomic units rather than bit strings. Accordingly, computer hardware's floating-point processor may be used directly to perform a disguising operation, resulting in a substantial gain in efficiency.

Referring back to FIG. 12, in the step shown as block 730 thereof access program 500 is tamperproofed. In an embodiment, the tamperproofing technique(s) selected for access program 500 is/are embodied in computer programming logic, wherein access program 500 comprises an input to the computer programming logic, and a tamperproofed access program 500 comprises an output therefrom. Although disguising data set 600 protects against image and data theft, it does not protect against tampering or theft of the access program 500 which is used to unveil data set 600. Accordingly, tampering, theft, or unauthorized use of access program 500 may reduce the security of data set 600. The misappropriation of data set 600, and the tampering, theft, and/or unauthorized use of the access program 500, both can be prevented by tamperproofing access program 500 in combination with disguising data set 600.

One tamperproofing technique according to the present invention comprises obfuscating the computer programming code of the access program 500 to make to code difficult for an attacker to understand and analyze, but without sacrificing of any capabilities of access program 500. However, even obfuscated code may be attacked by executing access program 500 on a hardware simulator and then observing all the computations and data flow. In particular, when random numbers are used in disguising data set 600, an attacker might be able to observe the random numbers being generated and where they are used. This could compromise the security of data set 600. This kind of attack is expensive, but well within the capability of sophisticated and determined attackers.

Figure 13:
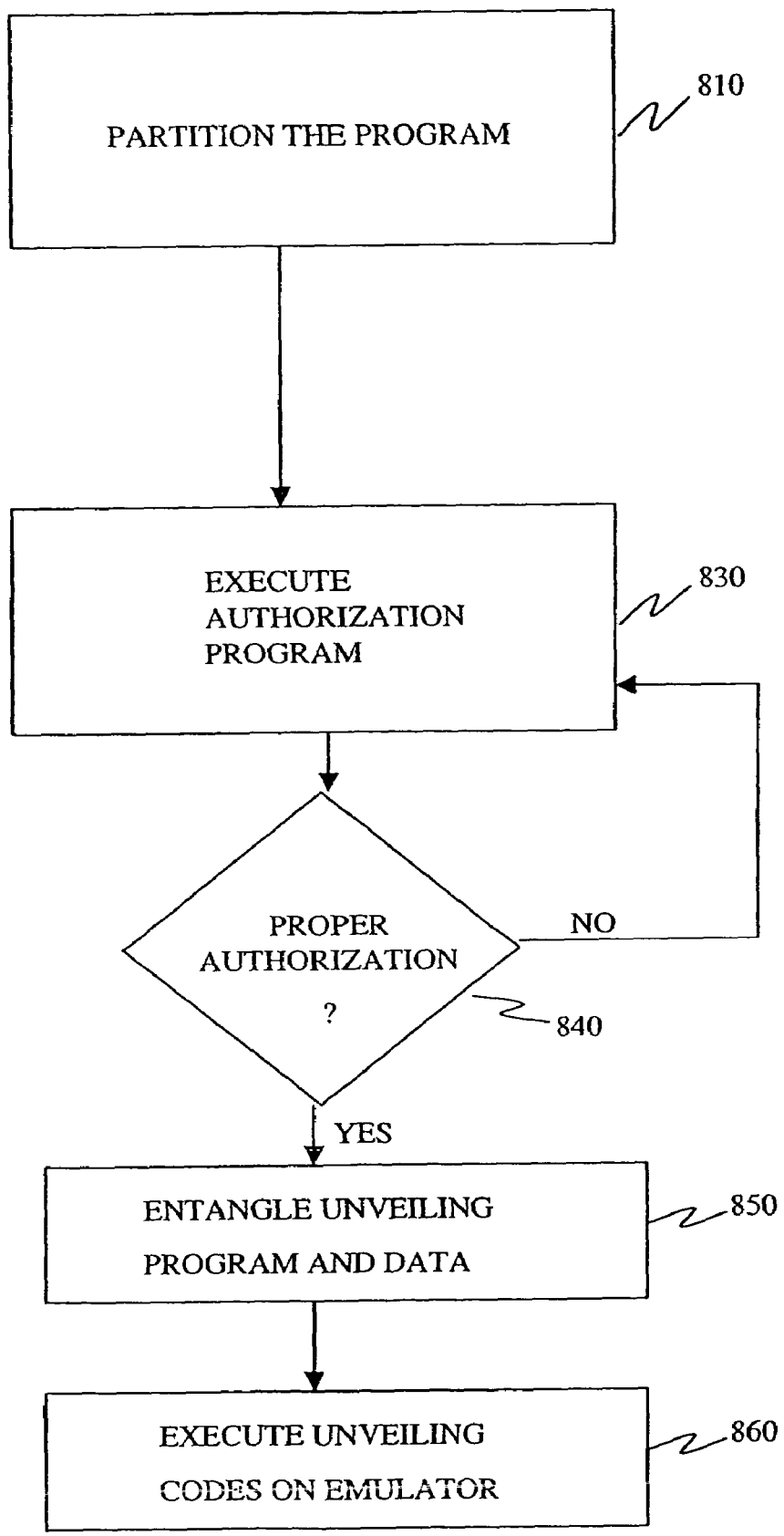
FIG. 13 shows a flow diagram of another method of securing data and files according to the present invention.

There are steps that can be taken to defeat such an attack, as shown in FIG. 13. In the step shown as block 810 thereof, access program 500 is partitioned into two parts: access authorization program 510 and unveiling program 520. Access program 510 is operable to determine whether execution of unveiling program 520 is authorized. Unveiling program 520 is operable to unveil data set 600.

In the step shown as block 830, access authorization program 510 is executed. Access authorization program 510 determines, in the step shown as block 840, whether execution of unveiling program 520 is authorized. In so doing, access authorization program 510 may verify that the user and/or the computer attempting to access data set 600 is/are authorized to do so. For example, the user may be required to provide a password, or may be required to provide biometric input with access authorization program 510 then comparing the password or biometric input to a predetermined value. In another example, the computer's serial number or other unique identifier may be evaluated, and compared to a predetermined value by access authorization program 510. Other forms of authorization which may occur to those skilled in the art also may be employed in access authorization program 510.

In an embodiment of the present invention, access authorization program 510 may check for the presence of a correct physical output device in the step shown as block 840. For example, access authorization program 510 may determine whether the expected audio output device is present for a data set comprising a music file, or whether an anticipated internal electronic path exists on a chip for a data set comprising a database. Assuming that a physical output device cannot be simulated completely, access authorization program 510 is both protected by tamperproofing and secure against a hardware simulation attack. Accordingly, access authorization program 510 becomes very difficult to modify, even by an authorized user, without the loss of essential capability. Data set 600 likewise is protected.

If access is authorized in the step shown as block 840, unveiling program 520 and data set 600 are "entangled" in the step shown as block 850, as described below. According to an embodiment of the present invention, the unveiling program 520 is executed on computer system 400 to generate a sequence of random numbers. In one implementation of this embodiment, a looping process is used. According to this implementation, data elements from data set 600 comprise inputs into the looping process. Thousands of statements are involved and most are used in an execution of the program, yet only a small number (about 5 to 10) of the statements perform necessary steps of the computation. The other statements are obfuscated which makes it very hard for anyone to understand how the program works and thereby remove the security protection.

The sequence of generated random numbers is divided into a plurality of random number generated code segments $L_i$, each comprising an "unveiling code." Data set 600 is divided into a corresponding number of data segments $D_i$. Then, the codes for the random number generated segments $L_i$ are interleaved between the data segments $D_i$, and the resulting interleaved segments are stored as data set 600. Accordingly, data set 600 now contains the sequence $L_i, D_1, L_2, D_2, \ldots L_n, D_n, \ldots$, where each $L_i, D_i$ represent the same part of the original data set 600. Each unveiling code $L_i$ then is executed by unveiling program 520, unveiling its corresponding data segment $D_i$.

In another embodiment, the function of each unveiling code $L_i$ is further enlarged so that it does the following:

(A) Retrieves the seed of the random number generator from $L_{i-1}$;

(B) Generates a number $N_i$ of random numbers and the locations where they are to be used to unveil $D_i$;

(C) Unveils $D_i$ and outputs the resulting information; and (D) Prepares the seed for $L_{i+1}$ and transfers control to $L_{i+1}$.

In alternative embodiments, the program 520 and data set 600 are further entangled for higher levels of security Disguise of data set 600 may be further enhanced by inserting small false data pieces at the beginning or end of one or more $D_i$. These false data pieces are created to appear to be data or program code or both. This makes it much more difficult to separate the unveiling code segments $L_i$ from the data segments $D_i$.

In the step shown as block 860 of FIG. 12, unveiling program 520 is executed on an emulator. An emulator is known to those skilled in the art to be a computer program or other device that imitates another program or device, for example, a computer program that enables an Apple Macintosh computer to emulate an IBM PC computer.

To create the emulator, a first programming language with 10-15 operations is devised. It is known by those skilled in the art that all computations can be expressed by such a language (see *Introduction to Computers*, by J. K. Rice and J. R. Rice, Holt, Rinehart, and Winston, 1969, incorporated by reference herein for a concrete example). Thus, it will be readily accepted by those skilled in the art that there are many alternatives for this language and its implementation.

Next, an emulator for this first programming language is written, using a second programming language that runs on computer system 400. Once the emulator is defined, then the code for unveiling program 520 is expressed in the emulator language rather than in its original programming language. The benefit from using an emulator rather than executing unveiling program 520 in its original language is twofold. First, and less significant, is that the code for unveiling program 520 is further obfuscated because it is expressed in an made-up emulator language. Second, and more important, is that an attack on the security of data set 600 using a hardware simulator is no longer effective, because such a simulation only "observes" the execution of the emulator code, obscuring the operation of the actual code for unveiling program 520 and the delivery of the unveiled data set 600.

According to the foregoing embodiment, the steps shown as blocks 830, 850 and 860 of FIG. 12 all are performed. However, it is within the scope of the present invention to perform only one, or only two of the steps shown as blocks 830, 850, and 860 to disguise the information 600.

There are two security risks that are not mitigated by the above techniques that are believed to be unavoidable. First is the recording attack, which is easily illustrated by music or video data. One simply runs the data through the player (output) device and then makes an audio or video recording is made of the output. This approach will always produce some perturbation in the data set 600, but with excellent players and recorders, the difference may not be apparent to a human observer.

The second risk is the tampering of data by persons authorized to change the data, i.e., those whose identity satisfies the step shown as block 840 of FIG. 12. One technique to overcome this problem, one can prevent everyone from changing the data in data set 600. This is more practical than it seems at first sight. One can keep the data unchanged, but add authorized "notes" about the data. For example, one can have the note "The deposit on May 7, 2001 is to be changed to $6,459.23. The balance for account 123-4567-8901 after May 7, 2001 is increased by $4,000.00. Authorized by Paul B. President on May 7, 2001." In such a case, access program 500 then must not only access the data, but also all the relevant notes.

Disguise Of Databases

Disguising symbolic information through the use of mathematical identities is discussed herein. The idea is, for example, to replace x in a symbolic formula by $x*(\sin^2 x + \cos^2 x)$, which changes nothing computationally since $\sin^2 x + \cos^2 x = 1$, but which obfuscates the symbolic information. Such identities may not be as useful in non-scientific applications, since the use of mathematical functions may not occur frequently in such nonscientific applications. Thus their use in disguising information in nonscientific applications would signal where and perhaps how the disguising is accomplished. Therefore, it is desirable to have a disguise technique that can be used in non-scientific applications, and, in particular, it is desirable to be able to disguise computer programs to protect them from the security risks discussed herein and other known in the art.

A database is known by those skilled in the art to be a collection of information stored on one or more computers and organized so that the information can be accessed by a computer program or by an end user via a user interface. Because a database includes many individual items of data, it is desirable to find an efficient way to protect these individual data entries from security risks, in addition to securing the database as a whole.

According to an embodiment of the present invention, to protect individual entries in a database, each data entry is disguised. However, the access key useable to obtain the information from the database regarding the data entry is not disguised. For example, if an end user is searching for information on "John Doe," the user will be able to type in a request to search for all information on "John Doe" and execute the search, because this key information is not disguised. However, the data retrieved from the database by the search will be meaningless to the end user unless the end user has the unveiling code, because the data retrieved from the database is disguised. By disguising each individual data entry in the database, the database as a whole is also protected.

Conceptually, a database can be represented as a text string and disguised as such according to the text string disguise techniques discussed herein. While this might be useful for transporting a database from one computer storage location to another, it does not allow the database to be accessed efficiently in normal use.

A more useful abstraction of a database is that a database is the combination of an access program with a data set comprising data entries. Accordingly, in the embodiment of the present invention shown in FIG. 14, the database is partitioned into an access program and a plurality of data entries in the step shown as block 1010. In the step shown as block 1012, a key or locator is assigned to each entry. In operation, the access program takes a request for information and computes the correct key or keys. This key is then used to locate the required information to be returned to satisfy the request. Thus, in a model of a database, for each data entry i, there are data items:

$K(i), D(i,j)$ for $j=1,2,\ldots,N$ where K is the key and D is the data set.

Figure 14:
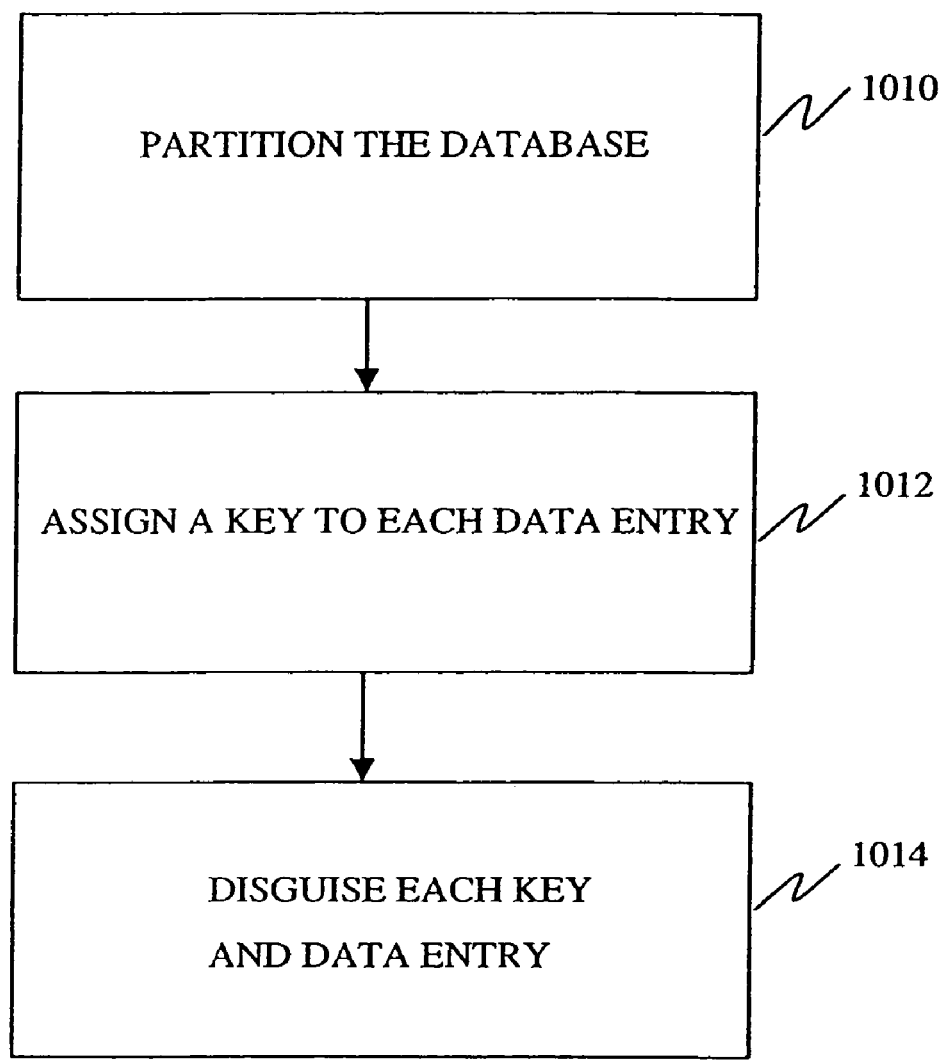
FIG. 14 shows a flow diagram of one method of disguising a database according to the present invention.

In the step shown as block 1014 of FIG. 14, each key and data entry is disguised. In one embodiment, the disguise operation adds random data and numbers to all data entries. If R denotes a random number generator, the model of the disguised database is, for each data entry i, there are data items:

$K^*(i)=K(i)+R(i), D^*(i,j)=D(i,j)+R(i+j)$ for $j=1,2,\ldots,N$

If the database owner keeps R secret, then this provides a simple way to secure the database from copying or unauthorized access. If it is necessary for a third party to access the data, the database owner can provide only that third party with an access code to unveil a single data entry of the disguised data.

In another embodiment of the present invention, disguise operations are used where the access program has secure user identification and usage facilities. Accordingly, a user could enter the access program and be authorized to use random number generator R in some constrained private way. For example, the database owner might allow the user to make just one request from the database. The user could provide $K(i)$, have $K^*(i)$ computed ($K^*(i)=K(i)+R(i)$), and privately access the data $D(i,j)=D^*(i,j)-R(i+j)$. This allows the disguised data $K^*(i)$, $D^*(i,j)$ to be publicly available and the database owner does not need to monitor the accesses to the data. The access program containing R should be secure. This security can be achieved by tamperproofing the access program. Then, the actual disguised data $K^*(i)$, $D^*(i,j)$ can be publicly stored and accessed.

Data Dependent Disguises

According to the present invention, a disguise can be strengthened by making the disguise program depend more heavily on the program data. Certain disguise methods discussed above are already data dependent in a weak way, specifically where the disguise method depends on:

1. Sizes of vectors, matrices, pixel arrays, character strings, etc., and
2. Approximate extremes of functions, pixel values, character sizes, etc.

It is desirable to find ways to strengthen disguise algorithms to increase the protection against security risks when the same disguise algorithm must be used repeatedly, for example, when an outsourced computation requires a large amount of data. Increasing the dependency of disguise algorithms on the data is one way to accomplish this.

It is within the scope of the present invention to increase the data dependency of disguises by, for example:

(A) using values of one or more data elements to determine at least a portion of the seeds of the random number generators used. For example, in the notation of the disguise programs, set temp=$G_{UNIF}(k(1),[0,L])$ and then use data(temp) as the seed for the random number generator where "data" is a vector or matrix element, a pixel value, a function value, etc., taken from the problem data. In more compact notation, this is using $G_{UNIF}(\text{data}(G_{UNIF}(k(1),[0,L_1]),[0,L_2])$;

which means that the seed (of the uniform random number generator $G_{UNIF}$) for the second random number generated is derived from the data value selected by the first random number generated.

(B) where one or more data elements comprises a function, creating a 5-10% perturbation of one or more of the functions for use as one of the basis functions of a random function space; or (C) where one or more data elements comprises a symbolic element, using one or more of the symbolic elements (e.g., $\sin(3.12x)$) or parts thereof (e.g., $3.12=1.09+2.03$) to perform a disguising operation.

The data dependent disguises are helpful because they make the disguise process more complex and thus more difficult to break.

The data dependent disguises are especially useful in cases where a single disguise is used repetitively. For example, if the customer has a huge number of items to be outsourced, creating individualized disguises may be very burdensome. If the same disguise program is used over and over again, it provides an opportunity for someone to break the disguise because the random numbers would be used over and over again. If the disguise program is data dependent, this would not happen and the overall "collection" of outsourced computations would be much more secure.

Identities for Disguising Computer Programs

Another embodiment of the present invention comprises computer program identities, which change nothing computationally in the computer program, but which are effective for obfuscating a computer program to prevent unauthorized access to or use of the program. The obfuscation of the computer program occurs through code entanglement where the original program code is entangled with that of the program identities. The resulting code is known as a "tangle."

Desirable features of a tangle include (i) an intentionally complex logical structure; (ii) the mixing together of several subprograms or threads of control in a way to obscure each of them; (iii) the use of only simple statements to express a computation; (iv) the choice of variable names and statement labels so as to be as meaningless as possible; and (v) making multiple uses of the variables involved, including misleading variables that are not involved in the underlying "real" computation. In other words, a tangle is mixing, rewriting, and reorganizing of several computations so as to enhance the obscurity of the program code and to enhance the difficulty in understanding or tracing through it.

Figure 16:
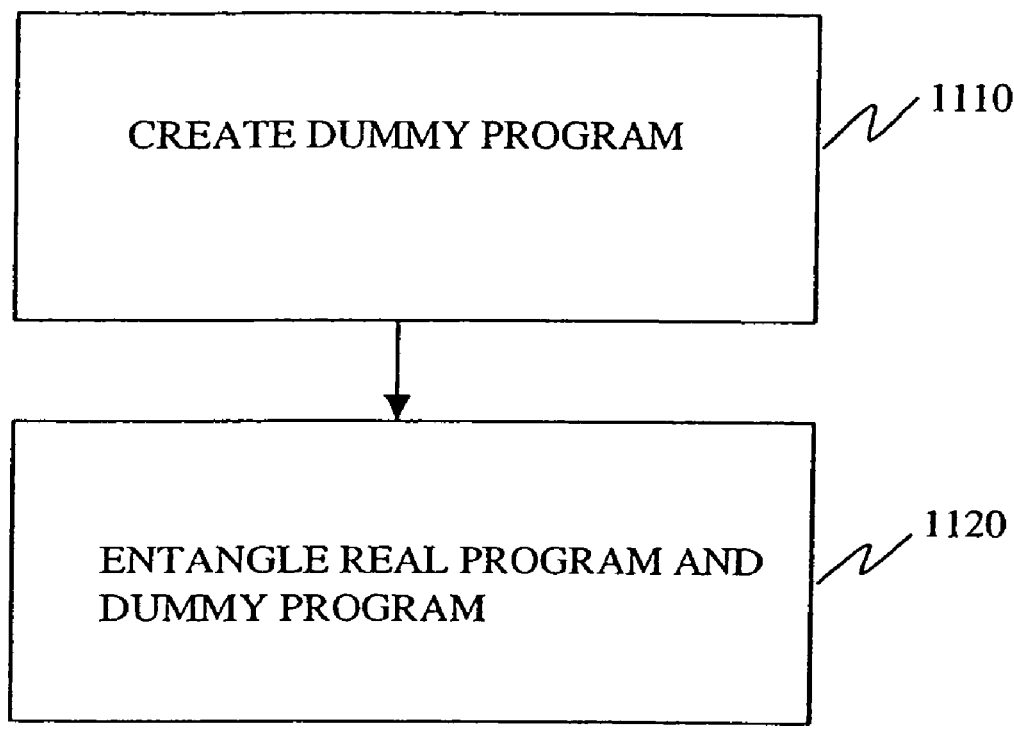
FIG. 16 shows a flow diagram of one method of disguising computer programs according to the present invention.

FIG. 16 shows a flow chart illustrating a method for creating a tangle according to the present invention. As shown in FIG. 16, "dummy" program code, i.e., computer code that performs no meaningful function and has no effect on the results of the execution of the real computer program code, is created in the step shown as block 1110. In the step shown as block 1120, the dummy program is tangled with the real computer code. An end user looking at the tangled code is unable to determine which parts of the code are the real code and which parts are the dummy code.

Preferably, a tangle is "opaque" in two ways. First, the tangle preferably is opaque to inspection; a person inspecting the code cannot untangle the code by reading it or even when using software tools known in the art, such as debuggers, decompilers, and program monitors. Second, the tangle preferably is opaque to program tracing based on simulating the hardware, including memory maps at all levels, using hardware simulators of a type known in the art.

The following method illustrates code entanglement according to the present invention. In a first code fragment (X1, X2)→OP-A→(Y1, Y2), OP-A is an operation, X1 and X2 represent values prior to the performance of operation OP-A, and Y1 and Y2 represent values after the performance of operation OP-A. In a second code fragment (a1, a2)→OP-G→(b1, b2)

OP-G is an operation, a1 and a2 represent values prior to the performance of operation OP-G, and b1 and b2 represent values after the performance of operation OP-G.

It is desired to entangle these code fragments within a tangle. The creation of a tangle comprises two types of input and output:

Real: The real input is transformed into the real output.

Dummy: The dummy input is used in the tangle and leads to the dummy output. The dummy output need not be used beyond the tangle.

According to this embodiment of tangle creation, the entanglement method proceeds as follows:

Step 1: Make 5 copies each of X1, X2, a1, a2. Four copies of each comprise the dummy input of a tangle. One copy of each comprises the real input of the tangle.

Step 2A: When X1 and X2 appear in the real output from the tangle, they are used to perform OP-A(X1,X2) which, in this instance, produces "tempA." Five copies of tempA then are made. Four copies of tempA comprise the dummy input of a second tangle. One copy of tempA comprises the real input of the second tangle.

Step 2G: When a1 and a2 appear in the real output from the tangle, they are use to perform OP-G(a1,a2) which, in this instance, produces "tempG." Five copies of tempG are made. Four copies of tempG comprise the dummy input of a second tangle. One copy of tempG comprises the real input of the second tangle.

Step 3A: When tempA appears in the real output form the second tangle, it is placed into (Y1, Y2).

Step 3G: When tempG appears in the real output from the second tangle, it is placed into (b1, b2).

Figure 15:
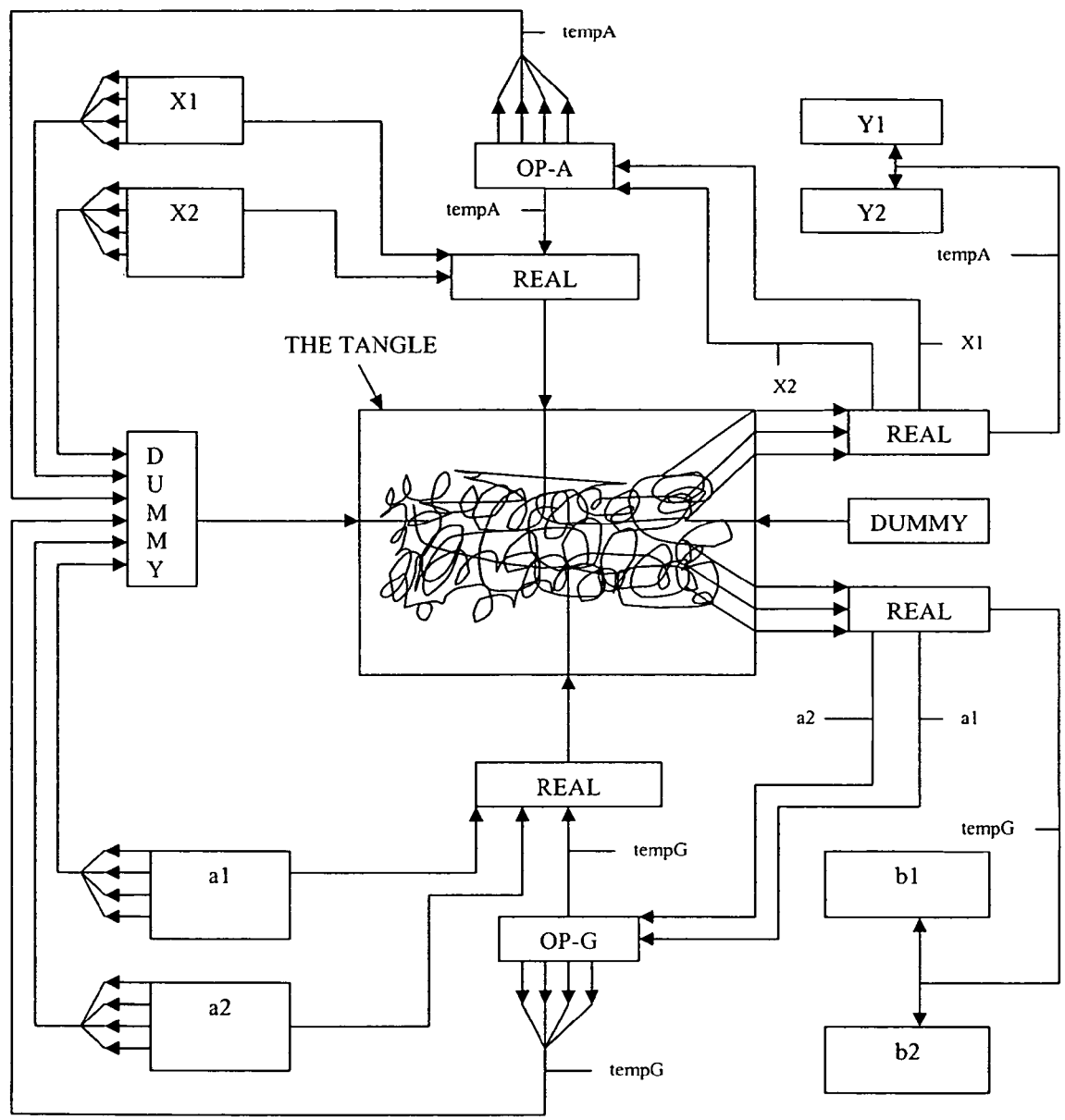
FIG. 15 shows an example of a tangle according to the present invention.

The code in the tangle must have two properties. First, it must be complicated and mix all the input variables to a considerable degree. Second, it must regenerate the dummy input values from time to time during the computation. An illustration of this process is shown in FIG. 15. The figure shows OP-A and OP-G outside the tangle, but in practice, these operations would be in the middle of the tangle also. Likewise, the preceding description discussed use of a second tangle. It is within the scope of the present invention that use of a second tangle may be accomplished by a two iterations of a single tangle.

A code entanglement system has another dimension, namely, multiple statements in both the application and codes. The dummy and real inputs are mixed across operators, as well as among themselves.

The steps used to create a large tangle from two smaller ones are as follows:

Step 1: Create a first Tangle code, T1, similar to that discussed above in reference to FIG. 15, with real inputs X1, X2, a1, and a2 (as in FIG. 15) replicated approximately 3 to 4 times.

Step 2: Collect the real outputs Y1, Y2, b1, and b2 (as in FIG. 15) at the end of T1 and compute $temp1=2*Y1+Y2$ $temp2=b1+b2$ Step 3: Create second Tangle code, T2, similar to that discussed above in reference to FIG. 15, with the inputs temp1 and temp2 replicated approximately 3 to 4 times.

Step 4: Collect the real outputs temp1 and temp2 at the end of T2, call them temp3 (which has the value temp1) and temp4 (which has the value temp2). Compute $b1=temp4-b2$ $Y2=temp3-2*Y1$ Step 5: Entangle the program instructions of T1 and T2 in a way that makes it difficult to distinguish between the program instructions of T1 and the program instructions of T2, but that does not prevent proper execution of T1 or T2.

This entanglement method can be used multiple times and with multiple iterations. Further, it is within the scope of the present invention that the statements in Steps 2 and 4 can serve the purpose of advance the computation instead of merely obfuscating it. For example, the function of a program into which an tangle is to be installed may include computing "temp1=2*Y1+Y2" and "temp2=b1+b2," and then "temp3=Y2−temp2" and "temp4=temp1+b2." Recall from the discussion of FIG. 15 above that OP-A had inputs X1 and X2. In this example, OP-A of tangle T2 can be a subtraction operation with input X1 replaced by Y2 and input X2 replaced by temp2. Recall from the discussion of FIG. 15 above that OP-G had inputs of a1 and a2. In this example, OP-G of tangle T2 can be an addition operation with input a1 replaced by temp1 and input a2 replaced by b2. Accordingly, OP-A of tangle T2 computes temp3=Y2−temp2, and OP-G of tangle T2 computes temp4=temp1+b2.

The entanglement methods used in T1 and T2 may be completely independent and different. In an embodiment, the following practices may be used to enhance the obfuscation of the tangle codes:

(A) The dummy outputs of T1 may be also used as inputs to T2.

(B) The operations "2*Y1+Y2" and "b1+b2" may inserted into the codes T1 and T2 at various places using new dummy variables, such as, for example, $\alpha$, $\beta$, $\gamma$, and $\delta$, for the input and output.

(C) There may be no clearly defined end of T1 or beginning of T2. For example, in one implementation, the expression "temp1=2*Y1+Y2" could appear 78% of the way through T1, and the expression "temp2=b1+b2" could appear 92% of the way through T1. Then temp1 and temp2 could first be used in T2 at 6% and 18% of the way through T2, respectively. The placement of temp1 and temp2 in T1 and T2 according to this example represents only one of many possible implementation of this concept.

(D) The tangle codes T1 and T2 may use very simple operations, without, for example, library calls for operations such as "max," "min," or "sign." Similarly, the use of arrays and array operations may be avoided. In an further example, looping constructs are not used. Instead, loops in T1 and T2 are built from primitive operations using tests and jumps. Thus, even if the tangle codes T1 and T2 are programs written in a high level language like C, Fortran, or Java, they are essentially machine language codes.

Creation of a tangle according to the present invention can be illustrated by the following example. The pseudocode computer program to be tangled according to this example is designed to execute the following simple computations:

$$a=2*b+c$$

$$x=y+z$$

Shown below are four pseudocode segments illustrating steps performed in creating the tangle according to an embodiment of the present invention. The first pseudocode segment comprises 40 pseudocode program instructions. According to this example of the creation of a tangle according to the present invention, these pseudocode program instructions merely obfuscate the execution of the above computations. They do not advance the execution of these computations.

The second pseudocode segment comprises pseudocode for a template procedure called NORM. In an embodiment, the template procedure NORM has arguments x, y, k, and parameters a, b, m, and n. The argument x represents the input argument to NORM. The arguments y and k represent the output arguments. The parameters a, b, m, and n are used to tailor NORM for specific applications. As shown hereinafter, the NORM procedure is inserted in-line within the tangle code. In an embodiment, it has several parameters in its structure so that where multiple copies of NORM are inserted into the tangle code, the copies can differ considerably if desired by a practitioner of the present invention. In an embodiment, multiple copies of the procedure NORM also use random numbers for constants for further differentiation.

The third pseudocode segment comprises the first pseudocode segment as expanded by substituting the pseudocode for the procedure NORM (the second pseudocode segment) for each instance where the procedure NORM is used in the first pseudocode segment. Through these substitutions, the first pseudocode segment is expanded from 40 program instructions to more than 600 program instructions. However, the third pseudocode segment computationally is identical to the first pseudocode segment. In addition, the program instructions of the third pseudocode segment serve merely to obfuscate the execution of the desired computations. They do not advance the execution of these computations.

The fourth pseudocode segment represents sample of approximately 60 pseudocode program instructions from the final tangled pseudocode computer program, after further processing according to the present invention.

Eighteen arguments are used in generating the tangle code according to this example. The arguments R1, R2, R3 and R4 represent real arguments. The arguments D1, D2, D3, D4, D5, D6, D7, D8, D9, D10, D11, D12, D13, and D14 are dummy arguments. Initially, the arguments are assigned to matrix A, vector V, and variables X1, X2, X3, and X4 as follows:

| | |
|---|---|
| Matrix A: | D1 D2 R1 |
| | D3 R2 D4 |
| | D5 D6 D7 |
| Vector V: | D8, D9, D10, R3, D11 |
| Variables | X1: R4 |
| | X2: D12 |
| | X3: D13 |
| | X4: D14 |

As shown in more detail hereinafter, these data structures are used in defining the tangle template. However, after the tangle code is created, the data structures are "removed" and all arguments are shown in terms of simple variables.

In the pseudocode which follows, the procedures MAX, MIN, TRANSPOSE, SIGN, ABS, DOTPRODUCT, and NORM are used. The procedure MAX receives two or more numbers as its input arguments, and then outputs the largest number in the set of input arguments. The procedure MIN receives two or more numbers as its input arguments, and then outputs the smallest number in the set of input arguments. The procedure TRANSPOSE receives a matrix as its input argument, and then transposes the matrix. The procedure SIGN receives a variable as its input argument, and then outputs a 1 if the argument is positive, a 0 if the argument is 0, or a −1 if the argument is negative. The procedure SIGN also may receive a vector or matrix as its input, in which case it outputs the vector or matrix (as the case may be) in which each scalar component x of the vector or matrix has the value SIGN(x). The procedure SIGN receives a variable as its input argument, and then outputs the variable multiplied by −1. The procedure SIGN also may receive a vector or a matrix as its input, in which case it outputs the vector or the matrix (as the case may be) in which each scalar component of the vector or the matrix is multiplied by −1. The procedure ABS receives a number as its input argument, and outputs the absolute value of its input argument. The procedure ABS also may receive a vector or a matrix as its input, in which case, it outputs the vector or the matrix (as the case may be) in which the absolute value of each scalar component is computed. The procedure DOTPRODUCT outputs the dot product of two vectors received as input arguments. The procedure NORM receives a number x as its input argument, and outputs a number y that is between 1 and 10, and an integer k, such that y and k satisfy the following equation: $x=y*10^k$. The procedure NORM receives a number as its input argument, and outputs the corresponding base number and exponent in base 10, representing the input argument in scientific notation. The procedure RAND (−) receives a random number generator seed as its input argument, and outputs a random number between 0 and 1, according to a uniform distribution. According to the present invention, as a tangle is created each of these procedures is expanded in-line using lower level statements so as to further obfuscate the computations.

The pseudocode presented below should be viewed as a template for creating tangle code to obfuscate a computation (such as a=2*b+c, x=y+z). A practitioner of the present invention can further modify the pseudocode in an implementation of a tangle according to the present invention by, for example:

1. Permuting the order of appearance of items in the matrix A and/or vector V, and/or reordering the variables X1 through X4.

2. Adjusting the dimensions of the matrix A, vector V, and the number of variables. For example, the size of matrix A, vector V, and the variables X are 3×3, 5×1, and 1,1,1,1, respectively. It will be appreciated by those skilled in the art that these sizes can easily be changed in the pseudocode to be, for example, 2×3, 9×1, and 1,1,1, respectively.

The following is the first pseudocode segment comprising 40 pseudocode program instructions. Note that procedures MAX, MIN, TRANSPOSE, SIGN, ABS, DOTPRODUCT, and NORM are not yet expanded in this pseudocode segment.

```
A(1,1) = A(1,1) + X1
A(3,3) = A(3,3) + X2
A(3,1) = A(3,1) + X3
TRANSPOSE A
VN = (NORM(V(1)),NORM(V(2)),NORM(V(3)),NORM(V(4)),
    NORM(V(5)))    \NORM is the template function-see below
VN = MAX (VN, ABS(V)+12) –
    (RAND(-)-1,RAND(-),RAND(-)*2,RAND(-)*3,RAND(-)*4)
Vsign=SIGN(V)
VN(1) <-> VN(2),
VN(3) <-> VN(4),
V2(1) = X3
V3(3) = VN(3) + VN(3)
V2(1) = - NORM(V2(1))+RAND(-)/8
V2(2) = - NORM(V2(2))+RAND(-)/7
V2(3) = - ABS(V2((3))+RAND(-)/6
X7 = MIN(V2)
X8 = MAX(V2)
X9 = X7-10-RAND(-)/2
X10 = X8-12-RAND(-)/3
X11 = X9/2-4
X12 = X10/2-4+1.3
V = (X11, X12, X9, X10, V(2))
V = DOTPRODUCT (V, Vsign)
A(1,1) <- NORM(A(1,1))
A(3,3) <- NORM(A(3,3))
A(1,3) = MAX(A(1,1),A(3,3)/2)-RAND(-)/5
A(3,2) = X1
X1 = A(2,)
A(2,3) = NORM(X2)
V3 = (SIGN(A(1,3)), SIGN(A(2,2)), SIGN(A(3,1)))
A(1,2) = NORM(A(1,2))
A(2,1) <->-A(3,3)
A(1,3) = ABS(A(1,3))+12
A(2,2) = ABS(A(2,2))+16
A(1,3) = ABS(A(1,3))+4
X12 = MAX (col 1 of A)
X13 = MAX (col 2 of A)
X14 = MAX (col 3 of A)
A(1,3) = (X12-12)*V3(1)
A(2,3) = (X13-16)*V3(2)
A(3,3) = (X14-4)*V3(3)
```

This first pseudocode segment constitutes most of the obfuscatory tangle code, albeit prior to the in-line expansion of the procedures. The code comprising the actual computations (i.e., a=2*b+c, x=y+z) also is needed and will be added in a later stage.

The next step in creation of the tangle code is expanding the procedures MAX, MIN, TRANSPOSE, SIGN, ABS, DOT-PRODUCT, and NORM into in-line pseudocode.

Expansion of the procedure NORM is illustrated in this example, it being understood that the principles demonstrated thereby can be adapted to expansion of the other procedures. Note that NORM is more complex than the other procedures, thus it provides more obfuscation and more possibilities for variations.

Recall that the procedure NORM can be represented in this example as NORM(x). The argument x represents the input argument to NORM. The arguments y and k represent the output arguments. The function of the procedure NORM is to normalize a number. In other words, the procedure takes a first number x as its input, and returns a second number y that satisfies $1 \leq y \leq 10$, and a third number k that is the approximate exponent of x in base 10.

The parameters a, b, m, and n are used to tailor NORM for specific applications. Parameters a, b, m, and n are specified when the code for NORM is generated for a particular application. Once specified for a particular application, they do not change during the use of NORM in that application.

The following pseudocode segment comprises pseudocode for the procedure called NORM. Variables with numerical suffixes (such as "y1" and "a2") are local to NORM.

```
        y1 = x
        a1 = MIN(a,2)
        b1 = MAX(b,8)
        c1 = a1 + b1 + x
        a2 = MAX (a1,1)
        b2 = MIN (b1,10)
        c2 = MIN (x,c1)
        a3 = 3+a2-2
        b3 = .25*b2+7
        c3 = (c2+(1+x)/2)
        If x < 0 then y1 = –x
        If y1 < a3 goto Lab 1
        If y 1 > b3 goto Lab 2
        k = 0
        y2 = x+b3+y1
Lab 3:  y3 = b3–x
        y4 = y3–a3 * (.5+RAND(-)/2)
        y5 = MIN(x,y4)
        y = y5
        EXIT PROGRAM
Lab 1:  k1 = –1
Lab 11: TFOR i = 1 to m do
        y3 = y1*(9.5+RAND(-))
        k1 = k1-.9+RAND(-)/5
        If y3>a3 goto Lab 3
        End TFOR
        y4 = y3+X
        y5 = y3*(9.75+RAND(-)/2)
        k1 = k1-.95+RAND(-)/10
        k = k1
        If y5 <a3 then [y1 = y5, goto Lab 11], else [y2 = y5, goto Lab]
Lab 2:  k1 = 1
Lab 21: TFOR j = 1 to n do
        y4 = y1/(9.6 +RAND9-)*.8)
        k1 = k1+.97+RAND(-)*.06)
        If y4<b3 goto L3
        End TFOR
        y3 = (y4+x)*.5
        y5 = y4*(9.8+RAND(-)*.4)
        y1 = y5
        If y1 > b3 then goto Lab 21, else [y2 = y1, k = k1, goto Lab 3]
```

The third pseudocode segment comprises the first pseudocode segment as expanded by substituting the pseudocode for the procedure NORM (shown above as the second pseudocode segment) for each instance where the procedure NORM is used in the first pseudocode segment. In addition, the loop statement "TFOR . . . End TFOR" of the NORM procedure is expanded using the parameters m and n to define the number of unrolled loops in the pseudocode. Through these substitutions and expansions, the first pseudocode segment is expanded from 40 program instructions to more than 600 program instructions.

In addition to substitutions and expansions, the third pseudocode segment has been rearranged in various ways to hide the content and structure of the first pseudocode segment, without affecting computational integrity. For example, the logic of certain "if . . . then" and "if . . . then . . . else" statements has been altered to provide equivalent conditional instructions. The sequence of certain unrelated instructions has been changed. The identities of the pseudocode variables are hidden by giving them "meaningless" names. These represent only a small subset of possible obfuscatory techniques. Other obfuscatory techniques as would occur to those of skill in the art may be used in addition to or in lieu of these techniques.

The following is the third pseudocode segment. Recall that, despite the complexity of this pseudocode segment, the third pseudocode segment computationally is identical to the first pseudocode segment. In addition, the program instructions of the third pseudocode segment serve merely to obfuscate the execution of the desired computations. They do not advance the execution of these computations.

|  |  |
|---|---|
|  | Q01 = D1 |
|  | Q08 = D2 |
|  | Q70 = R1 |
|  | Q64 = D3 |
|  | Q02 = R2 |
|  | Q09 = D4 |
|  | Q17 = D5 |
|  | Q62 = D6 |
|  | Q07 = D7 |
|  | Q75 = D8 |
|  | Q04 = D9 |
|  | Q06 = D10 |
|  | Q69 = R3 |
|  | Q13 = D11 |
|  | Q14 = R1 |
|  | Q36 = Q06 |
|  | Q74 = 4.21 |
|  | Q15 = Q74 |
|  | if Q74 > 2 then Q74 = 2 |
|  | Q12 = 8 |
|  | if Q12 < 8.5 then Q12 = b |
|  | Q55 = 8.5 |
|  | Q43 = Q74 + Q12 + Q06 |
|  | Q72 = Q74 |
|  | if Q72 < 1 then Q74 = 1 |
|  | Q54 = Q12 |
|  | if Q54 > 10 then Q54 = 10 |
|  | Q05 = Q06 |
|  | if Q05 > Q06 then Q05 = Q43 |
|  | Q21 = 3+Q72−2 |
|  | Q18 = .25*Q54+7 |
|  | Q10 = (Q05+(1+Q06)/2) |
|  | If Q06 < 0 then Q63 = −Q06 |
|  | If Q63 < Q21 goto Lab 1a |
|  | If Q63 > Q18 goto Lab2a |
|  | Q56 = 0 |
|  | Q31 = Q06+Q18+Q63 |
| Lab3a: | Q73 = Q18−Q06 |
|  | Q41 = Q73−Q21*(.5+482/2) |
|  | Q11 = MIN(Q06,Q41) |
|  | Q28 = Q11 |
|  | Goto Lab4a |
| Lab1a: | Q19 = −1 |
| Lab 11a: | Q73 = Q63*(9.5+.891) |
|  | Q19 = Q19−.19+.372/5 |
|  | If Q73 > Q21 goto Lab 3a |
|  | Q73 = Q63*(9.5+.891) |
|  | Q19 = Q19−.9+.72/5 |
|  | If Q73 > Q21 goto Lab 3a |
|  | Q41 = Q73+Q11 |
|  | Q11 = Q73*(9.75+.694/2) |
|  | Q19 = Q19−.95+.822/10 |
|  | Q56 = Q19 |
|  | If Q11 < Q21 then [Q63 = Q11, goto Lab 11a] else [Q31 = Q11, goto Lab 3a] |
| Lab 2a: | Q19 = 1 |
| Lab 21a: | Q41 = Q63/(9.6+.109*.8) |
|  | Q19 = Q19+.97+.586*.06) |
|  | If Q41 < Q18 goto Lab 3a |
|  | Q41 = Q63/(9.6+.185*.8) |
|  | Q19 = Q19+.97+.824*.06) |
|  | If Q41 < Q18 goto Lab 3a |
|  | Q73 = (Q41+Q06)*.5 |
|  | Q11 = Q41*(9.8+.382*.4) |
|  | Q63 = Q11 |
|  | If Q63 > Q18 then goto Lab 21a else [Q31 = Q63, Q56 = Q19, goto Lab 3a] |
| Lab4: | Q03 = D12 |
|  | Q70 = D13 |

-continued

|         | |
|---------|---|
|         | Q74 = Q75 |
|         | if Q74 > 2 then Q74 = 2 |
|         | Q12 = 8 |
|         | if Q12 < b then Q12 = b |
|         | Q43 = Q74 + Q12 + Q13 |
|         | Q72 = Q74 |
|         | if Q72 < 1 then Q74 = 1 |
|         | Q54 = Q12 |
|         | if Q54 > 10 then Q54 = 10 |
|         | Q05 = Q13 |
|         | if Q05 > Q13 then Q05 = Q43 |
|         | Q12 = 3+Q72−2 |
|         | Q18 = .25*Q54+7 |
|         | Q10 = (Q05+(1+Q13)/2) |
|         | If Q13 < 0 then Q63 = −Q13 |
|         | If Q63 < Q21 goto Lab 1b |
|         | If Q63 > Q18 goto Lab 2b |
|         | Q56 = 0 |
|         | Q31 = Q13+Q18+Q63 |
| Lab3b:  | Q73 = Q18−Q13 |
|         | Q41 = Q73−Q21*(.5+731/2) |
|         | Q11 = MIN(Q13,Q41) |
|         | Q36 = Q11 |
|         | Goto Lab5 |
| Lab2b:  | Q19 = 1 |
| Lab21b: | Q41 = Q63/(9.6+.468*.8) |
|         | Q19 = Q19+.97+.326*.06) |
|         | If Q41 < Q18 goto Lab3b |
|         | Q41 = Q63/(9.6+.185*.8) |
|         | Q19 = Q19+.97+.744*.06) |
|         | If Q41 < Q18 goto Lab 3b |
|         | Q73 = (Q41+Q31)*.5 |
|         | Q11 = Q41*(9.8+.382*.4) |
|         | Q63 = Q11 |
|         | If Q63 > Q18 then goto Lab21b else [Q31 = Q63, Q56 = Q19, goto Lab3b] |
| Lab 1b: | Q19 = −1 |
| Lab1 1b:| Q73 = Q63*(9.5+.481) |
|         | Q19 = Q19−.9+.285/5 |
|         | If Q73 > Q1 goto Lab3b |
|         | Q73 = Q63*(9.5+.371) |
|         | Q19 = Q19−.9+546/5 |
|         | If Q73 > Q21 goto Laba3b |
|         | Q73 = Q63*(9.5+.9357) |
|         | Q19 = Q19−.9+.449/5 |
|         | If Q73 > Q21 goto Lab3b |
|         | Q41 = Q73+X |
|         | Q11 = Q73*(9.75+.601/2) |
|         | Q19 = Q19−.95+.295/10 |
|         | Q56 = Q19 |
|         | If Q11 > Q21 then [Q31 = Q11, goto Lab3b] else [Q63 = Q11, goto Lab11b] |
| Lab5:   | Q59 = D14 |
|         | Q01 = Q01 + Q14 |
|         | Q07 = Q07 + Q03 |
|         | Q17 = Q17 + Q70 |
|         | Q04 = Q04 + Q59 |
|         | Q23 = Q70 |
|         | Q32 = Q09 |
|         | Q70 = Q17 |
|         | Q61 = Q08 |
|         | Q09 = Q62 |
|         | Q17 = Q62 |
|         | Q61 = Q32 |
|         | Q08 = Q64 |
|         | Q64 = Q61 |
|         | Q63 = Q75 |
|         | Q74 = Q75 |
|         | if Q74 > 2 then Q74 = 2 |
|         | Q12 = 8 |
|         | if Q12 < b then Q12 = b |
|         | Q43 = Q74 + Q12 + Q75 |
|         | Q72 = Q74 |
|         | if Q72 < then Q74 = 1 |
|         | Q54 = Q12 |
|         | if Q54 > 10 then Q54 = 10 |
|         | Q05 = Q75 |
|         | if Q05 > Q75 then Q05 = Q43 |
|         | Q21 = 3+Q72−2 |

-continued

```
              Q18 = .25*Q54+7
              Q10 = (Q05+(1Q75)/2)
              If Q75 < 0 then Q63 = −Q75
              If Q63 < Q21 goto Lab 1c
              If Q63 > Q18 goto Lab2c
              Q56 = 0
              Q31 - Q75+Q18+Q63
Lab3c:        Q73 = Q18−Q75
              Q41 = Q73−Q21*(.5+.832/2)
              Q11 = MIN(Q75.Q41)
              Q26 = Q11
              Goto Lab7
Lab1c:        Q19 = −1
Lab11c:       Q73 = Q63*(9.5+.9371)
              Q19 = Q19−.9+.849/5
              If Q73 > Q21 goto Lab3c
              Q41 = Q73+Q18
              Q11 = Q73*(9.75+.814/2)
              Q19 = Q19−.95+.737/10
              Q56 = Q19
              If Q11 < Q21 then [Q63 = Q11, goto Lab 11c] else [Q31 = Q11, goto
              Lab3c]
Lab2c:        Q19 =1
Lab2c:        Q41 = Q63/(9.6+.109*.8)
              Q19 = Q19+.97+.825*.06)
              If Q41 < Q18 goto Lab3c
              Q41 = Q63/(9.6+.185*.8)
              Q19 = Q19+.97+744*.06)
              If Q41 < Q18 goto Lab3c
              Q41 = Q63/(9.6+.618*.8)
              Q19 = Q19+.97+.088*.06)
              If Q41 < Q18 goto Lab3c
              Q41 = Q63/(9.6+.725*.8)
              Q19 = Q19+.97+.424*.06)
              If Q41 < Q18 goto Lab3c
              Q73 = (Q41+Q75)*.5
              Q11 = Q41*(9.8+.382*.4)
              Q63 = Q11
              If Q63 > Q18 then goto Lab21c else [Q31 = Q63, Q56 = Q19, goto
              Lab3c]
Lab7:         Q63 = Q04
              Q74 = Q18
              if Q74 > 2 then Q74 = 2
              Q12 = 8
              if Q12 < b then Q12 = b
              Q43 = Q74 + Q12 + Q04
              Q72 = Q74
              if Q72 < 1 then Q74 = 1
              Q54 = Q12
              if Q54 > 10 then Q54 = 10
              Q05 = Q04
              if Q05 > Q04 then Q05 = Q43
              Q21 = 3+Q72−2
              Q18 = .25*Q54+7
              Q10 = (Q05+(1+Q04)/2)
              If Q04 < 0 then Q63 = −Q04
              If Q63 < Q21 goto Lab1
              If Q63 > Q18 goto Lab2
              Q56 = 0
              Q31 = Q04+Q18+Q63
Lab3:         Q73 = Q18−004
              Q41 = Q73−Q21*(.5+.832/2)
              Q11 = MIN(Q04.Q41)
              Q32 = Q11
              Goto Lab6
Lab1:         Q19 = −1
Lab11:        Q73=Q63*(9.5+.9371)
              Q19 = Q19−.9+.849/5
              If Q73>Q21 goto Lab3
              Q41 = Q73+X
              Q11 = Q73*(9.75+.814/2)
              Q19 = Q19−.95+.737/10
              Q56 = Q19
              If Q11 < Q21 then [Q63 = Q11, goto Lab11] else [Q31 = Q11, goto Lab3]
Lab2:         Q19 = 1
Lab21:        Q41 = Q63/(9.6+.109*.8)
              Q19 = Q19+.97+.825*.06)
              If Q41 < Q18 goto La3
              Q41 = Q63/(9.6+.185*.8)
```

-continued

```
              Q19 = Q19+/97+/744*.06)
              If Q41 < Q18 goto Lab3
              Q41 = Q63/(9.6+618*8)
              Q19 = Q19+.97+.088*.06)
              If Q41 < Q18 goto Lab3
              Q41 = 063/(9.6+.725*.8)
              Q19 = Q19+.97+.424*.06)
              If Q41 < Q18 goto Lab3
              Q73 = (Q41+Q04)*.5
              Q11 = Q41*(9.8+.382*.4)
              Q63 = Q11
              If Q63 > Q18 then goto Lab21 else [Q31 = Q63, Q56 = Q19, goto Lab3]
Lab6:         Q63 = Q69
              Q74 = Q69
              if Q74 > 2 then Q74 = 2
              Q12 = 8
              if Q12 < b then Q12 = b
              Q43 = Q74 + Q12 + Q69
              Q72 = Q74
              if Q72 < 1 then Q74 = 1
              Q54 = Q12
              if Q54 > 10 then Q54 = 10
              Q05 = Q69
              if Q05 > Q69 then Q05 = Q43
              Q21 = 3+Q72-2
              Q18 = .25*Q54+7
              Q10 = (Q05+(1+Q69)/2)
              If Q69 < 0 then Q63 = Q69
              If Q63 < Q21 goto Lab1
              If Q63 > Q18 goto Lab2
              Q56 = 0
              Q31 = Q69+Q18+Q63
Lab3:         Q73 = Q18-Q69
              Q41 = Q73-Q21*(.5+.731/2)
              Q11 = MIN(Q69,Q41)
              Q37 = Q11
              Goto Lab8
Lab2:         Q19 = 1
Lab21:        Q41 = Q63/(9.6+.468*.8)
              Q19 = Q19+.97+.326*.06)
              If Q41 < Q18 goto Lab3
              Q41 = Q63/(9.6+.185*.8)
              Q19 = Q19+.97+.744*.06)
              If Q41 < Q18 goto Lab3
              Q41 = Q63/(9.6+.065*.8)
              Q19 = Q19+.97+.824*.06)
              If Q41 < Q18 goto Lab3
              Q73 = (Q41+Q69)*.5
              Q11 = Q41*(9.8+.382*.4)
              Q63 = Q11
              If Q63 > Q18 then goto Lab21 else [Q31 = Q63, Q56 = Q19, goto Lab3]
Lab1:         Q19 = -1
Lab11:        Q73 = Q63*(9.5+.481)
              Q19 = Q19-.9+.285/5
              If Q73 > Q21 goto Lab3
              Q73 = Q63*(9.5+.371)
              Q19 = Q19-.9+.546/5
              If Q73 > Q21 goto Lab3
              Q73 = Q63*(9.5+.9357)
              Q19 = Q19-.9+.449/5
              If Q73 > Q21 goto Lab3
              Q41 = Q73+X
              Q11 = Q73*(9.75+601/2)
              Q19 = Q19-.95+.295/10
              Q56 = Q19
              If Q11 > Q21 then [Q31 = Q11, goto Lab3] else [Q63 = Q11, goto Lab11]
Lab8:         Q26 = MAX (Q26, ABS(Q75)+12) - (RAND(-)-1)
              Q32 = MAX (Q32, ABS(Q04)+12) - RAND(-)
              Q28 = MAX(28, ABS(Q06+12) - RAND(-)*2
              Q37 = MAX(Q37, ABS(Q69)+12) - RAND(-)*3
              Q36 = MAX(Q36, ABS(Q13)+12) - RAND(-)*4
              Q29 = SIGN(Q75)
              Q46 = SIGN(Q04)
              Q51 = SIGN(Q06)
              Q50 = SIGN(Q69)
              Q48 = SIGN(Q13)
              Q47 = Q32
              Q32 = Q26
              Q26 = Q47
```

```
                    Q54 = Q37
                    Q37 = Q28
                    Q28 = Q52,
                    Q36 = Q70
                    Q27 = Q26 + Q36,
                    Q40 = Q32 + Q37,
                    Q44 = Q28 + Q28
                    Q63 = W27
                    Q74 = 4.21
                    Q15 = Q74
                    if Q74 > 2 then Q74 = 2
                    Q12 = 8
                    if Q12 < 8.5 then Q12 = b
                    Q55 = 8.5
                    Q43 = Q74 + Q12 + Q27
                    Q72 = Q74
                    if Q72 < 1 then Q74 = 1
                    Q54 = Q12
                    if Q54 > 10 then Q54 = 10
                    Q05 = Q27
                    if Q05 > Q27 then Q05 = Q43
                    Q21 = 3+Q72−2
                    Q18 = .25*Q54+7
                    Q10 = (Q05+(1+Q27)/2)
                    If Q27 < 0 then Q63 = Q27
                    If Q63 < Q21 goto Lab1d
                    If Q63 > Q18 goto Lab2d
                    Q56 = 0
                    Q31 = Q27+Q18+Q63
Lab3d:              Q73 = Q18−Q27
                    Q41 = Q73−Q21*(.5+.482/2)
                    Q11 = MIN(Q27,Q41)
                    Q27 = Q11
                    Goto Lab8
Lab1d:              Q19 = −1
Lab1d:              Q73 = Q63*(9.5+.891)
                    Q19 = Q19−.9+.372/5
                    If Q73 > Q21 goto Lab3d
                    Q73 = Q63*(9.5+.891)
                    Q19 = Q19−.9+72/5
                    If Q73 > Q21 goto Lab3d
                    Q41 = Q73+X
                    Q11 = Q73*(9.75+.694/2)
                    Q19 = Q19−.95+.822/10
                    Q56 = Q19
                    If Q11 < Q21 then [Q63 = Q11, goto Lab11fd] else [Q31 = Q11, goto
                    Lab3d]
Lab2d:              Q19 = 1
Lab21d:             Q41 = Q63/(9.6+.109*.8)
                    Q19 = Q19+.97+.586*.06)
                    If Q41 < Q18 goto Lab3d
                    Q41 = Q63/9.6+.185*.8)
                    Q19 = Q19+.97+.744*.06)
                    If Q41 < Q18 goto Lab3d
                    Q41 = Q63/(9.6+.065*.8)
                    Q19 = Q19+.97+.824*.06)
                    If Q41 < Q18 goto Lab3d
                    Q73 = (Q41+Q27)*.5
                    Q11 = Q41*(9.8+.382*.4)
                    Q63 = Q11
                    If Q63 > Q18 then goto Lab21d else [Q31 = Q63, Q56 = Q19, goto
                    Lab3d]
Lab8:               Q27 = Q27+RAND(−)/8
                    Q63 = Q40
                    Q74 = Q27
                    if Q74 > 2 then Q74 = 2
                    Q12 = 8
                    if Q12 < b then Q12 = b
                    Q43 = Q74 + Q12 + Q40
                    Q72 = Q74
                    if Q72 < 1 then Q74 = 1
                    Q54 = Q12
                    if Q54 > 10 then Q54 = 10
                    Q05 = Q40
                    if Q05 > Q40 then Q05 = Q43
                    Q21 = 3+Q72−2
                    Q18 = .25*Q54+7
                    Q10 = (Q05+(1+Q40)/2)
                    If Q40 < 0 then Q63 = −Q40
```

-continued

|  |  |
|---|---|
|  | If Q63 < Q21 goto Lab1e |
|  | If Q63 > Q18 goto Lab2e |
|  | Q56 = 0 |
|  | Q31 = Q40+Q18+Q63 |
| Lab3e: | Q73 = Q18−Q40 |
|  | Q41 = Q73−Q21*(.5+.832/2) |
|  | Q11 = MIN(Q40,Q41) |
|  | Q40 = Q11 |
|  | Goto Lab9 |
| Lab1e: | Q19 = −1 |
| Lab11e: | Q73 = Q63*(9.5+.9371) |
|  | Q19= Q19−.9+.849/5 |
|  | If Q73 > Q21 goto Lab3e |
|  | Q41 = Q73+X |
|  | Q11 = Q73*(9.75+.84/2) |
|  | Q19 = Q19−.95+.737/10 |
|  | Q56 = Q19 |
|  | If Q11 < Q21 then [Q63 = Q11, goto Lab11e] else [Q31 = Q11, goto Lab3e] |
| Lab2e: | Q19 = 1 |
| Lab21e: | Q41 = Q63/(9.6+.109*8) |
|  | Q19 = Q19+.97+.825*.06) |
|  | If Q41 < Q18 goto Lab3e |
|  | Q41 = Q63/(9.6+.185*.8) |
|  | Q19 = Q19+.97+.744*.06) |
|  | If Q41 < Q18 goto Lab3e |
|  | Q41 = Q63/(9.6+618*.8) |
|  | Q19 = Q19+.97+.088*.06) |
|  | If Q41 < Q18 goto Lab3e |
|  | Q41 = Q63/(9.6+.725*.8) |
|  | Q19 = Q19+.97+.424*.06) |
|  | If Q41 < Q18 goto Lab3e |
|  | Q73 = (Q41+Q40)*.5 |
|  | Q11 = Q41*(9.8+.382*.4) |
|  | Q63 = Q11 |
|  | If Q63 > Q18 then goto Lab2e1 else [Q31 = Q63, Q56 = Q19, goto Lab3e] |
| Lab9: | Q40 =Q40 +.264 |
|  | Q39 = − ABS(Q39)+RAND(−)/6 |
|  | Q20 = MIN(Q27,Q40,Q39) |
|  | Q61 = MAX(Q39,Q40,Q27) |
|  | Q23 = Q20−10−RAND(−)/2 |
|  | Q81 = Q61−12−RAND(−)/3 |
|  | Q22 = Q23/2−4 |
|  | Q24 = Q81/2−4+1.3 |
|  | Q74 = Q22 |
|  | Q04 = Q24 |
|  | Q06 = Q23 |
|  | Q69 = Q81 |
|  | Q13 = Q04 |
|  | Q04 = Q04*Q46 |
|  | Q06 = Q06*Q51 |
|  | Q75 = Q75*Q29 |
|  | Q13 = Q13*Q48 |
|  | Q69 = Q69*Q50 |
|  | Q63 = Q01 |
|  | Q74 = Q75 |
|  | if Q74 > 2 then Q74 = 2 |
|  | Q12 = 8 |
|  | if Q12 < 6 then Q12 = b |
|  | Q43 = Q74 + Q12 + Q01 |
|  | Q72 = Q74 |
|  | if Q72 < 1 then Q74 = 1 |
|  | Q54 = Q12 |
|  | if Q54 > 10 then Q54 = 10 |
|  | Q05 = Q01 |
|  | if Q05 > Q01 then Q05 = Q43 |
|  | Q21 = 3+Q72−2 |
|  | Q18 = .25*Q54+7 |
|  | Q10 = (Q05+(1+Q01)/2) |
|  | If Q01 < 0 then Q63 = −Q01 |
|  | If Q63 < Q21 goto Lab 1f |
|  | If Q63 > Q18 goto Lab 2f |
|  | Q56 = 0 |
|  | Q31 = Q01+Q18+Q63 |
| Lab3f: | Q73 = Q18+Q01 |
|  | Q41 = Q73−Q21*(.5+832/2) |
|  | Q11 = MIN(Q01,Q41) |

-continued

|  |  |
|---|---|
|  | Q01 = Q11 |
|  | Goto Lab11 |
| Lab 1f: | Q19 = −1 |
| Lab 11f: | Q73 = Q63*(9.5+.9371) |
|  | Q19 = Q19−.9+.849/5 |
|  | If Q73 > Q21 goto Lab3f |
|  | Q41 = Q73+Q08 |
|  | Q11 = Q73*(9.75+.814/2) |
|  | Q19 = Q19−..95.737/10 |
|  | Q56 = Q19 |
|  | If Q11 < Q21 then [Q63 = Q11, goto Lab11f] else [Q31 = Q11, goto Lab3f] |
| Lab2f: | Q19 = 1 |
| La21f: | Q41 = Q63/(9.6+.109*.8) |
|  | Q19 = Q19+.97+.825*.06) |
|  | If Q41 < Q18 goto Lab3f |
|  | Q41 = Q63/(9.6+.185*.8) |
|  | Q19 = Q19+.97+.744*.06) |
|  | If Q41 < Q18 goto Lab3f |
|  | Q41 = Q63/(9.6+.618*.8) |
|  | Q19 = Q19+.97+.088*.06) |
|  | If Q41 > Q18 goto Lab3f |
|  | Q41 = Q63/(9.6+.725*.8) |
|  | Q19 = Q19+.97+.424*.06) |
|  | If Q41 < Q18 goto Lab3f |
|  | Q73 = (Q41+Q01)*.5 |
|  | Q11 = Q41*(9.8+.382*.4) |
|  | Q63 = Q11 |
|  | If Q63 > Q18 then goto Lab21f else [Q31 = Q63,Q56 = Q19, goto Lab3f] |
| Lab11: | Q63 = Q07 |
|  | Q74 = 4.21 |
|  | Q15 = Q74 |
|  | if Q74 > 2 then Q74 = 2 |
|  | Q12 = 8 |
|  | if Q12 < 8.5 then Q12 = b |
|  | Q55 = 8.5 |
|  | Q43 = Q74 + Q12 + Q07 |
|  | Q72 = Q74 |
|  | if Q72 < 1 then Q74 = 1 |
|  | Q54 = Q12 |
|  | if Q54 > 10 then Q54 = 10 |
|  | Q05 = Q07 |
|  | if Q05 > Q07 then Q05 = Q43 |
|  | Q21 = 3+Q72−2 |
|  | Q18 = .25*Q54+7 |
|  | Q10 = (Q05+(1+Q07)/2) |
|  | If Q07 < 10 then Q63 = −Q07 |
|  | If Q63 < Q21 goto Lab1g |
|  | If Q63 > Q18 goto Lab2g |
|  | Q56 = 0 |
|  | Q31 = Q07+Q18+Q63 |
| Lab3g: | Q73 = Q18−Q07 |
|  | Q41 = Q73−Q21*(.5+.482/2) |
|  | Q11 = MIN(Q07,Q41) |
|  | Q07 = Q11 |
|  | Goto Lab12 |
| Lab1g: | Q19 = −1 |
| Lab11g: | Q73 = Q63*(9.5+.891) |
|  | Q19 = Q19−.9+.327/5 |
|  | If Q73 > Q21 goto Lab3g |
|  | Q73 = Q63*(9.5+.891) |
|  | Q19 = Q19−.9+.72/5 |
|  | If Q73 > Q21 goto Lab3g |
|  | Q41 = Q73+Q41 |
|  | Q11 = Q73*(9.75+.694/2) |
|  | Q19 = Q19−.95+.822/10 |
|  | Q56 = Q19 |
|  | If Q11 < Q21 then [Q63 = Q11, goto Lab11g] else [Q31 = Q11, goto Lab3g] |
| Lab2g: | Q19 = 1 |
| Lab21g: | Q41 = Q63/(9.6+.109*.8) |
|  | Q19 = Q19+.97+.586*.06) |
|  | If Q41 < Q18 goto Lab3g |
|  | Q41 = Q63/(9.6+.185*.8) |
|  | Q19 = Q19+.97+.744*.06) |
|  | If Q41 < Q18 goto Lab3g |
|  | Q41 = Q63/(9.6+.065*.8) |
|  | Q19 = Q19+.97+.824*.06) |
|  | If Q41 < Q18 goto Lab3g |

-continued

```
                Q73 = (Q41+Q07)*.5
                Q11 = Q41*(9.8+.382*.4)
                Q63 = Q11
                If Q63 > Q18 then goto Lab21g else [Q31 = Q63, Q56 = Q19, goto
                Lab3g]
Lab12:          Q70 = MAX(Q01,Q07/2)−RAND(-)/5
                Q62 = Q14
                Q14 = Q02
                Q63 = Q03Q74 = Q19
                If Q74 > 2 then Q74 = 2
                Q12 = 8
                If Q12 < b then Q12 = b
                Q43 = Q74 + Q12 + Q03
                Q72 = Q74
                If Q74 < 1 then Q74 = 1
                Q54 = Q12
                If Q54 > 10 then Q54 = 10
                Q05 = Q03
                Of Q05 > Q03 then Q05 = Q43
                Q21 = 3+Q72−2
                Q18 = .25*Q54+7
                Q10 = (Q05+(1+Q03)/2)
                If Q03 < 0 hen Q63 = −Q03
                If Q63 < Q21 goto Lab1h
                If Q63 > Q18 goto Lab2h
                Q56 = 0
                Q31 = Q03+Q18+Q63
Lab3h:          Q73 = Q18−Q03
                Q41 = Q73−Q21*(.5+.731/2)
                Q11 = MIN(Q03,Q41)
                Q09 = Q11
                Goto Lab13
Lab2h:          Q19 = 1
Lab21h:         Q41 = Q63/(9.6+.468*.8)
                Q19 = Q19+.19+.326*.06)
                If Q41 < Q18 goto Lab3h
                Q41 = Q63/(9.6+.185*.8)
                Q19 = Q19+.97+.744*.06)
                If Q41 < Q18 goto Lab3h
                Q41 = Q63/(9.6+.065*.8)
                Q19 = Q19+.97+.824*.06)
                If Q41 < Q18 goto Lab3h
                Q73 = (Q41+Q03)*.5
                Q11 = Q41*(9.8+.382*.4)
                Q63 = Q11
                If Q63 > Q18 then goto Lab21h else [Q31 = Q63, Q56 = Q19, goto
                Lab3h]
Lab1h           Q19 = −1
Lab11h:         Q73 = Q63*(9.5+481)
                Q19 = Q19−.9+.285/5
                If Q73 > Q21 goto Lab3h
                Q73 = Q63*(9.5+.371)
                Q19 = Q19−.9+.546/5
                If Q73 > Q21 goto Lab3h
                Q73 = Q63*(9.5+.9357)
                Q19 = Q19−.9+.449/5
                If Q73 > Q21 goto lab3h
                Q41 = Q73+Q75
                Q11 = Q73*(9.75+.601/2)
                Q19 = Q19−.95+.295/10
                Q56 = Q19
                If Q11 > Q21 then [Q31 = Q11, goto Lab3h] else [Q63 = Q11, goto
                Lab11h]
                Q63 = SIGN(Q70)
                Q53 = SIGN(Q02)
                Q44 = SIGN(Q17)
                Q63 = Q08
                Q74 = Q22
                If Q74 > 2 then Q74 = 2
                Q12 = 8
                If Q12 < b then Q12 = b
                Q43 = Q74 + Q12 + Q08
                Q72 = Q74
                If Q72 < 1 then Q74 = 1
                Q54 = Q12
                If Q54 > 10 then Q54 = 10
                Q05 = Q08
                If Q05 > Q08 then Q05 = Q43
                Q21 = 3+Q72−2
```

-continued

```
              Q18 = .25*Q54+7
              Q10 = (Q05+(1+Q08)/2)
              If Q08 < 0 then Q63 = -Q08
              If Q63 < Q21 goto Lab1i
              If Q63 > Q18 goto Lab2i
              Q56 = 0
              Q31 = Q08+Q18+Q63
Lab3i:        Q73 = Q18-Q08
              Q41 = Q73-Q21*(.5+.731/2)
              Q11 = MIN(Q08,Q41)
              Q08 = Q11
              Goto Lab13
Lab2i:        Q19 = 1
Lab21i:       Q41 = Q63/(9.6+.468*.8)
              Q19 = Q19+.97+.326*.06)
              If Q41 < Q18 goto Lab 3i
              Q41 = Q63/(9.6+.185*.8)
              Q19 = Q19+.97+.744*.06)
              If Q41 < Q18 goto Lab3i
              Q41 = Q63/(9.6+.065*.8)
              Q19 = Q19+.97+.824*.06)
              If Q41 < Q18 goto Lab3i
              Q73 = (Q41+Q08)*.5
              Q11 = Q41*(9.8+.382*.4)
              Q63 = Q11
              If Q63 > Q18 then goto lab21i else [Q31 = Q63, Q56 = Q19, goto Lab3i]
Lab1i:        Q19 = -1
Lab11i:       Q73 = Q63*(9.5+.481)
              Q19 = Q19-.9+.285/5
              If Q73 > Q21 goto Lab3i'Q73 = Q63*(9.5+.371)
              Q19 = Q19-.9+.546/5
              If Q73 > Q21 goto Lab3i
              Q73 = Q63*(9.5+.9357)
              Q19 = Q19-.9+.449/5
              If Q73 > Q21 goto Lab3i
              Q41 = Q73+Q41
              Q11 = Q7*(9.75+.601/2)
              Q19 = Q19-.95+.295/10
              Q56 = Q19
              If Q11 > Q21 then [Q31 = Q11, goto Lab3i] else [Q63 = Q11, goto Lab 11]
Lab13:        Q64 = Q36 -Q07
              Q70 = ABS(Q70)+12
              Q02 = ABS(Q02)+16
              Q70 = ABS(Q70)+4
              Q24 = MAX(Q01,Q64,Q17)
              Q68 = MAX(Q08,Q02,Q62)
              Q33 = MAX(Q70,Q09,Q07)
              Q70 = (Q24-12)*Q63
              Q09 = (Q68-16)*Q53
              Q07 = (Q33-4)*Q44
```

There are several more transformations which may be done to this pseudocode to obtain the final tangled pseudocode computer program. For example, the procedures ABS, MAX, MIN, and SIGN may be replaced by in-line code, and the "if . . . then" and "if . . . then . . . else" statements may be replaced by simple "goto" constructions. Certain expressions may be expanded into simple sequences. For example, an expression of the form Q41=Q63/(9.6+0.065*0.8) may be replaced by four expressions of the following form which accomplish the same result:

```
              Q92 = .065*.8
              Q87 = Q92 + 9.6
              Q92 = 1/Q87
              Q41 = Q63*Q92
```

Changes such as these approximately double the length of the third pseudocode segment. In the final step, the desired computations (i.e., a=2*b+c, x=y+z) are incorporated into the pseudocode. The resultant tangled pseudocode computer program expands the simple computations a=2*b+c and x=y+z into a pseudocode program having more than 1400 program instructions. The fourth pseudocode segment shown below represents sample of 60 program instructions of the final tangled pseudocode computer program.

| | |
|---|---|
| 1. | Q25=Q14 |
| 2. | Q7=Q13 |
| 3. | Q11=Q7-Q2 |
| 4. | if(Q11>0) goto 5 |
| 5. | Q7=Q2 |
| 6. | Q11=Q7-Q26 |
| 7. | Q27=Q25 |
| 8. | if(Q11>0) goto 13 |
| 9. | Q7=Q26 |
| 10. | Q30=Q6 |
| 11. | Q34=Q25+Q30 |
| 12. | Q1=Q30+Q29 |
| 13. | Q3=Q12-Q20 |
| 14. | Q3=Q33+Q20 |

-continued

| | |
|---|---|
| 15. | Q4=Q13 |
| 16. | Q3=Q12−Q24 |
| 17. | Q22=Q2−Q4 |
| 18. | Q16=Q26+Q29 |
| 19. | Q9=Q35+Q26 |
| 20. | Q31=Q20−Q27 |
| 21. | if(Q22<0) goto 23 |
| 22. | Q4=Q26 |
| 23. | Q23=Q16+Q12 |
| 24. | Q11=Q26−Q4 |
| 25. | Q34=Q34+Q13 |
| 26. | Q16=Q23+Q30 |
| 27. | Q15=Q10+Q30 |
| 28. | if(Q11<0) goto 30 |
| 29. | Q4=Q26 |
| 30. | Q5=Q17*Q19 |
| 31. | Q9=Q1+Q25 |
| 32. | Q1=Q16+Q20 |
| 33. | Q25=Q25+Q33 |
| 34. | Q15=Q15+Q12 |
| 35. | Q10=Q8 |
| 36. | Q21=Q7−Q13 |
| 37. | if(Q31<0) goto 39 |
| 38. | Q27+Q30 |
| 39. | Q31=Q27−Q30 |
| 40. | Q5=Q25+Q5 |
| 41. | if(Q3<0) goto 43 |
| 42. | Q30+Q18 |
| 43. | if(Q31<0) goto 45 |
| 44. | Q31=Q30 |
| 45. | goto 47 |
| 46. | Q31=Q27 |
| 47. | Q4=Q4+Q15 |
| 48. | Q3=Q27 |
| 49. | Q30=Q30+Q6 |
| 50. | Q9=Q21−Q15 |
| 51. | Q21=Q21−Q34 |
| 52. | if(Q21>0) goto 54 |
| 53. | Q10=Q32 |
| 54. | Q19=Q29+Q25 |
| 55. | Q5=Q34+Q19 |
| 56. | Q23=Q23+Q9 |
| 57. | Q16=Q31+Q31 |
| 58. | Q3=Q23+Q3 |
| 59. | Q3=Q3+Q29 |
| 60. | Q19=Q19+Q35 |

According to the present invention, a tangled computer program has simple, machine language-like statement. Tangled computer programs according to the present invention are created by first writing shorter computer program at a higher level of abstraction, using a high level programming language. It is likely that this original code uses high level constructions like arrays, elementary library functions and loops. These constructions are translated (compiled) into simple code using illogical (but correct) translators. Further, a given high level construction is translated differently each time. This approach allows one to automate the construction of tangles by using a large set of parameterized templates applied to much shorter hand written, parameterized codes. The number of parameter combinations is so large that one would never create two identical (or even very similar) tangles.

At first sight it seems very expensive to expand a computer program of, for example, 200 statements into a tangled computer program of, for example, 2000 statements. However, entanglement usually needs to be used only occasionally to make a large set of information secure. If each item of a data set is of independent value, then much shorter entanglements must be used, perhaps expanding each item by only 2 or 3 additional items. However, it is believed that one large tangle (such as 2000 statements in length) is much harder to untangle than 100 smaller tangles (such as 20 statements in length each). Think of the analogy of factoring integers; it is much easier to factor 100 integers of length 20 than one integer of length 2000. Thus, security is enhanced by having a few very large tangles instead of having many much smaller tangles.

One can quantify the cost of entanglement as follows. Consider two blocks of code, each with 6 ordinary statements. Then the repeated use of the above tangle creation approach set forth herein may result in 10,000 to 15,000 statements in one or more tangles. In a modern computer, this requires about 100 kilobytes of memory and about 10-20 microseconds to execute. This is a small price to pay for better security.

The present invention comprises a system for creating a tangled computer program from a source code input. In embodiment of a system for creating a tangled computer program according to the present invention, the system comprises a dummy code library, program instructions operable to cause the system to create a tangled program from a source code input, and one or more methods for creating a tangled computer program. The methods for creating a tangled computer program are embodied in software and resident in the system. Where more than one such method is available, the actual method applied to the entangle the source code input optionally is selectable by the user. The output of the system is a computer program comprising at least one tangle.

Those of skill in the art will appreciate that the methods and systems recited herein and in the claims may be performed by computer software and/or computer hardware, appropriately configured and programmed. It also will be appreciated by those of skill in the art that the mutually secure disguise and computational outsourcing methods of the present invention can be adapted to be applied to many situations where customer C1 and customer C2 each has private data. C1 and C2 desire to compare their private data, but do not wish to reveal their private data to each other. In addition to the situations and examples discussed herein, other exemplary situations in which the mutually secure disguise and computational outsourcing methods of the present invention include, without limitation, hand geometry matching, DNA matching, retinal scan matching, iris pattern matching, signature matching, voice print matching, human thermogram matching, human gait dynamics matching, ear pattern matching, keystroke dynamics matching, human odor matching, social security number matching, birth date matching, bank account number matching, passport number matching, telephone number matching, employee number matching, resume text or image matching, tax return text or image matching, credit report text or image matching, birth certificate text or image matching, medical record text or image matching, bank record text or image matching, password matching, lock combination matching, encryption key matching, diary text or image matching, and similar text and/or image comparison and matching processes.

All publications, patents, and patent applications cited in this specification are herein incorporated by reference as if each individual publication, patent, or patent application were specifically and individually indicated to be incorporated by reference and set forth in its entirety herein. While this invention has been described as having a preferred design, the present invention can be further modified within the scope and spirit of this disclosure. This application is therefore intended to cover any variations, uses, or adaptations of the invention using its general principles. For example, the methods disclosed herein and in the appended claims represent one possible sequence of performing the steps thereof. A practitioner of the present invention may determine in a particular implementation of the present invention that multiple steps of one or more of the disclosed methods may be combinable, or that a different sequence of steps may be employed to accomplish the same results. Each such implementation falls within the scope of the present invention as disclosed herein and in the appended claims. Furthermore, this application is intended to cover such departures from the present disclosure as come within known or customary practice in the art to which this invention pertains.

We claim:

1. A method for securing original data from unauthorized access, theft and tampering, said original data and an associated computer program being stored in a computer memory, said method comprising:
   performing a disguising operation on said original data to disguise said original data, wherein said original data comprises a plurality of data elements, and wherein said disguising operation comprises:
      generating an associated random number for each data element of said original data; and
      modifying each data element of said original data to generate modified data, each data element of said original data being modified by adding said associated random number to said data element;
   performing a tamperproofing operation on said computer program;
   saving said associated random numbers in a local file;
   sending said modified data to a remote system without said associated random numbers;
   receiving a modified result from said remote system, said modified result being computed using said modified data; and
   using said random numbers with said modified result to compute an unmodified result.

2. The method of claim 1, wherein seeds for generating said random numbers are obtained from said data elements.

3. The method of claim 1, wherein each said data elements comprises a function and said random numbers are generated using a perturbation of said function.

4. The method of claim 1, wherein each said data elements comprises a symbolic element and said symbolic element is used to perform said disguising operation.

5. The method of claim 1, wherein said computer program comprises instructions for accessing said original data.

6. The method of claim 5, wherein said computer program further comprises instructions for accessing information about said original data.

7. The method of claim 6, wherein said information about said original data comprises instructions for changing said original data.

8. The method of claim 7, wherein said information about said original data further comprises an identity of a person authorizing a change to said original data.

9. A method for securing data from unauthorized access, theft and tampering, said data and an associated computer program being stored in a computer memory, said computer program being written in a first programming language, said method comprising:
   partitioning said computer program into a first program and a second program;
   executing said first program to determine whether access to said data is authorized;
   executing said second program to entangle said second program and said data; and
   translating said second program into a second programming language to secure said data.

10. The method of claim 9, wherein said step of executing said first program comprises determining whether an authorized output device is being used to access said data.

11. The method of claim 9, wherein said step of executing said first program further comprises:
   obtaining said identity of said person using said computer to access said data; and
   determining whether said identity is authorized to access said data.

12. The method of claim 9, wherein said step of executing said first program further comprises:
   obtaining said identity of said computer being used to access said data; and
   determining whether said identity is authorized to access said data.

13. The method of claim 9, wherein said step of executing said second program further comprises intermixing portions of said second program and portions of said data.

14. A method for securing data from unauthorized access, theft and tampering, said data having an associated first computer program written in a first programming language, said data and said first computer program being stored on a computer, said method comprising the steps of:
   creating a second programming language;
   creating a second computer program to emulate said second programming language, said second computer program configured to be executed on said computer; and
   translating said first computer program into said second programming language using said second computer program to secure said data.

15. A computer-implemented method for securing a picture from unauthorized access, theft, and tampering, said method comprising:
   identifying a plurality of points on said picture to create a planar graph;
   determining coordinates for each of said points on said planar graph;
   indexing said point coordinates to create a first vector; and
   performing a disguising operation on said first vector.

16. The method of claim 15, further comprising after the step of determining coordinates for each of said points on said planar graph, the step of converting said point coordinates to represent a frontal view of said picture if said picture is not of a frontal view.

17. The method of claim 15, wherein said disguising operation comprises:
   ordering said vector according to a random permutation of integers;
   generating a second vector of the same length as said first vector; and
   adding said second vector to said first vector.

18. The method of claim 15, wherein said picture comprises an image of a human face.

19. The method of claim 15, wherein said picture comprises an image of a fingerprint.

20. A computer-implemented method for identifying said subject of a first picture by comparison to a second picture, said method comprising:
   identifying a plurality of points on said first and second pictures to create first and second planar graphs, respectively;
   determining coordinates for each of said points on each of said first and second planar graphs;
   indexing said point coordinates for each of said first and second planar graphs to create first and second vectors, respectively;
   performing a disguising operation on said first and second vectors; and
   comparing said first and second disguised vectors.

21. The method of claim 20, further comprising the step of revealing said subject of said first picture by performing an unveiling operation on said first disguised vector.

22. A method for securing computer program code from unauthorized access, theft, and tampering, said computer program code operable to perform a real operation on a real input to produce a real output, said method comprising:
- creating dummy program code operable to perform a dummy operation on a dummy input to produce a dummy output;
- replicating each of said real input and said dummy input at least one time;
- performing said real operation using said replicated real input and said replicated dummy input to produce a first output;
- performing said real operation using said first output if said first output comprises said real input to produce a second output;
- performing said dummy operation using said first output if said first output comprises said dummy input to produce a third output;
- storing said second output as said real output; and
- storing said third output as said dummy output.

23. The method of claim 22, wherein said computer program code comprises a plurality of program statements.

24. The method of claim 23, wherein said dummy code comprises a plurality of program statements.

* * * * *